(12) United States Patent
Sakaguchi et al.

(10) Patent No.: US 7,369,707 B2
(45) Date of Patent: May 6, 2008

(54) INTRA-PICTURE PREDICTION CODING METHOD

(75) Inventors: Satoshi Sakaguchi, Sakai (JP); Shinya Kadono, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 631 days.

(21) Appl. No.: 10/974,682

(22) Filed: Oct. 28, 2004

(65) Prior Publication Data

US 2005/0089235 A1    Apr. 28, 2005

(30) Foreign Application Priority Data

Oct. 28, 2003    (JP) .............................. 2003-367091

(51) Int. Cl.
*G06K 9/36*    (2006.01)

(52) U.S. Cl. ...................... 382/239; 382/232

(58) Field of Classification Search ............... 382/232, 382/236, 238, 239; 375/E7.129
See application file for complete search history.

(56) References Cited

U.S. PATENT DOCUMENTS 5,903,676 A * 5/1999 Wu et al. .................... 382/244
6,069,976 A * 5/2000 Kim .......................... 382/239

OTHER PUBLICATIONS

Draft ISO/IEC, 14496-10: 2002 (E), "Draft ITU-T Recommendation and Final Draft International Standard of Joint Video Specification", May 27, 2003, pp. 97-102.

* cited by examiner

*Primary Examiner*—Duy M Dang
(74) *Attorney, Agent, or Firm*—Wenderoth, Lind & Ponack L.L.P.

(57) ABSTRACT

The intra-picture prediction coding apparatus 150a is comprised of: an intra-picture prediction mode candidate determination unit 156a that determines intra-picture prediction mode candidates by switching among intra-picture prediction mode candidate determination methods based on an amount of resources 172; an intra-picture prediction execution unit 151 that sequentially performs intra-picture prediction on a current block using each of intra-picture prediction modes in the intra-picture prediction mode candidates and generates an intra-picture predictive image 164; a prediction difference calculation unit 152 that generates a prediction difference image 165 based on the intra-picture prediction image 164 and the image presented by the current block; a coding efficiency evaluation unit 153 that calculates an evaluation value 166 based on the prediction difference image 165; an intra-picture prediction mode determination unit 154 that determines the intra-picture prediction mode whose evaluation value 166 is the smallest among the intra-picture prediction mode candidates; and a coding unit 155 that codes a prediction difference image 168 as a result of the prediction using the determined intra-picture prediction mode as well as the intra-picture prediction mode information 167.

20 Claims, 36 Drawing Sheets

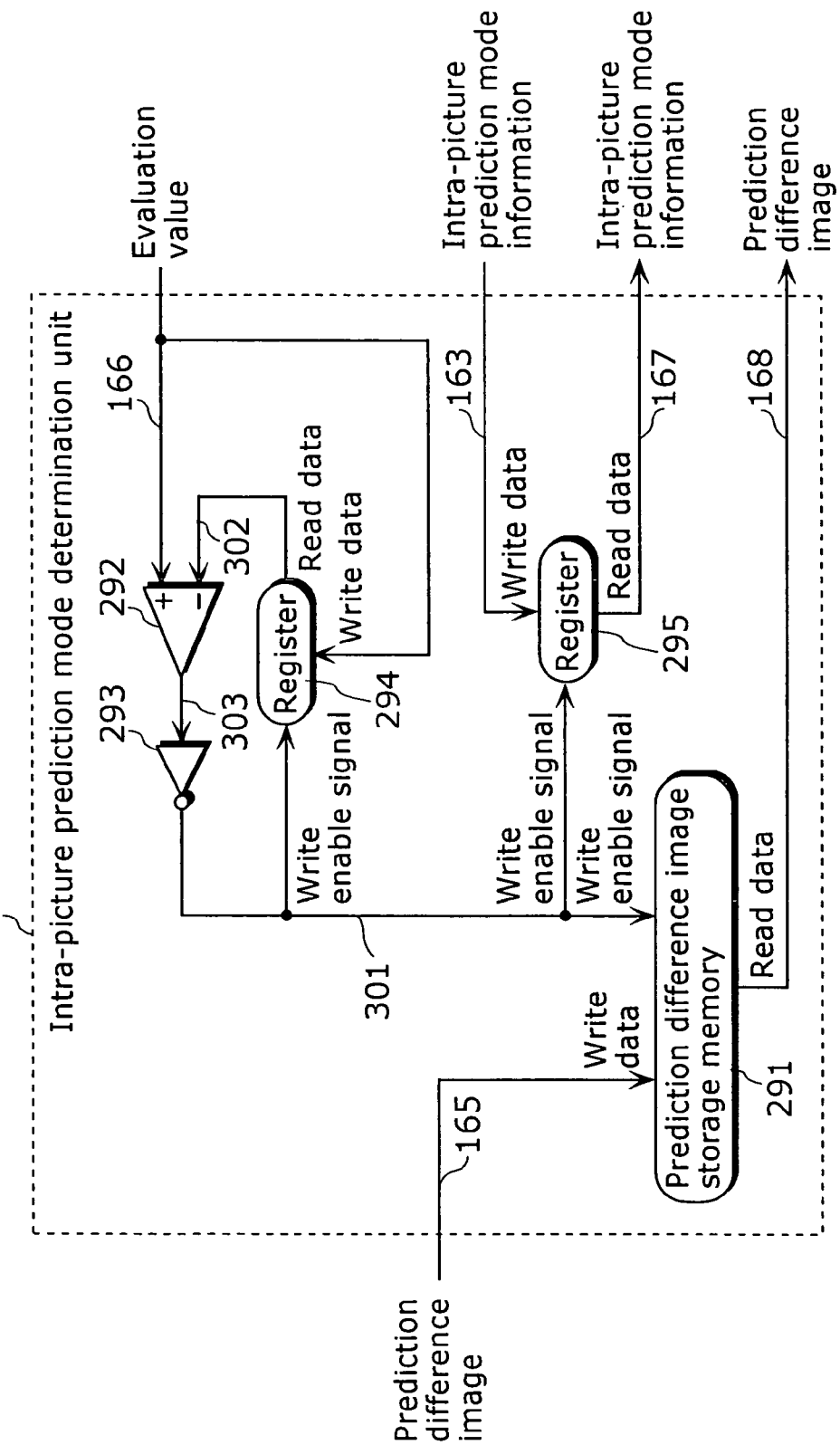

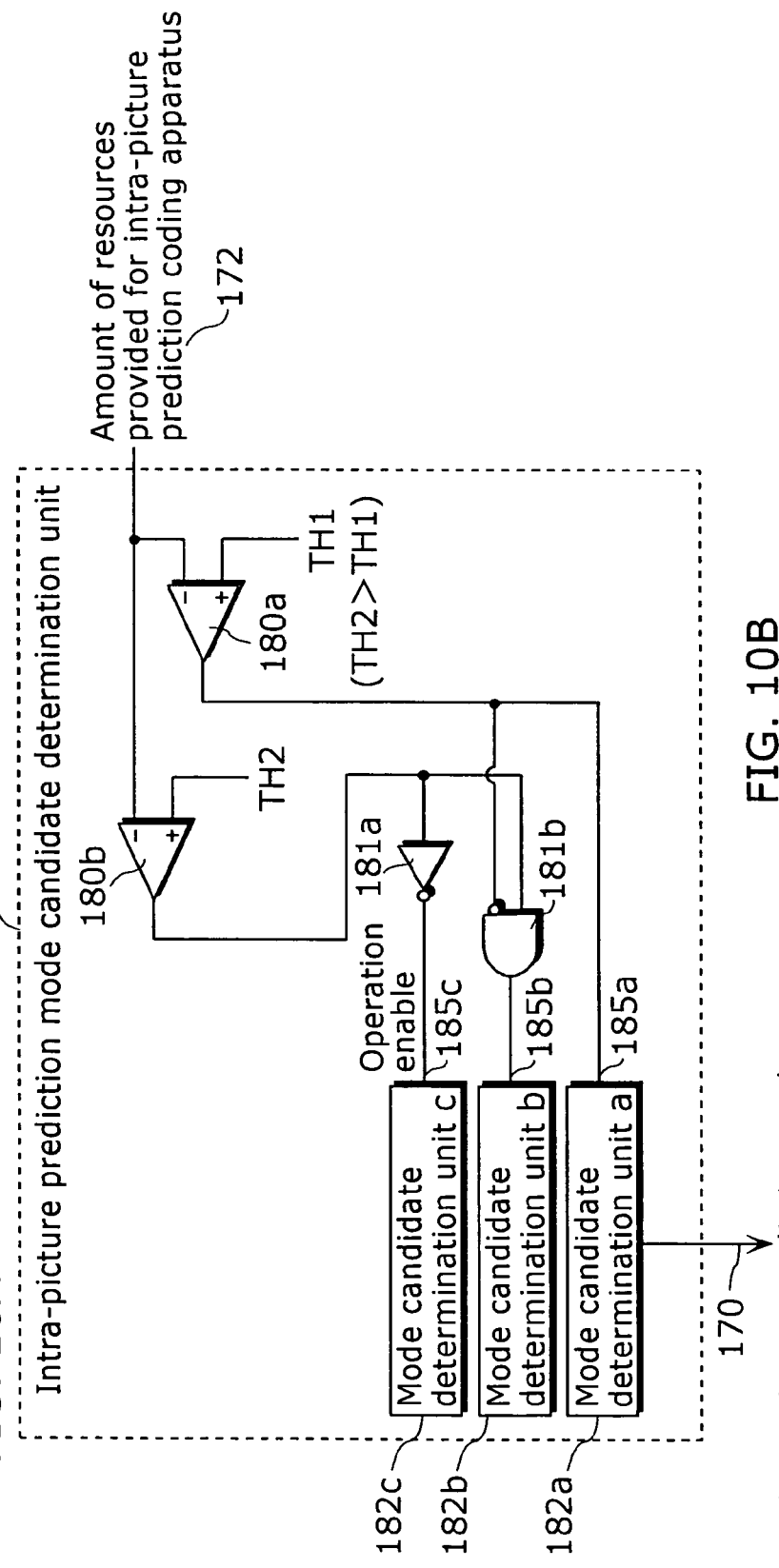
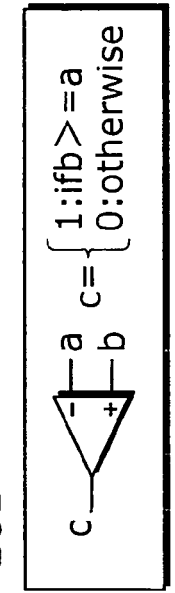

Predictive image

Predictive image
(by pixel-skipping prediction)

Reference image for prediction 195

Reference image for prediction 196

(+DC prediction)

(+DC prediction)

TOP

BOTTOM (+DC prediction)

(+DC prediction)

FIG. 30A  501

|  | Image size | | |
|---|---|---|---|
|  | large | middle | small |
| Number of mode candidates specified by 4 x 4 intra-picture prediction mode candidate specification information | × | ○ | ○ |
| Number of mode candidates specified by 8 x 8 intra-picture prediction mode candidate specification information | ○ | ○ | ○ |
| Number of mode candidates specified by 16 x 16 intra-picture prediction mode candidate specification information | ○ | ○ | ○ |

FIG. 30B  502

|  | Image size | | |
|---|---|---|---|
|  | large | middle | small |
| Number of mode candidates specified by 4 x 4 intra-picture prediction mode candidate specification information | × | △ | ○ |
| Number of mode candidates specified by 8 x 8 intra-picture prediction mode candidate specification information | △ | ○ | ○ |
| Number of mode candidates specified by 16 x 16 intra-picture prediction mode candidate specification information | ○ | ○ | ○ |

FIG. 30C  503

|  | Image size | | |
|---|---|---|---|
|  | large | middle | small |
| Number of mode candidates specified by 4 x 4 intra-picture prediction mode candidate specification information | × | × | ○ |
| Number of mode candidates specified by 8 x 8 intra-picture prediction mode candidate specification information | × | ○ | ○ |
| Number of mode candidates specified by 16 x 16 intra-picture prediction mode candidate specification information | ○ | ○ | ○ |

FIG. 30D  504

|  | Image size | | |
|---|---|---|---|
|  | large | middle | small |
| Number of mode candidates specified by 4 x 4 intra-picture prediction mode candidate specification information | × | × | △ |
| Number of mode candidates specified by 8 x 8 intra-picture prediction mode candidate specification information | × | △ | ○ |
| Number of mode candidates specified by 16 x 16 intra-picture prediction mode candidate specification information | △ | ○ | ○ |

FIG. 30E  505

|  | Image size | | |
|---|---|---|---|
|  | large | middle | small |
| Number of mode candidates specified by 4 x 4 intra-picture prediction mode candidate specification information | × | × | △ |
| Number of mode candidates specified by 8 x 8 intra-picture prediction mode candidate specification information | × | △ | △ |
| Number of mode candidates specified by 16 x 16 intra-picture prediction mode candidate specification information | △ | ○ | ○ |

FIG. 30F  506

|  | Image size | | |
|---|---|---|---|
|  | large | middle | small |
| Number of mode candidates specified by 4 x 4 intra-picture prediction mode candidate specification information | × | × | △ |
| Number of mode candidates specified by 8 x 8 intra-picture prediction mode candidate specification information | × | △ | △ |
| Number of mode candidates specified by 16 x 16 intra-picture prediction mode candidate specification information | △ | △ | △ |

FIG. 31A (515a)

| | Image size | | |
|---|---|---|---|
| | large | middle | small |
| Number of mode candidates specified by 4 x 4 intra-picture prediction mode candidate specification information | x | x | △→○ |
| Number of mode candidates specified by 8 x 8 intra-picture prediction mode candidate specification information | x | △→○ | ○ |
| Number of mode candidates specified by 16 x 16 intra-picture prediction mode candidate specification information | ○ | ○→△ | ○→x |

FIG. 31B (515b)

| | Image size | | |
|---|---|---|---|
| | large | middle | small |
| Number of mode candidates specified by 4 x 4 intra-picture prediction mode candidate specification information | x | x | △→○ |
| Number of mode candidates specified by 8 x 8 intra-picture prediction mode candidate specification information | x | △ | ○ |
| Number of mode candidates specified by 16 x 16 intra-picture prediction mode candidate specification information | △ | ○ | ○→△ |

FIG. 31C (516a)

| | Image size | | |
|---|---|---|---|
| | large | middle | small |
| Number of mode candidates specified by 4 x 4 intra-picture prediction mode candidate specification information | x | x | △→○ |
| Number of mode candidates specified by 8 x 8 intra-picture prediction mode candidate specification information | x | △ | △ |
| Number of mode candidates specified by 16 x 16 intra-picture prediction mode candidate specification information | △ | △ | △→x |

FIG. 31D (516b)

| | Image size | | |
|---|---|---|---|
| | large | middle | small |
| Number of mode candidates specified by 4 x 4 intra-picture prediction mode candidate specification information | x | x | △→○ |
| Number of mode candidates specified by 8 x 8 intra-picture prediction mode candidate specification information | x | △→○ | △ |
| Number of mode candidates specified by 16 x 16 intra-picture prediction mode candidate specification information | △ | △→x | △→x |

INTRA-PICTURE PREDICTION CODING METHOD

BACKGROUND OF THE INVENTION (1) Field of the Invention

The present invention relates to an intra-picture prediction coding method, an intra-picture prediction coding apparatus and a program, for determining an intra-picture prediction mode and performing intra-picture prediction coding based on the determined prediction mode.

(2) Description of the Related Art

A product that performs picture coding such as a cell phone and a DVD recorder, in general, incorporates an apparatus for realizing picture coding by predicting pixels in a block per pixel block of m×n pixels (m and n are positive integers), then, coding the information related to the prediction method, and further coding difference information that is a difference image between a predictive image and an original image using a Discrete Cosine Transform (DCT) or the like. A picture coding apparatus usually includes an intra-picture prediction coding apparatus. Intra-picture prediction means to predict a predictive image for a prediction unit block of m×n pixels to be coded (to be referred to as "current block" hereinafter) using already-coded decoded pixels in a picture that includes a current block. The moving picture coding method such as MPEG-4 AVC provides plural number of prediction modes to be used for intra-picture prediction. In the intra-picture prediction coding, picture coding is realized by generating a predictive image for a prediction unit block of m×n pixels (m and n are positive integers) using a single intra-picture prediction mode, and coding a difference image between the predictive image and an input image as well as the information indicating the intra-picture prediction mode used for the generation of the predictive image. In the intra-picture prediction according to the MPEG-4 AVC, spatial prediction is performed using already-coded decoded pixels in the periphery of the current block so as to generate a predictive image for the current block.

Here is a brief but detailed description of intra-picture prediction modes. For example, the MPEG-4 AVC provides nine kinds of intra-prediction modes for luminous pixels in a 4×4 pixel block (see DRAFT ISO/IEC, 14496-10: 2002 (E), "Draft ITU-T Recommendation and Final Draft International Standard of Joint Video Specification", 2003.5.27, p. 97-102). In a DC prediction mode (prediction mode 2), as shown in FIG. 1C, predictive pixels for a current block of 4×4 pixels are generated by assigning an average value of the eight neighboring decoded pixels on left and above the current block to all the pixel values in the current block. In a horizontal direction prediction mode (prediction mode 1), as shown in FIG. 1B, predictive pixels of a current block of 4×4 pixels are generated based on the decoded pixels of four neighboring pixels on the left of the current block. In a vertical direction prediction mode (prediction mode 0), as shown in FIG. 1A, predictive pixels of a current block of 4×4 pixels are generated using the decoded pixels of four neighboring pixels above the current block. Besides, there are also the prediction modes of different directions: in direction from upper right to lower left (prediction modes 3 and 7) as shown in FIGS. 1D and 1H; in direction from upper left to lower right (prediction modes 4, 5, and 6) as shown in FIGS. 1E, 1F and 1G; in direction from lower left to upper right (prediction mode 8) as shown in FIG. 1I. Namely, a total of nine intra-picture prediction modes including eight prediction modes in eight directions and the DC prediction mode as described above are available.

The MPEG-4 AVC provides four intra-picture prediction modes to be used for luminous pixels in a 16×16 pixel block. In a vertical direction prediction mode (prediction mode 0), as shown in FIG. 2A, predictive pixels of a current block of 16×16 pixels are generated using the decoded pixels of sixteen neighboring pixels above the current block. In a horizontal direction prediction mode (prediction mode 1), as shown in FIG. 2B, predictive pixels of ga current block of 16×16 pixels are generated based on the decoded pixels of sixteen neighboring pixels on the left of the current block. In a DC prediction mode (prediction mode 2), as shown in FIG. 2C, predictive pixels of a current block of 16×16 pixels are generated by assigning an average value of thirty-two neighboring decoded pixels on left and above the current block to all the pixel values in the current block. In a planar prediction mode (prediction mode 3), as shown in FIG. 2D, predictive pixels of a current block of 16×16 pixels are generated based on the decoded pixels of thirty-two neighboring pixels on left and above the current block.

FIG. 3 is a block diagram showing the structure of the conventional intra-picture prediction coding apparatus 100. As shown in FIG. 3, the intra-picture prediction coding apparatus 100 is comprised of the following: an intra-picture prediction execution unit 101 that receives, as an input, an intra-picture prediction reference pixel group 162 that consists of coded pixels in a picture, that is, the pixels to be used for intra-picture prediction, and outputs an intra-picture predictive image 164 and an intra-picture prediction mode information 163; a prediction difference calculation unit 152 that receives, as inputs, an input image 161, the intra-picture predictive image 164 and the intra-picture prediction mode information 163, and outputs a prediction difference image 165; a coding efficiency evaluation unit 153 that receives, as an input, the prediction difference image 165, and outputs an evaluation value 166; an intra-picture prediction mode determination unit 154 that receives, as inputs, the intra-picture prediction mode information 163, the prediction difference image 165 and the evaluation value 166, and outputs a prediction difference image 168 and an intra-picture prediction mode information 167; and a coding unit 155 that receives, as inputs, the intra-picture prediction mode information 167 and the prediction difference image 168, and outputs a coded image 169.

The intra-picture prediction execution unit 101 performs intra-picture prediction on a predictive unit block of m×n pixels (m, n are positive integers) to be processed (to be referred to as "current block" hereinafter), using, one by one, each of the intra-picture prediction modes. That is to say that the intra-picture prediction execution unit 101 predicts the pixels of the current block based on the intra-picture prediction reference pixel group 162, and outputs the result as an intra-picture predictive image 164. The intra-picture prediction execution unit 101 also outputs, as the intra-picture prediction mode information 163, the information related to the prediction mode used for the generation of the intra-picture predictive image 164.

The prediction difference calculation unit 152 calculates a difference value per pixel between the intra-picture predictive image 164, which is predictively generated for the current block by the intra-picture prediction execution unit 101, and the image of the current block in the input image 161, and then, outputs the result as the prediction difference image 165.

The coding efficiency evaluation unit 153 calculates values, each of which indicates coding efficiency, based on the prediction difference image 165. For example, the coding efficiency evaluation unit 153 calculates a sum of absolute values of each of the pixel values in the prediction difference image 165, and outputs the result as the evaluation value 166. It should be noted that the coding efficiency evaluation unit 153 may calculate the evaluation value 166 with reference to the information other than the prediction difference image 165, e.g., the intra-picture prediction mode information based on the coded data of the neighboring coded blocks. In the case where the coding unit 155 employs the method of coding the difference between the intra-picture prediction mode of the neighboring coded block and the mode of the current block, it is possible to calculate the evaluation value 166 by further referring to the intra-picture prediction mode of the neighboring coded block.

The intra-picture prediction mode determination unit 154 outputs, as the intra-picture prediction mode information 167, the intra-picture prediction mode whose evaluation value 166 outputted by the coding efficiency evaluation unit 153 is the smallest among the intra-picture prediction modes sequentially attempted at certain intervals by the intra-picture prediction execution unit 101., The intra-picture prediction mode determination unit 154 also outputs, as the prediction difference image 168, the prediction difference calculated by using the intra-picture prediction mode based on which the smallest evaluation value 166 is obtained.

The coding unit 155 codes the prediction difference image 168 that is a result of the prediction using the determined intra-picture prediction mode, then, codes the intra-picture prediction mode information 167, and outputs the coded image 169.

FIG. 4 is a block diagram showing the structure of the intra-picture prediction execution unit 101. As shown in FIG. 4, the intra-picture prediction execution unit 101 includes a counter 102, an intra-picture prediction mode switching unit 252 and an intra-picture prediction unit 251, and sequentially executes intra-picture prediction at certain intervals using each of the intra-picture prediction modes. The counter 102 sequentially outputs, at certain intervals, the intra-picture prediction mode information 163 that specifies the intra-picture prediction mode to be executed. In this case, integer values ranged from "0" to "8" for uniquely specifying an intra-picture prediction mode are used as intra-picture prediction mode information. Therefore, the values from "0" to "8" are respectively outputted as the value of the intra-picture prediction mode information 163 by counting up the values. However, the count-up operation is executed only for one time after a prediction completion signal 256 changes from "0" to "1". The intra-picture prediction mode switching unit 252 instructs the intra-picture prediction unit 251 to switch the intra-picture prediction mode according to the value of the intra-picture prediction mode information 163. The intra-picture prediction unit 251 generates the intra-picture predictive image 164 for the current block using the intra-picture prediction reference image group 162, based on the intra-picture prediction mode instructed by the intra-picture prediction mode switching unit 252, and outputs it. The intra-picture prediction unit 251 also outputs the value "1" as the prediction completion signal 256, each time the generation of the intra-picture predictive image 164 based on one intra-picture prediction mode is completed.

FIG. 5 is a block diagram showing the structure of the prediction difference calculation unit 152. As shown in FIG. 5, the prediction difference calculation unit 152 includes a subtraction circuit 261, and outputs a difference image between the input image and the intra-picture predictive image. The subtraction circuit 261 calculates the difference between the input image 161 inputted and the intra-picture predictive image 164, and outputs the result of the calculation as the prediction difference image 165. That is to say, the subtraction circuit 261 outputs the prediction difference image 165 holding pixel values. Each of the pixel values indicates a difference between each of the pixel values in the intra-picture predictive image 164 and each of the corresponding pixel values in the input image 161.

FIG. 6 is a block diagram showing the structure of the coding efficiency evaluation unit 153. As shown in FIG. 6A, the coding efficiency evaluation unit 153 includes a multiplexer 271, a comparator 272, a switch 273, an adder 274 and a register 275, and outputs an evaluation value indicating coding efficiency based on the prediction difference image. The evaluation value 166 is a sum of absolute values of each of the pixels in the prediction difference image 165. The prediction difference image 165 is a value of each of the pixels sequentially outputted at certain intervals from the prediction difference calculation unit 152. The comparator 272 compares the prediction difference image 165 and a value "0", and an output 284 from the comparator 272 holds a value "1" in the case where the pixel value in the prediction difference image 165 indicates "0" or smaller, and holds the value "0" in the case where the pixel value in the prediction difference image 165 indicates a value greater than "0". The switch 273, as shown in FIG. 6B, switches between a value "a" and a value "b" which are inputted based on an inputted value "x", and outputs it as an output value "c". In this case, the output 284 from the comparator 272 controls the switch 273 while an output 280 from the switch 273 holds a value "−1" in the case where the output 284 of the comparator 272 indicates "1", and holds a value "1" in the case where the output 284 from the comparator 272 indicates "0". The multiplexer 271 multiplexes the prediction difference image 165 by the output 280 from the switch 273: As a result, an output 285 from the multiplexer 271 indicates a value equivalent to the absolute value of the prediction difference image 165. The adder 274 adds the output 285 from the multiplexer 271 and an output 282 from a delay device 275. While the first pixel in the unit block is processed, the output 282 from the delay device 275 is controlled to be "0" (not shown in the diagram). When the adder 274 processes the data, which is obtained by processing the first pixel in the prediction difference image 165, the evaluation value 166 holds, as an output, the absolute value of the first pixel in the prediction difference image 165. The delay device 275 delays the operation by one pixel. When the adder 274 processes the data obtained by processing the nth pixel in the prediction difference image 165, the evaluation value 166 indicates a value equivalent to a sum of absolute values for the pixel values of the first to the (n−1)th pixels in the prediction difference image 165. Therefore, the value of an output 281 from the adder 274 equals to a sum of the absolute values for the pixel values of the first to the n th pixels in the prediction difference image 165. Through the above processing, the sum of the absolute values for the prediction difference image 165 is eventually outputted as the evaluation value 166.

FIG. 7 is a block diagram showing the structure of the intra-picture prediction mode determination unit 154. As shown in FIG. 7, the intra-picture prediction mode determination unit 154 includes a prediction difference image storage memory 291, a comparator 292, a NOT circuit 293, and registers 294, 295. The intra-picture prediction mode determination unit 154 outputs the intra-picture prediction mode whose evaluation value is the smallest and the prediction difference image predicted using the intra-picture prediction mode based on which the smallest evaluation value is obtained. The evaluation value 166 and read data 302 are inputted to the comparator 292. The evaluation value 166 is written in the register 294 only when a write enable signal 301 indicates a value "1" while the value written in the register 294 is outputted to the read data 302 regardless of the value held by the write enable signal 301. In the register 294, a value greater than a maximum value that can be obtained as the evaluation value 166 is written beforehand as an initial state. The prediction mode information related to the intra-picture prediction mode to be attempted is sequentially inputted at certain intervals into the intra-picture prediction mode information 163, while the evaluation value resulted from the prediction based on each intra-picture prediction mode information 163 is sequentially inputted in the evaluation value 166 at certain intervals. In the case where the first evaluation value among the evaluation values thus sequentially inputted at certain intervals is given to the evaluation value 166, an output 303 from the comparator 292 indicates a value "0" since the evaluation value 166 indicates a value smaller than the value indicated in the read data 302, and the NOT circuit 293 sets the write enable signal 301 to "1". In the case where the write enable signal 301 indicates a value "1", the prediction difference image 165, which is the result of the prediction based on the intra-picture prediction mode information 163 at that time, is stored in the prediction difference image storage memory 291, and the value of the intra-picture prediction mode information 163 is written in the register 295. In the case where the k th evaluation value among the evaluation values sequentially inputted at certain intervals is given to the evaluation value 166, the smallest evaluation value among the first to the (k-1)th evaluation values sequentially inputted at certain intervals is outputted as the read data 302. The comparator 292 compares the read data 302 thus outputted and the k th evaluation value 166. In the case where the k th evaluation value 166 is smaller than the value indicated in the read data 302, the output 303 from the comparator 292 indicates a value "0". Here, the NOT circuit 293 sets the value of the write enable signal 301 to "1". In the case where the value of the write enable signal 301 indicates "1", the prediction difference image 165 resulted from the prediction based on the intra-picture prediction mode information 163 used at that time is stored into the prediction difference image storage memory 291, while the value of the intra-picture prediction mode information 163 is written in the register 295. In the case where the k th evaluation value 166 is equal to or greater than the value indicated in the read data 302, the output 303 from the comparator 292 indicates a value "1". Here, the NOT circuit 293 sets the value of the write enable signal 301 to "0", and new data is stored neither in the prediction difference image storage memory 291 nor in the register 295. Thus, the intra-picture prediction mode information corresponding to the intra-picture prediction mode whose evaluation value is the smallest, as a result of the processing related to the evaluation value 166 for all the intra-picture prediction modes attempted for the current block, is stored in the register 295, and then outputted as the intra-picture prediction mode information 167. The prediction difference image corresponding to the intra-picture prediction mode, based on which the smallest evaluation value is obtained, is stored in the prediction difference image storage memory 291, and the image data is outputted as the prediction difference image 168.

The coding unit 155 codes the intra-picture prediction mode information 167 and prediction difference image 168 which are inputted, and outputs the coded image 169. In the coding performed on the prediction difference image 168, quantization is performed after frequency transformation such as a DCT, and then, the quantized values are coded using variable length coding or arithmetic coding. As for the intra-picture prediction mode information 167, variable length coding or arithmetic coding is used.

FIG. 8 is a flowchart for explaining the intra-picture prediction coding method used by the intra-picture prediction coding apparatus 100. However, the chart shows the processing that is performed per prediction unit block.

A value greater than a maximum value that can be obtained as the evaluation value 166 is substituted beforehand in a variable "min_cost" (Step S11). Then, intra-picture prediction is performed sequentially starting from the intra-picture prediction mode whose "mode" indicates "0" (Step S12), regarding the intra-picture prediction mode information 163 as a "mode", and "predImg(mode)" that represents the intra-picture predictive image 164 is generated (Step S13). Next, "diffImg(mode)" that represents the prediction difference image 165 between the generated intra-picture predictive image "predImg(mode)" and the input image 161 is generated (Step S14). After that, "cost(mode)" that represents the evaluation value 166 obtained using the intra-picture prediction mode is then calculated based on the prediction difference image "diffImg(mode)" (Step S15). The "cost(mode)" resulted from the calculation is compared with a value "min_cost(mode)" (Step S16). In the case where the evaluation value "cost(mode)" is smaller (Yes in Step S16), the evaluation value "cost(mode)" is stored in the variable "min_cost" (Step S17), the prediction mode information "mode" is stored in a variable "best_mode" (Step S18), and the prediction difference image "diffImg(mode)" is stored in a variable "best_diffImg" (Step S19). A sequence of processing (Steps S13-S19) for generating the intra-picture predictive image "diffImg(mode)" is respectively performed for the modes from "0" to "8" (Step S12). Eventually, the "best_mode", which is the intra-picture prediction mode information 167 obtained by using the intra-picture prediction mode whose evaluation value 166 is the smallest, and the difference image between the image predicted based on the above-mentioned intra-picture prediction mode and the input image 161, namely, "best_diffImg" representing the prediction difference image 168, are coded, and the coded image 169 is generated (Step S20).

With the intra-picture prediction coding apparatus as described above, the cost of hardware or the amount of processing operated by software can be reduced, and in image quality can be improved due to enhancement of predictability.

SUMMARY OF THE INVENTION

The present invention is conceived in view of the above circumstances, and an object of the present invention is to provide the intra-picture prediction coding apparatus, the intra-picture prediction coding method and the program that can improve predictability while maintaining the cost of hardware and the amount of processing operated by software at the same level.

In order to achieve the above object, the intra-picture prediction coding method according to the present invention is an intra-picture prediction coding method comprising: determining, according to an amount of resources provided for intra-picture prediction coding, one or more intra-picture prediction method candidates that are candidates for an intra-picture prediction method for performing intra-picture prediction on a current block; executing intra-picture prediction on the current block using intra-picture prediction methods specified by the determined intra-picture prediction method candidates, and generating an intra-picture predictive image; generating a difference image between an input image that includes the current block, and the generated intra-picture predictive image, the difference image having difference values, each indicating a difference between each pixel in the input image and each pixel in the intra-picture predictive image, as each pixel value; calculating an evaluation value indicating coding efficiency, in the case where coding is performed based on the generated difference image using each intra-picture prediction method candidate based on which the difference image is generated; determining an intra-picture prediction method for coding the current block from among the intra-picture prediction method candidates, based on the evaluation values calculated for each of the intra-picture prediction method candidates; and coding intra-picture prediction method information indicating the determined intra-picture prediction method, and the difference image generated based on the intra-picture predictive image on which intra-picture prediction is performed using the determined intra-picture prediction method.

Thus, when intra-picture prediction method is determined, an intra-picture predictive image can be generated by performing intra-picture prediction using not all the intra-picture prediction methods, but only those of the intra-picture prediction method candidates. It is therefore possible to improve coding efficiency while maintaining a maximum value indicating a usable amount of resources per unit time, which consequently reduces a cost of hardware and an amount of processing operated by software.

It should be noted that the amount of resources provided for an intra-picture prediction coding apparatus may be, for example, a number of hardware cycles that is executable per prediction unit block or an amount of processing operated by software.

Here, the intra-picture prediction method is an intra-picture prediction mode indicating how to use decoded pixels in order to generate the intra-picture predictive image, the decoded pixels being adjacent to the current block and already coded, in the determination of said one or more intra-picture prediction method candidates, intra-picture prediction mode candidates are determined according to the amount of resources, and in the determination of the intra-picture prediction method, an intra-picture prediction mode for coding the current block is determined from among the intra-picture prediction mode candidates based on the evaluation value.

Thus, all needed is to generate an intra-picture predictive image by performing intra-picture prediction using only the intra-picture prediction modes among the intra-picture prediction mode candidates. It is therefore possible to improve coding efficiency while maintaining a maximum value indicating a usable amount of resources per unit time, which consequently reduces a cost of hardware and an amount of processing operated by software.

The intra-picture prediction method is an intra-picture prediction unit that is a block size of the current block, and in the determination of said one or more intra-picture prediction method candidates, intra-picture prediction unit candidates are determined according to the amount of resources, and in the determination of the intra-picture prediction method, an intra-picture prediction unit is determined from among the intra-picture prediction unit candidates based on the evaluation value.

Thus, an intra-picture predictive image may be generated by performing intra-picture prediction using only the intra-picture prediction units in the intra-picture prediction unit candidates. Therefore, it is possible to improve coding efficiency while maintaining a maximum value indicating a usable amount of resources per unit time, which consequently reduces a cost of hardware and an amount of processing operated by software.

In the determination of said one or more intra-picture prediction method candidates, a method of determining the intra-picture prediction method candidates is selected from among a plurality of determination methods based on the amount of resources.

Thus, in the case where the amount of resources provided for the intra-picture prediction coding apparatus increases, it is possible to execute the intra-picture prediction mode candidate determination with a lot of processing amount in order to improve intra-picture predictability, which leads to the improvement of coding efficiency.

In the determination of said one or more intra-picture prediction method candidates, it is judged that the amount of resources increases as a product of a number of pixels in horizontal direction and a number of pixels in vertical direction of an input picture to be coded gets smaller, and the intra-picture prediction method candidates are determined according to the product.

Thus, in the case where the size of a coded image gets smaller, it is possible to improve coding efficiency by increasing the number of intra-picture prediction method candidates with the view to enhance intra-picture predictability.

In the determination of said one or more intra-picture prediction method candidates, it is judged that the amount of resources increases as a number of frames or fields to be coded per unit time for an input picture to be coded gets smaller, and the intra-picture prediction method candidates are determined according to the number of frames or fields.

Thus, in the case where the frame rate of the input image to be coded is low, it is possible to improve coding efficiency by increasing the number of intra-picture prediction method candidates with the view to enhance intra-picture predictability.

In the determination of said one or more intra-picture prediction method candidates, it is judged that the amount of resources for picture prediction types provided for the input picture to be coded increases in the following order: a prediction type B of performing inter-picture prediction for generating a predictive image with reference to one or more pictures; a prediction type P of performing inter-picture prediction for generating a predictive image with reference to one picture; and a prediction type I of not performing inter-picture prediction, and the intra-picture prediction method candidates are determined based on the picture prediction type.

Thus, it is possible to enhance coding efficiency by gradually increasing the number of intra-picture prediction method candidates for prediction types B, P and I in this order so that intra-picture predictability is improved.

The present invention can be realized not only as such intra-picture prediction coding method, but also as the intra-picture prediction coding apparatus that includes the characteristic steps included in the intra-picture prediction coding method as units and even as a program that causes a computer to execute these steps. Such program can be surely distributed via a recording medium such as a CD-ROM or a transmission medium such as the Internet.

As described above, with the intra-picture prediction coding method according to the present invention, it is possible to improve coding efficiency in the intra-picture prediction coding while maintaining a maximum value indicating a usable amount of resources per unit time so as to reduce the amount of processing operated by software.

FURTHER INFORMATION ABOUT TECHNICAL BACKGROUND TO THIS APPLICATION

The disclosure of Japanese Patent Application No. 2003-367091 filed on Oct. 28, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a block diagram showing a structure of an intra-picture prediction mode determination unit;

FIG. 10 is a block diagram showing a structure of the intra-picture prediction mode candidate determination unit according to the first embodiment;

FIG. 26A shows an example of predictive pixels while

FIGS. 30A to 30F respectively shows an example of the numbers of prediction mode candidates specified by prediction mode candidate specification information;

FIGS. 31A to 31D respectively shows an example of the numbers of prediction mode candidates specified by the prediction mode candidate specification information;

FIG. 32A shows an example of a physical format of a flexible disk as a main body of the recording medium; FIG. 32B shows a full appearance of the flexible disk, its structure at cross section, and a full appearance of the flexible disk per se; and FIG. 32C shows a structure for writing and reading the program on the flexible disk FD.

DESCRIPTION OF THE PREFERRED EMBODIMENT(S)

The following describes the embodiments of the present invention with reference to the diagrams.

First Embodiment

Figure 1:
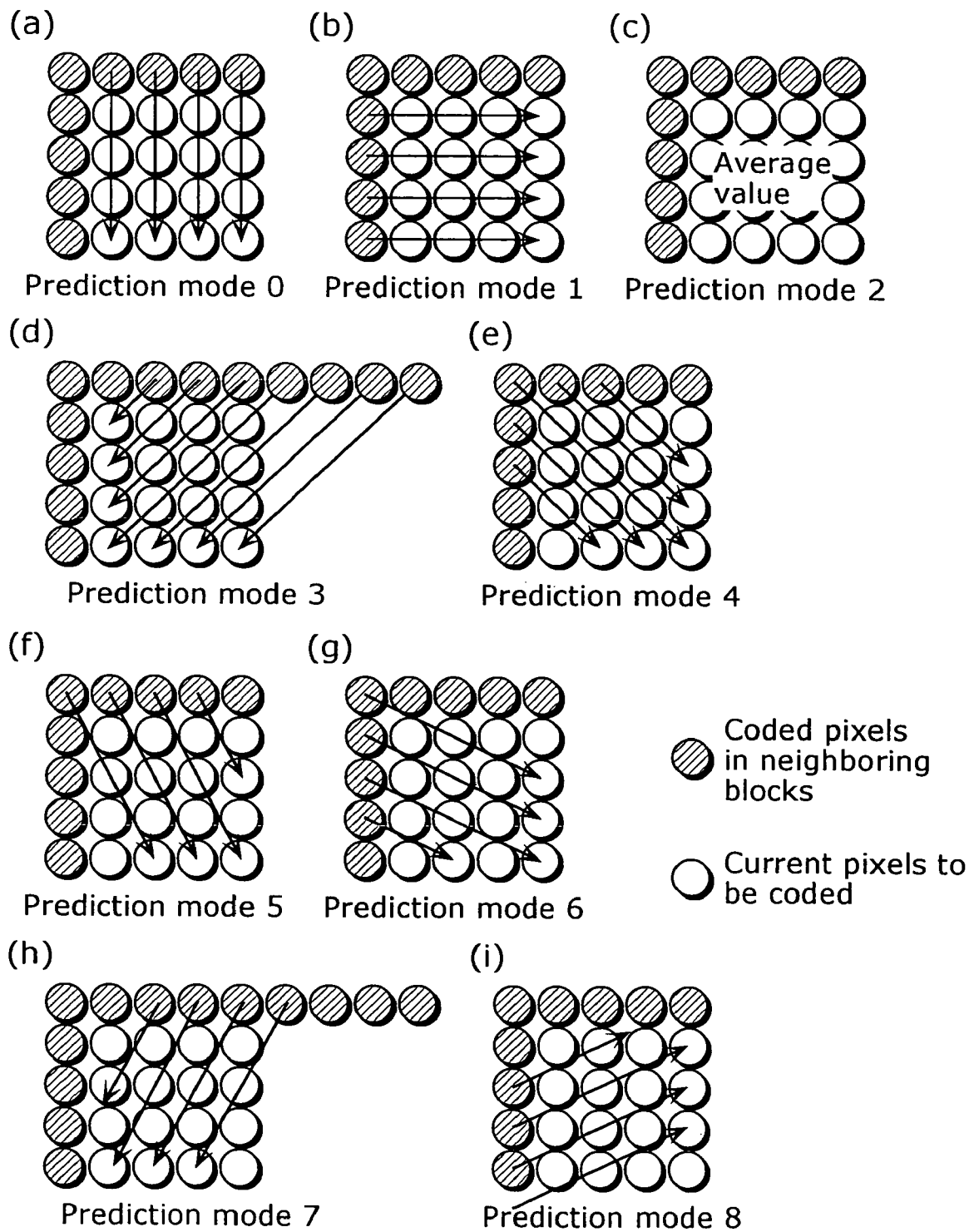
FIG. 1 is a diagram showing prediction modes for a 4×4 intra-picture prediction.
Figure 2:
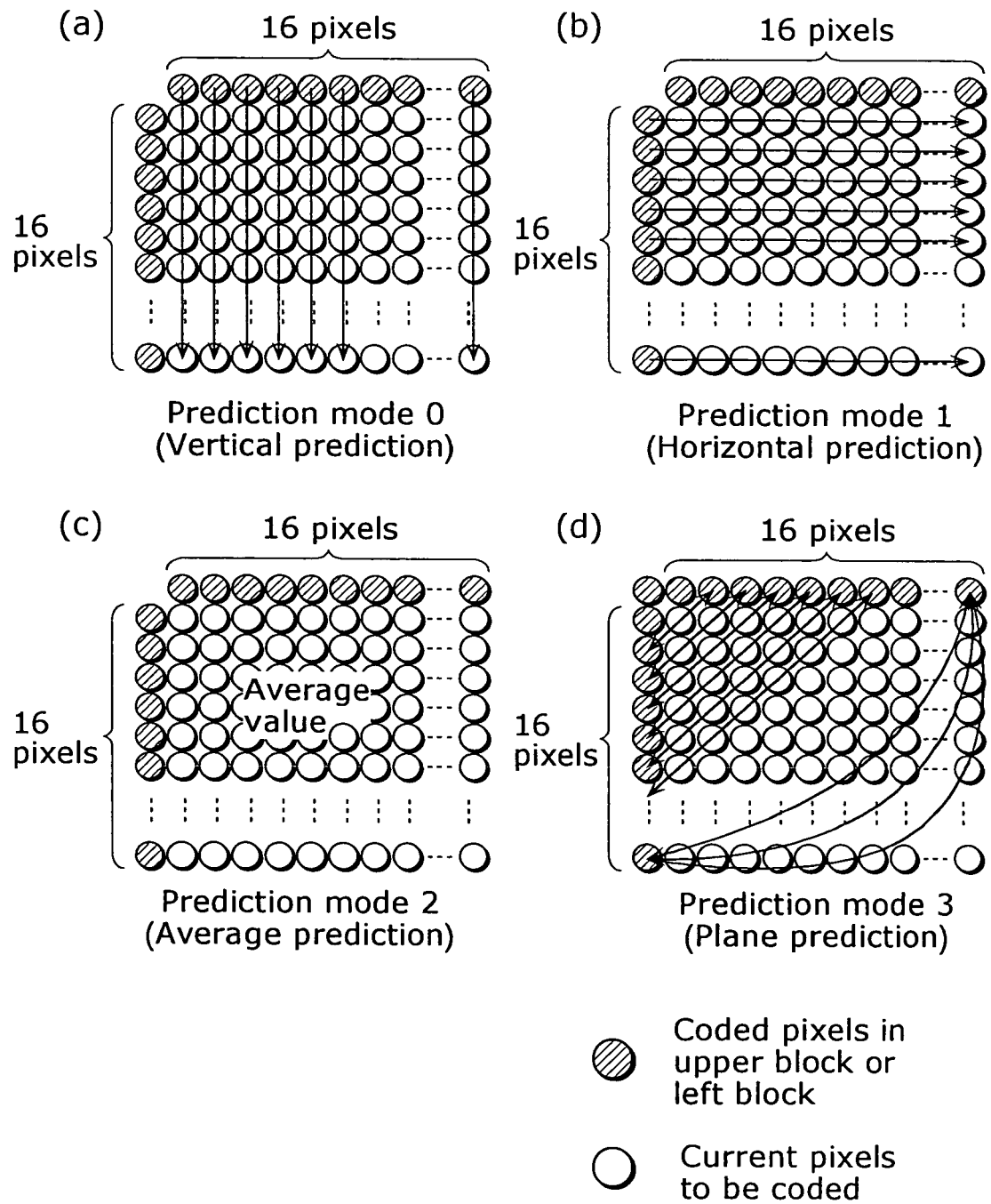
FIG. 2 is a diagram showing prediction modes for a 16×16 intra-picture prediction.
Figure 3:
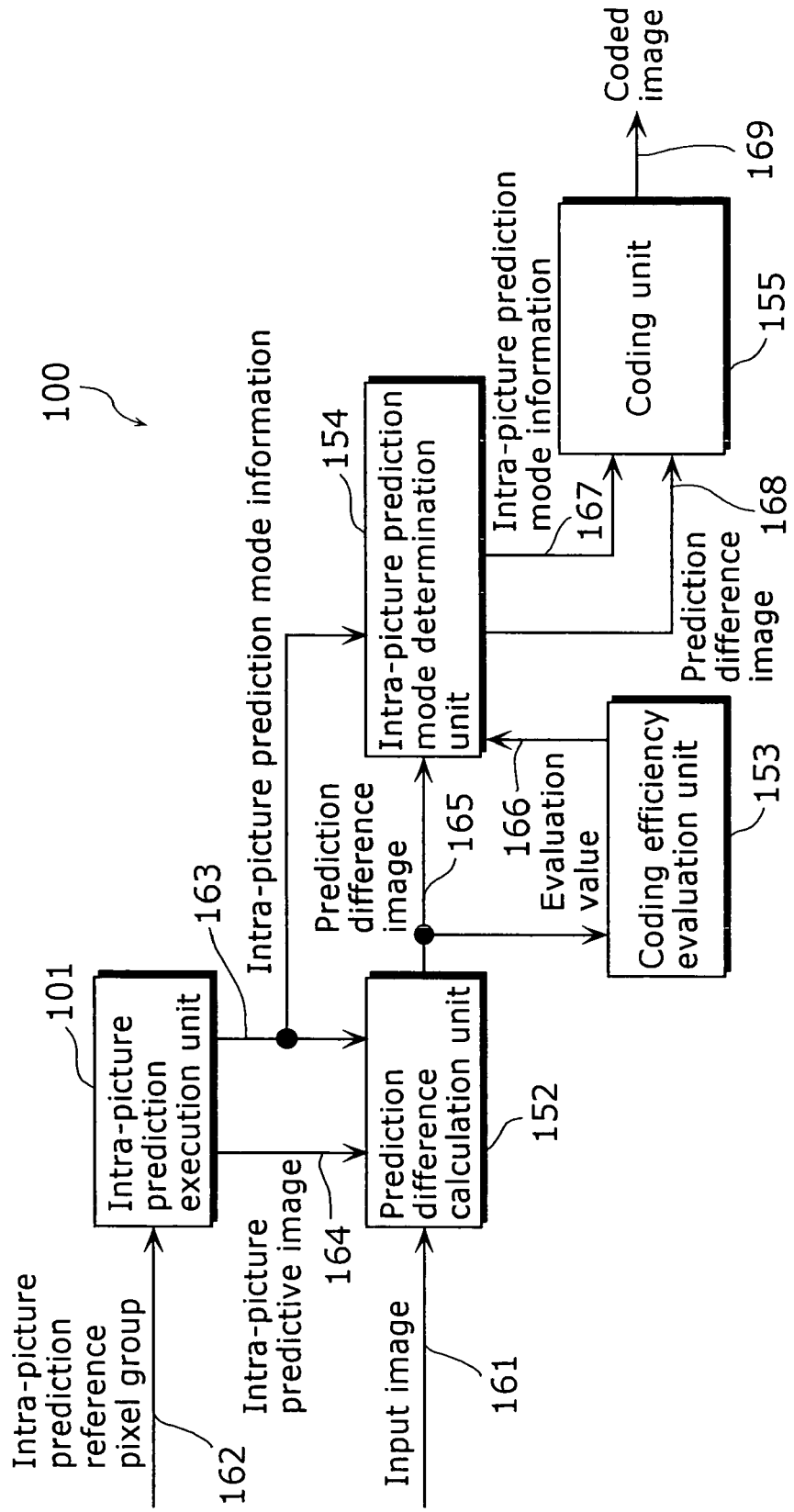
FIG. 3 is a block diagram showing a structure of the conventional intra-picture prediction coding apparatus 100.
Figure 4:
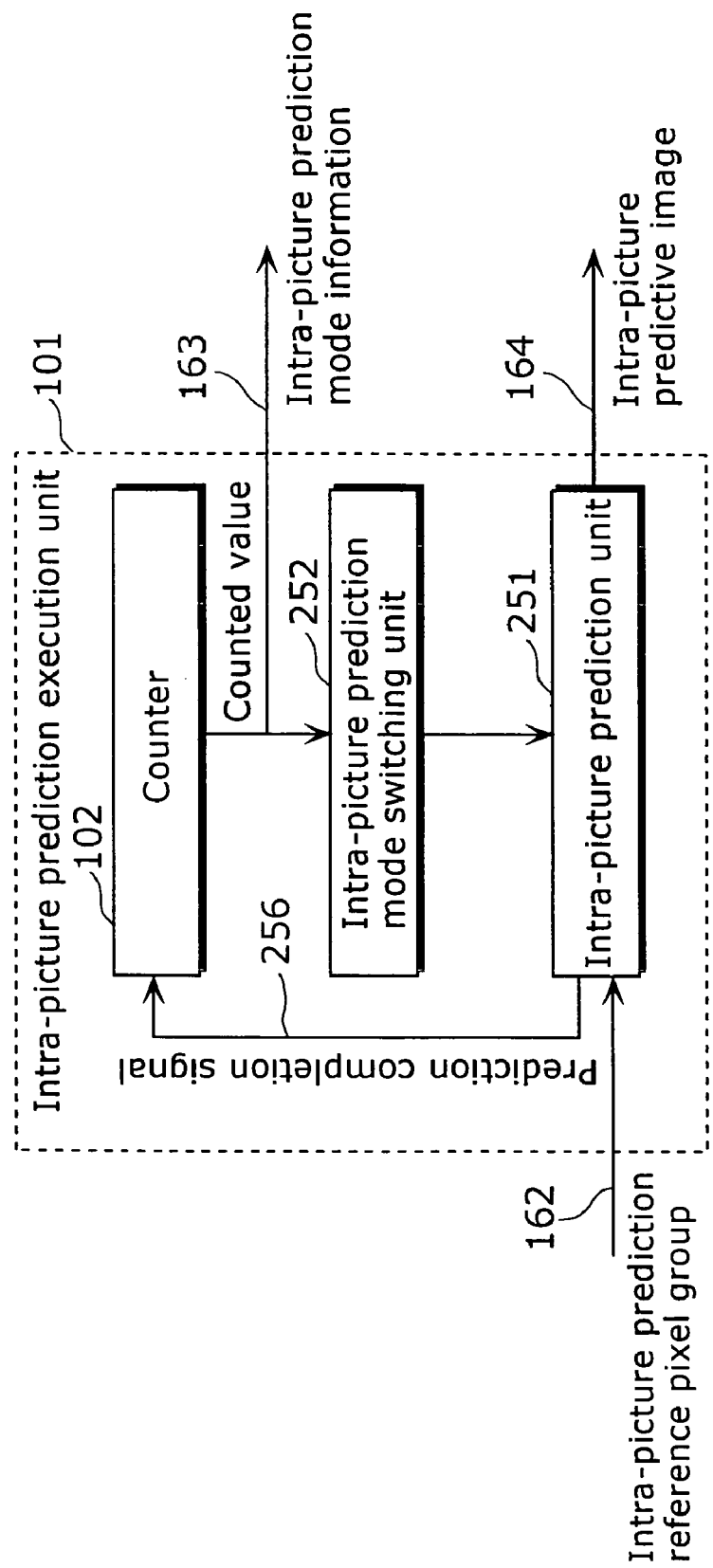
FIG. 4 is a block diagram showing a structure of a intra-picture prediction execution unit.
Figure 5:
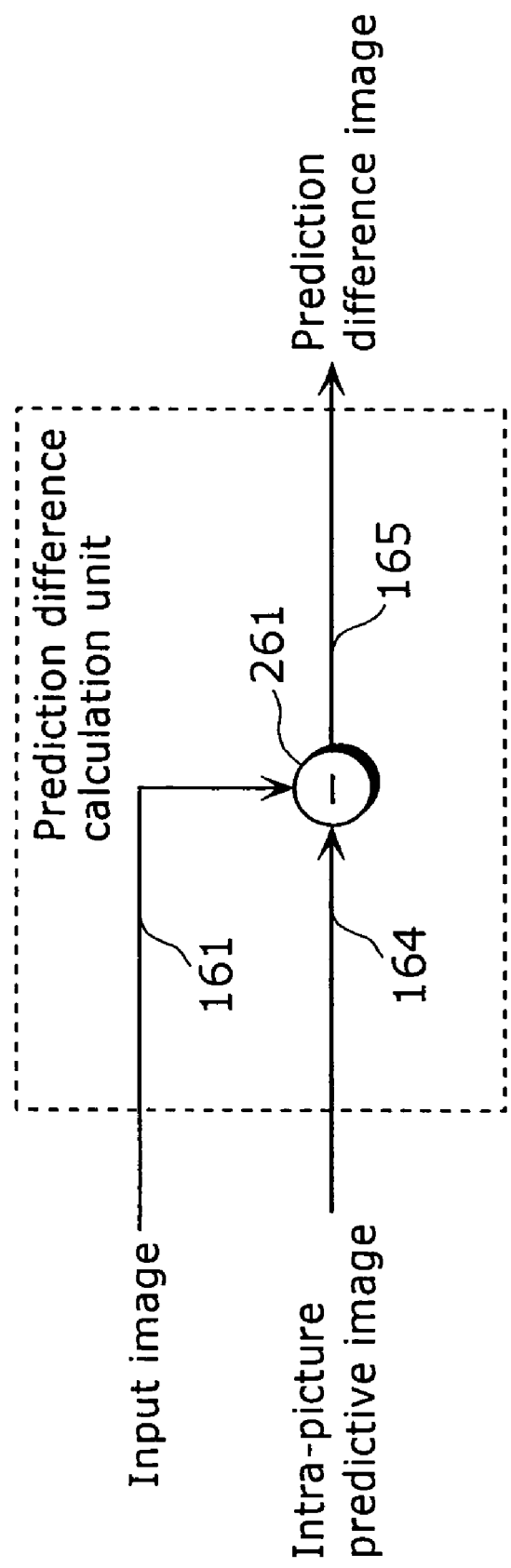
FIG. 5 is a block diagram showing a structure of a prediction difference calculation unit.
Figure 6A:
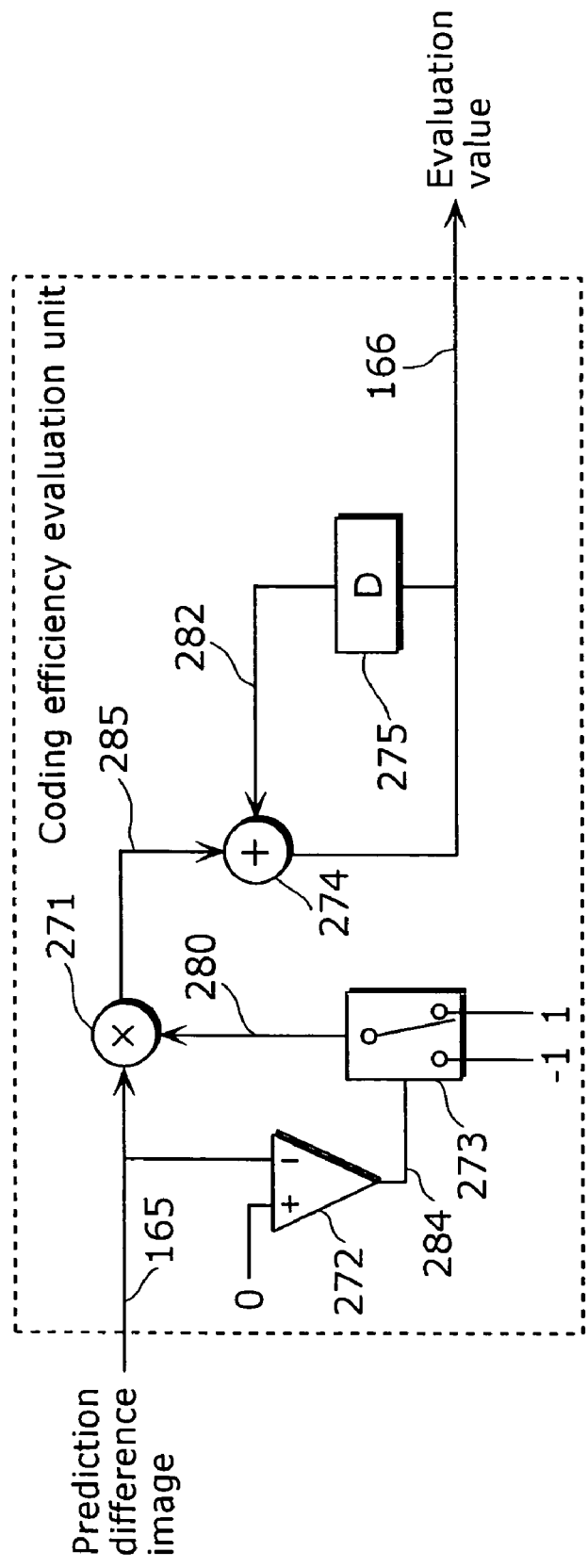
FIG. 6 is a block diagram showing a structure of a coding efficiency evaluation unit.
Figure 6B:
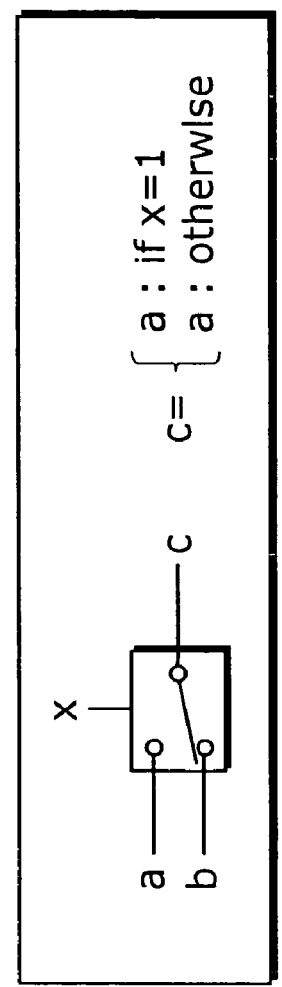
Figure 8:
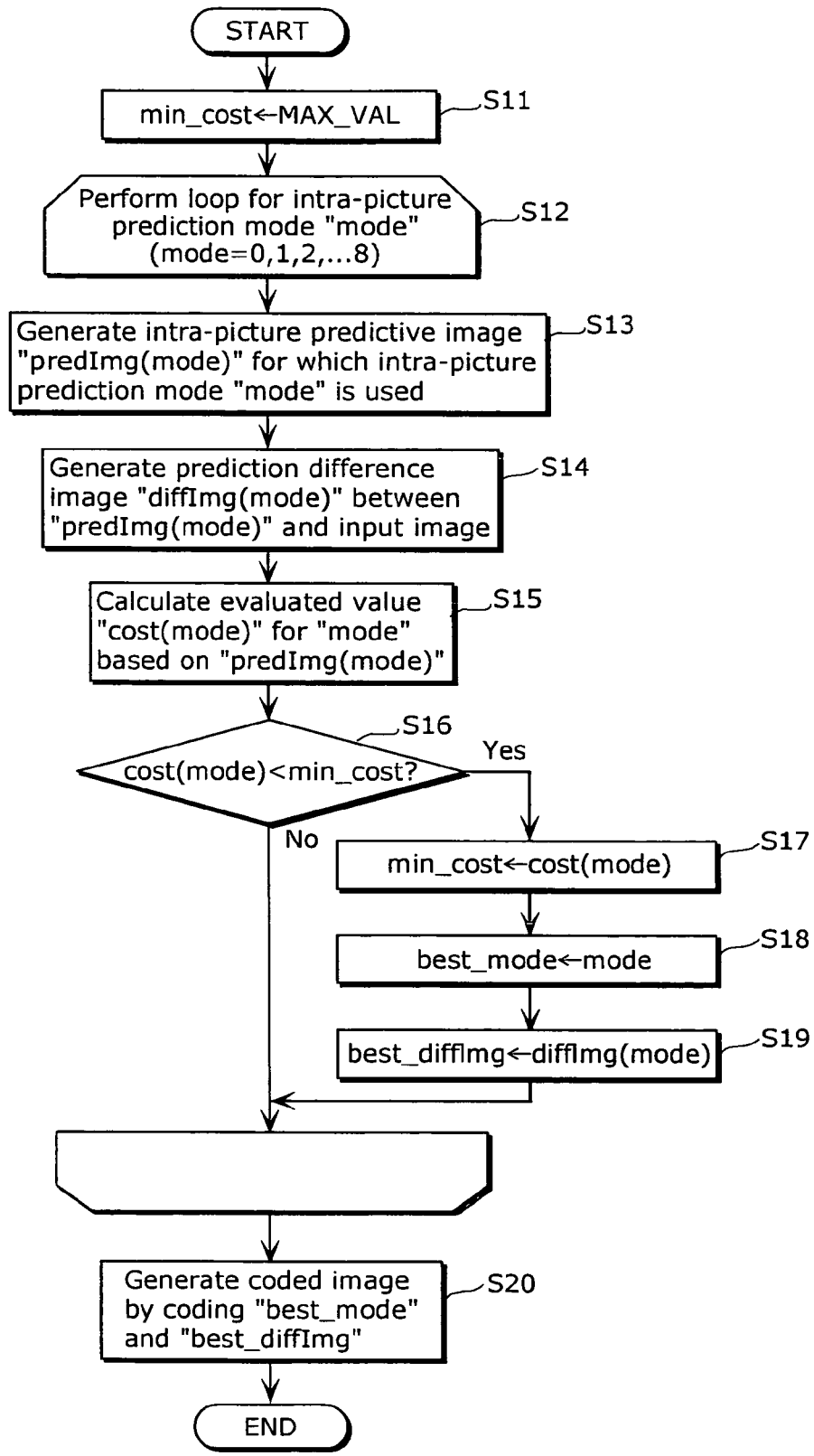
FIG. 8 is a flowchart for explaining the intra-picture prediction coding method employed by the conventional intra-picture prediction coding apparatus.
Figure 9:
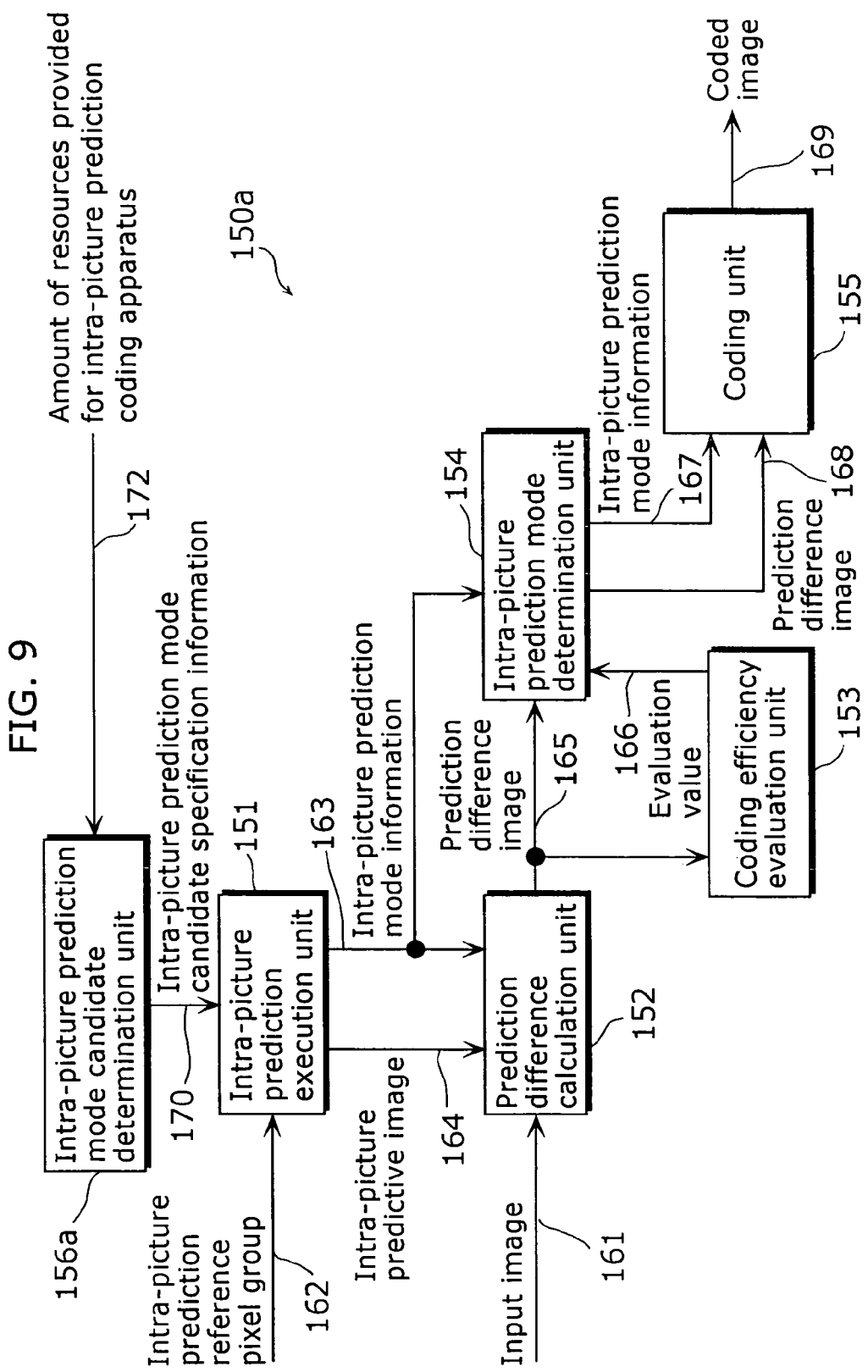
FIG. 9 is a block diagram showing a structure of the intra-picture prediction coding apparatus according to a first embodiment of the present invention.

FIG. 9 is a block diagram showing the structure of the intra-picture prediction coding apparatus according to the first embodiment of the present invention. The intra-picture prediction coding apparatus 150a according to the present embodiment is characteristic in that the apparatus switches between the methods for determining intra-picture prediction mode candidates based on an amount of resources that is provided to the apparatus.

As shown in FIG. 9, the intra-picture prediction coding apparatus 150a is comprised of the following: an intra-picture prediction mode candidate determination unit 156a that specifies the intra-picture prediction mode candidate(s) to be attempted as intra-picture prediction mode candidate specification information 170, based on an amount of resources 172 provided for the intra-picture prediction coding apparatus; an intra-picture prediction execution unit 151 which receives, as an input, an intra-picture prediction reference pixel group 162 that is regarded as the coded pixels in a single picture, and outputs an intra-picture predictive image 164 and intra-picture prediction mode information 163; a prediction difference calculation unit 152 which receives, as inputs, an input image 161, the intra-picture predictive image 164, and the intra-picture prediction mode information 163, and outputs a prediction difference image 165; a coding efficiency evaluation unit 153 which receives, as an input, the prediction difference image 165, and outputs an evaluation value 166; an intra-picture prediction mode determination unit 154 which receives, as inputs, the intra-picture prediction mode information 163, the intra-picture prediction difference image 165, and the evaluation value 166, and outputs a prediction difference image 168 and intra-picture prediction mode information 167; and a coding unit 155 which receives, as inputs, the intra-picture prediction mode information 167 and the prediction difference image 168, and outputs a coded image 169.

The intra-picture prediction mode candidate determination unit 156a specifies the intra-picture prediction mode candidate(s) to be attempted so that an intra-picture prediction mode is determined, as the intra-picture prediction mode candidate specification information 170. The intra-picture prediction mode candidate determination unit 156a, in this case, determines by switching between the methods for determining an intra-picture prediction mode candidate based on the amount of resources 172 provided for the intra-picture prediction coding apparatus.

FIG. 10 is a block diagram showing the structure of the intra-picture prediction mode candidate determination unit 156a. As shown in FIG. 10A, the intra-picture prediction mode candidate determination unit 156a includes comparators 180a, 180b, logic gates 181a, 181b as well as mode candidate determination units 182a to 182c, and determines the candidate for the intra-picture prediction mode to be attempted, according to the amount of resources given to the intra-picture prediction coding apparatus. As shown in FIG. 10B, the comparators 180a and 180b compare between values "a" and "b" that are inputted, and outputs "1" in the case where the value "a" is equal to or less than the value "b" but outputs "0" in other cases. Here, the comparator 180a outputs "1" in the case where the amount of resources 172, which is inputted to be provided for the intra-picture prediction coding apparatus, is equal to or less than a threshold TH1, but outputs "0" in the case where it is greater than the threshold TH1. Here, the threshold TH1 is assumed to be less than the threshold TH2. The logic gates 181a, 181b and the comparator 180a generate operation enable signals 185a to 185c for switching between the mode candidate determination units 182a to 182c.

The operation enable signal 185a holds the value "1" in the case where the amount of resources 172 given to the intra-picture prediction coding apparatus is equal to or less than the threshold TH1, and holds the value "0" in other cases. In the case where the operation enable signal 185a indicates the value "1", the mode candidate determination unit 182a is enabled. Then, the mode candidate determination unit 182a determines an intra-picture prediction mode candidate, and outputs it as the intra-picture prediction mode candidate specification information 170.

In the case where the amount of resources 172 is greater than the threshold TH1 and is equal to or less than the threshold TH2, the operation enable signal 185b holds the value "1", but in other cases, holds the value "0". In the case where the operation enable signal 185b indicates the value "1", the mode candidate determination unit 182b is enabled. Then, the mode candidate determination unit 182b determines intra-picture prediction mode candidates and outputs them as the intra-picture prediction mode candidate specification information 170.

The operation enable signal 185c holds the value "1" in the case where the amount of resources 172 is greater than the threshold TH2, and holds the value "0" in other cases. In the case where the operation enable signal 185c indicates the value "1", the mode candidate determination unit 182c is enabled. Then, the mode candidate determination unit 182c determines intra-picture prediction mode candidates and outputs them as the intra-picture prediction candidate specification information 170.

Here, the mode candidate determination unit 182a easily determines an intra-picture prediction mode candidate without requiring a lot of amount of resources. The mode candidate determination unit 182b can determine the intra-picture prediction mode candidate with much higher precision although it requires the amount of resources more than the mode candidate determination unit 182a. The mode candidate determination unit 182c can determine the intra-picture prediction mode with much higher precision although it requires the amount of resources further more than the mode candidate determination unit 182b. It should be noted that the amount of resources may be, for instance, the number of cycles processed by hardware or an amount of processing operated by software. A required amount of resources means the amount of resources required by not only the mode candidate determination unit but the intra-picture prediction coding apparatus 150a as a whole per prediction unit block. The candidate determination method with higher precision is usually referred to the case where the coding efficiency is higher when performing coding using the intra-picture prediction mode with the highest coding efficiency among the determined candidates.

The following shows an example for the case of each of the mode candidate determination units 182a-182c. The mode candidate determination unit 182a always uses only a DC prediction mode as an intra-picture prediction mode candidate. The mode candidate determination unit 182b extracts an edge direction of the image within the current block, and determines one intra-picture prediction mode with a direction of prediction that is similar to the edge direction, and the DC prediction mode, as candidates. The mode candidate determination unit 182c extracts the pixels in the edge direction of the image within the current block, and determines three intra-picture prediction modes with a direction of prediction that is similar to the edge direction, and the DC prediction mode, as candidates. The reason for selecting the intra-picture prediction mode having the direction of prediction similar to the edge direction of the image is that the direction paralleled to the edge direction allows the prediction with a strong correlation between pixels and a high precision. It should be noted that any method may be used as the method of detection in the edge direction. For example, a degree of edge in horizontal or vertical direction may be calculated using a well-known Sobel filter.

Thus, in the case where the amount of resources provided for the intra-picture prediction coding apparatus increases, such Soble filter is effective in switching between the mode candidate determination units so that the intra-picture prediction with higher coding efficiency can be achieved.

The intra-picture prediction execution unit 151 sequentially executes intra-picture prediction at certain intervals using each of the intra-picture prediction mode candidates specified by the intra-picture prediction mode candidate specification information 170. That is to say that the intra-picture prediction execution unit 151 performs intra-picture prediction on the pixels in the current block based on the intra-picture prediction reference pixel group 162 using each intra-picture prediction mode, and outputs the predictive image as the intra-picture prediction image 164. The intra-picture prediction execution unit 151 also outputs the information related to the prediction mode used for the generation of the intra-picture prediction image 164 as the intra-picture prediction mode information 163.

Figure 11:
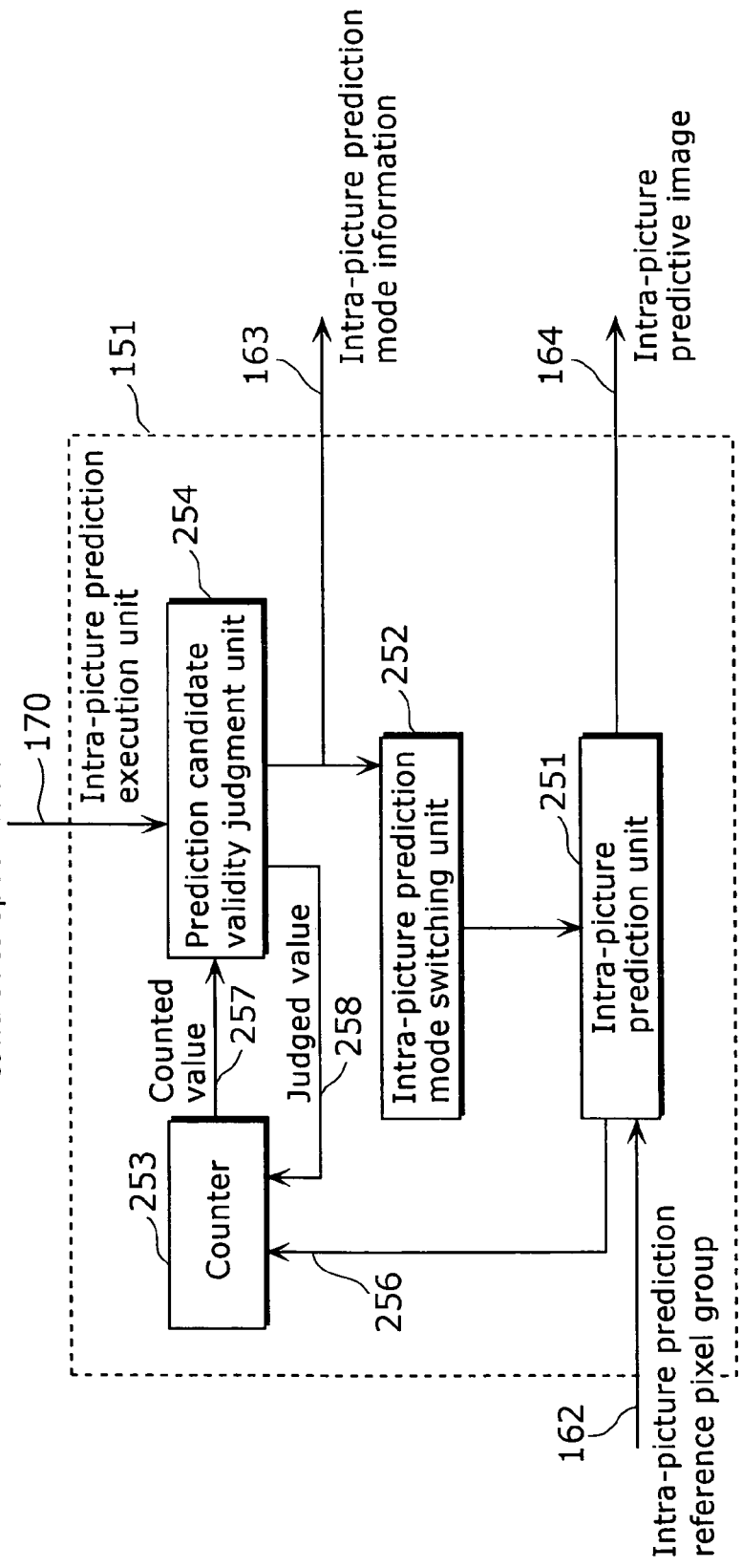
FIG. 11 is a block diagram showing a structure of the intra-picture prediction execution unit according to the first embodiment.

FIG. 11 is a block diagram showing the structure of the intra-picture prediction executing unit 151. As shown in FIG. 11, the intra-picture prediction execution unit 151 includes a counter 253, an intra-picture prediction mode switching unit 252, an intra-picture prediction unit 251 and a prediction candidate validity judgment unit 254, and sequentially executes intra-picture prediction at certain intervals using each of the specified intra-picture prediction mode candidates. The counter 253 sequentially outputs the values ranged from "0" to "8" as a count value output 257. The operation of counting up the count value output 257 is executed only for one time after either a prediction completion signal 256 or a judged value 258 changes from the value "0" to the value "1". In the case where the intra-picture prediction mode candidate indicated by the intra-picture prediction mode candidate specification information 170 includes the intra-picture prediction mode having the value indicated by the count value output 257 as the intra-picture prediction mode information, the prediction candidate validity judgment unit 254 outputs the value "0" as the judged value 258 and outputs the value of the count value output 257 as the intra-picture prediction mode information 163. In other cases, the prediction candidate validity judgment unit 254 outputs the value "1" as the judged value, and does not update the value of the intra-picture prediction mode information 163. The processing performed by the intra-picture prediction mode switching unit 252 and the intra-picture prediction unit 251 are as described in the Background Art.

It should be noted that intra-picture prediction may not be performed in the case where it is impossible to use necessary reference pixels, that is, in the case where a part of or a whole of the intra-picture prediction reference pixel group 162 cannot be used for reference (e.g., in the case where the current block is situated at the corner of the image and no reference pixels are found or in the case where the reference pixels are not yet coded due to the coding order).

The prediction difference calculation unit 152, the coding efficiency evaluation unit 153, the intra-picture prediction mode determination unit 154 and the coding unit 155 are as described in the Background Art.

Figure 12:
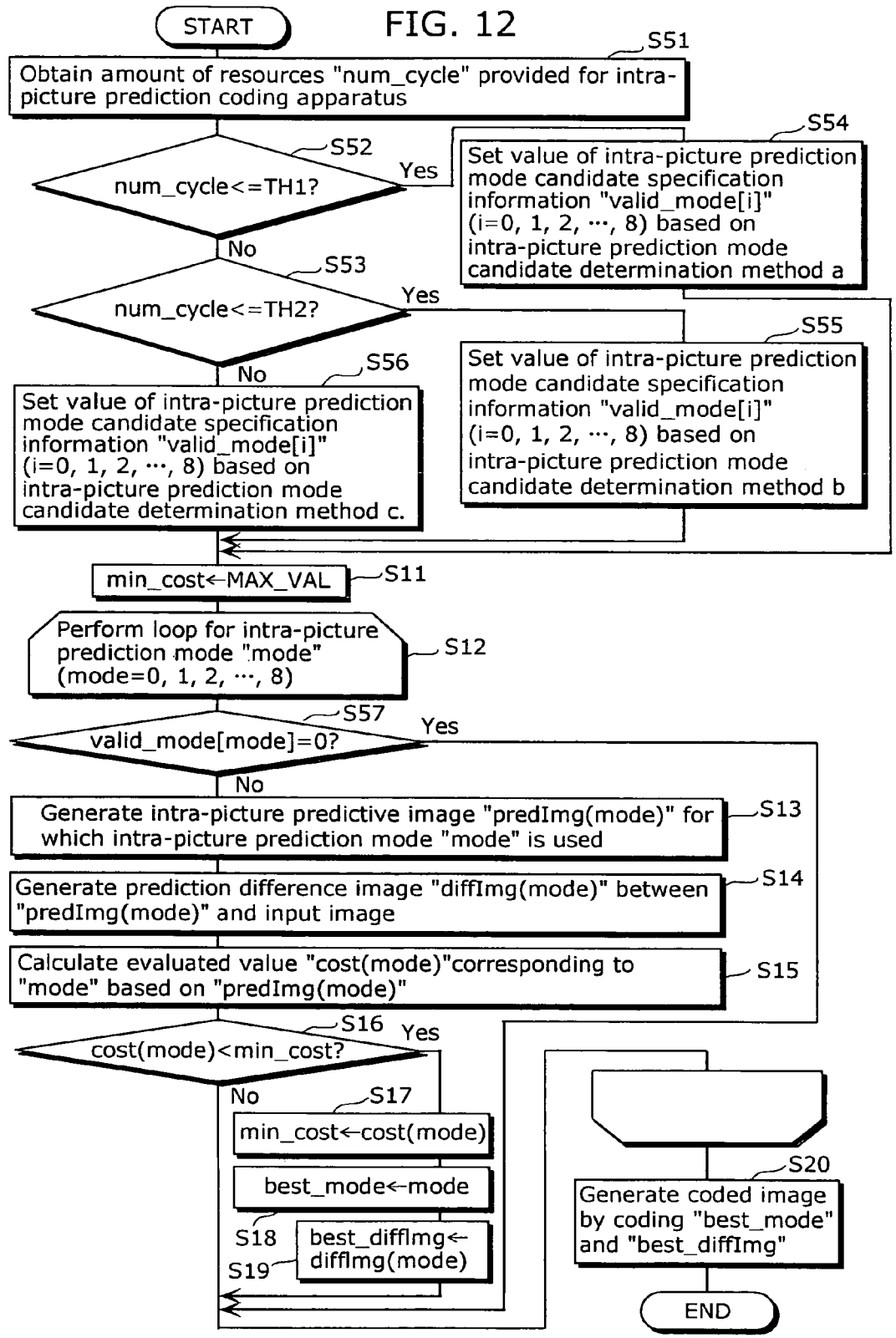
FIG. 12 is a flowchart for explaining the intra-picture prediction coding method employed by the intra-picture prediction coding apparatus according to the first embodiment.

FIG. 12 is a flowchart for explaining the intra-picture prediction coding method employed by the intra-picture prediction coding apparatus 150a. However, the chart shows the processing that is performed per prediction unit block.

Firstly, the "num_cycle" is obtained as the amount of resources 172 that is given to the intra-picture prediction coding apparatus (Step S51). Then, the amount of resources "num_cycle" and the threshold TH1 are compared (Step S52). In the case where the amount of resources "num_cycle" is equal to or less than the threshold TH1, (Yes in Step S52), a value for the "valid_mode[i]" (i=0, 1, ..., 8) as the intra-picture prediction mode candidate specification information 170 is set based on the intra-picture prediction mode candidate determination method a (Step S54). Namely, the mode candidate determination unit 182a sets the intra-picture prediction mode candidate specification information "valid_mode[i]". Here, "i" represents each intra-picture prediction mode. For example, the intra-picture prediction mode candidate specification information "valid_mode[0]" indicates whether or not the intra-picture prediction mode whose intra-picture prediction mode information indicates a value "0" is an intra-picture prediction mode candidate. In the case where the intra-picture prediction mode candidate specification information "valid_mode[0]" indicates the value "0", it shows that the prediction mode is not an intra-picture prediction mode candidate. In the case where the intra-picture prediction mode candidate specification information "valid_mode[0]" indicates a value "1", it shows that the prediction mode is an intra-picture prediction mode candidate. In the case where the amount of resources "num_cycle" is greater than the threshold TH1 (No in Step S52), the amount of resources "num cycle" and the threshold TH2 are compared (Step S53). In the case where the amount of resources "num_cycle" is equal to or less than the threshold TH2 (Yes in Step S53), a value of the intra-picture prediction mode candidate specification information "valid_mode[i]" (i=0, 1, ..., 8) is set based on the intra-picture prediction mode candidate determination method b (Step 55). That is to say that the mode candidate determination unit 182b sets the intra-picture prediction mode candidate specification information "valid_mode[i]". In the case where the amount of resources "num_cycle" is greater than the threshold TH2 (No in Step S53), the value of the intra-picture prediction mode candidate specification information "valid_mode[i]" is set based on the intra-picture prediction mode candidate determination method c (Step S56). That is to say, the mode candidate determination unit 182c sets the intra-picture prediction mode candidate specification information "valid_mode[i]".

Thus, a value of the "valid_mode[i]" (i=0, 1, ..., 8) as the intra-picture prediction mode candidate specification information 170 is set beforehand, and in addition, a value greater than the maximum value that can be obtained as the evaluation value 166 is substituted in advance in a variable "min_cost" (Step S11). Then, a sequence of processing (Steps S13-S19), including a processing of generating an intra-picture predictive image "predImg(mode)" and the processing thereafter, is sequentially executed for the modes 0 to 8, where the intra-picture prediction mode information 163 is regarded as a "mode" (Step 512). In the case where the intra-picture prediction mode candidate specification information "valid_mode[i]" indicates a value "0", the sequence of processing (Steps S13-S19) is skipped over (Step S57). After performing the sequence of processing for each of the modes 0 to 8, a coded image 169 is generated (Step S20). It should be noted that the sequence of processing for generating the intra-picture prediction image "predImg(mode)" (Steps S13-S20) is as described in the Background Art. The coding processing (Step S20) may be executed for one time after obtaining the intra-picture prediction mode information "best_mode" indicating the intra-picture prediction mode whose evaluation value 166 is the smallest and the prediction difference image "best_diffImg" which are obtained on a basis of a group of prediction unit blocks, instead of a prediction unit block, as a unit.

It should be noted that the intra-picture prediction coding method as described above can be realized as a program using a computer.

Thus, in the case where the amount of resources provided for the intra-picture prediction coding apparatus increases, the method of determining intra-picture prediction mode candidates is switched so that the intra-picture prediction coding which allows higher coding efficiency and requires much more amount of resources may be performed. In this way, it is possible to improve coding efficiency while maintaining a maximum value indicating a usable amount of resources per unit time so as to reduce the cost of hardware and the amount of processing operated by software.

Second Embodiment

Figure 13:
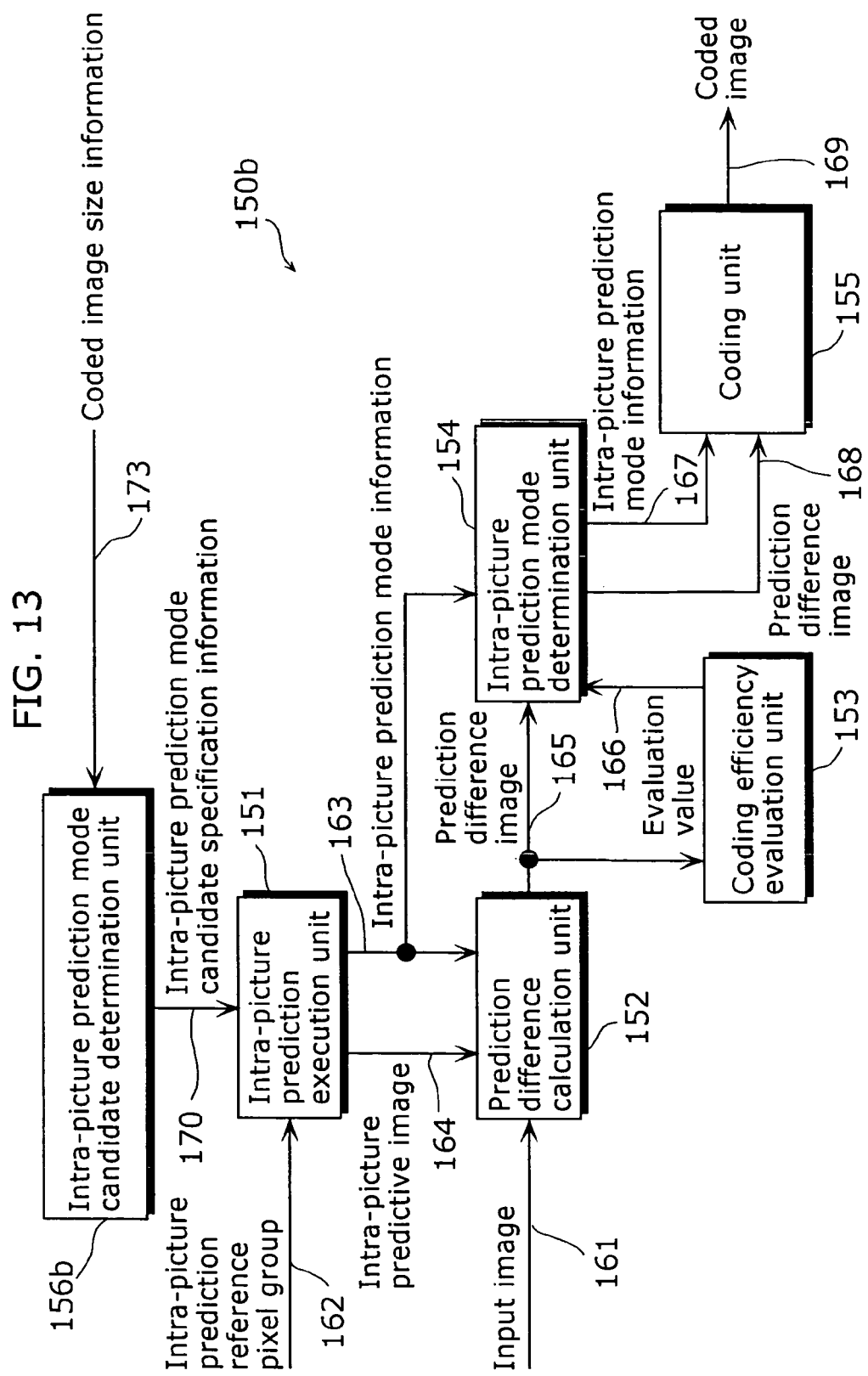
FIG. 13 is a block diagram showing a structure of the intra-picture prediction apparatus according to a second embodiment of the present invention.

FIG. 13 is a block diagram showing the structure of the intra-picture prediction coding apparatus according to the second embodiment of the present invention. The intra-picture prediction coding apparatus 150b according to the present embodiment is characteristic in that it switches between the methods of determining intra-picture prediction mode candidates, based on coded image size information.

As shown in FIG. 13, the intra-picture prediction coding apparatus 150b is comprised of the following: an intra-picture prediction mode candidate determination unit 156b which specifies the intra-picture prediction mode candidate(s) to be attempted as the intra-picture prediction mode candidate specification information 170, based on a coded image size information 173; the intra-picture prediction execution unit 151 which receives, as an input, the intra-picture prediction reference pixel group that is regarded as the coded pixels in one picture, and outputs the intra-picture predictive image 164 and the intra-picture prediction mode information 163; the prediction difference calculation unit 152 which receives, as inputs, the input image 161, the intra-picture prediction image 164, and the intra-picture prediction mode information 163, and outputs the prediction difference image 165; the coding efficiency evaluation unit 153 which receives, as an input, the prediction difference image 165, and outputs the evaluation value 166; and the intra-picture prediction mode determination unit 154 which receives, as inputs, the intra-picture prediction mode information 163, the prediction difference image 165 and the evaluation value 166, and outputs the prediction difference image 168 and the intra-picture prediction mode information 167; and the coding unit 155 which receives, as inputs, the intra-picture prediction mode information 167 and the prediction difference image 168, and outputs the coded image 169.

The intra-picture prediction mode candidate determination unit 156b specifies the intra-picture prediction mode candidate(s) to be attempted as the intra-picture prediction mode candidate specification information 170 so that an intra-picture prediction mode is determined. Here, the intra-picture prediction mode candidate determination unit 156b determines intra-picture prediction mode candidates by switching the methods of determining intra-picture prediction mode candidates, based on the coded image size information 173. The coded image size information 173 is made by combining a coded image width value 173a and a coded image length value 173b.

Figure 14:
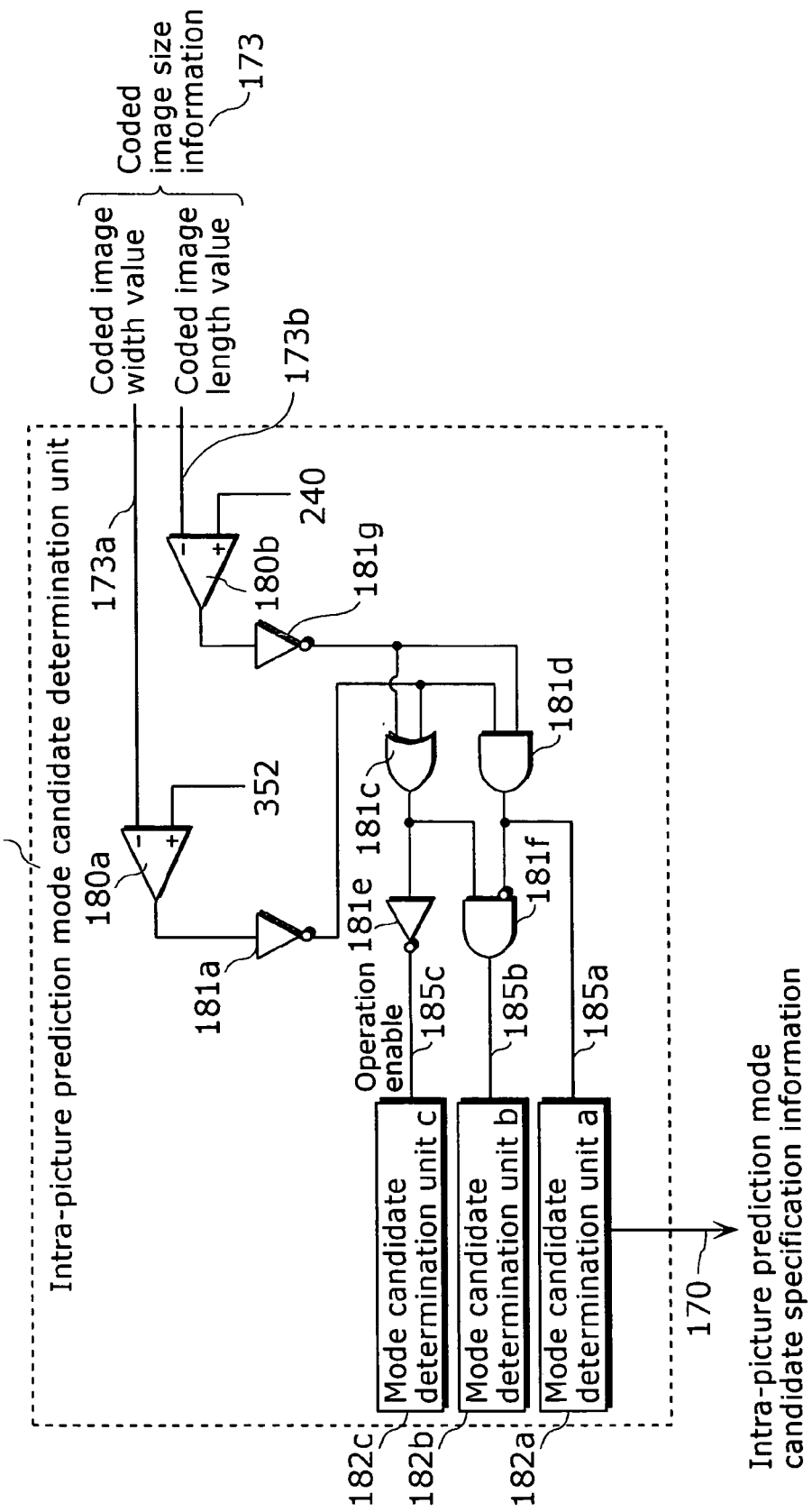
FIG. 14 is a block diagram showing a structure of the intra-picture prediction mode candidate determination unit according to the second embodiment.

FIG. 14 is a block diagram showing the structure of the intra-picture prediction mode candidate determination unit 156b. As shown in FIG. 14, the intra-picture prediction mode candidate determination unit 156b includes the comparators 180a, 180b, the logic gates 181a, 181c to 181g, as well as the mode candidate determination units 182a to 182c, and determines the intra-picture prediction mode candidate(s) to be attempted, according to the coded image size. In the case where the inputted coded image width value 173a is equal to or less than a value "352", the comparator 180a outputs a value "1", and in the case where it surpasses the value "352", the comparator 180a outputs a value "0". Similarly, in the case where the inputted coded image length value 173b is equal to or less than a value "240", the comparator 180b outputs a value "1", and in the case where it surpasses the value "240", the comparator 180b outputs a value "0". The logic gates 181d to 181f generate operation enable signals 185a to 185c for switching among the mode candidate determination units 182a to 182c.

The operation enable signal 185a holds the value "1" in the case where the coded image width value 173a surpasses the value "352", and also, the coded image length value 173b surpasses the value "240", and holds the value "0" in other cases. In the case where the operation enable signal 185a indicates the value "1", the mode candidate determination unit 182a is enabled, and thus, the prediction mode candidate determination unit 182a determines intra-picture prediction mode candidate(s), and outputs the determined one or plural intra-picture prediction mode candidates as the intra-picture prediction mode specification information 170.

The operation enable signal 185b holds the value "1" in either of the following cases: when the coded image width value 173a is equal to or less than the value "352" and the coded image length value 173b surpasses the value "240"; or when the coded image width value 173a surpasses the value "352" and the coded image length value 173b is equal to or less than the value "240", and holds the value "0" in other cases. In the case where the operation enable signal 185b indicates the value "1", the mode candidate determination unit 182b is enabled, and thus, the mode candidate determination unit 182b determines intra-picture prediction mode candidate(s), and outputs the determined one or plural intra-picture prediction mode candidates as the intra-picture prediction mode candidate specification information 170.

The operation enable signal 185c holds the value "1" in the case where the coded image width value 173a is equal to or less than the value "352" and the coded image length value 173b is equal to or less than the value "240", and holds the value "0" in other cases. In the case where the operation enable signal 185c indicates the value "1", the mode candidate determination unit 182c is enabled, and thus, the mode candidate determination unit 182c determines intra-picture prediction mode candidate(s), and outputs the determined one of plural intra-picture prediction mode candidates as the intra-picture prediction mode candidate specification information 170.

Thus, in the case where the size of the coded image is small, it requires more processing cycles since the amount of resources provided for the intra-picture prediction coding apparatus increases as the size gets smaller. It is, however, possible to switch the mode candidate determination unit to the one that can perform intra-picture prediction with higher coding efficiency.

The prediction difference calculation unit 152, the coding efficiency evaluation unit 153, the intra-picture prediction mode determination unit 154, and the coding unit 155 are as described in the Background Art. The intra-picture prediction execution unit 151 is as described in the first embodiment.

Figure 15:
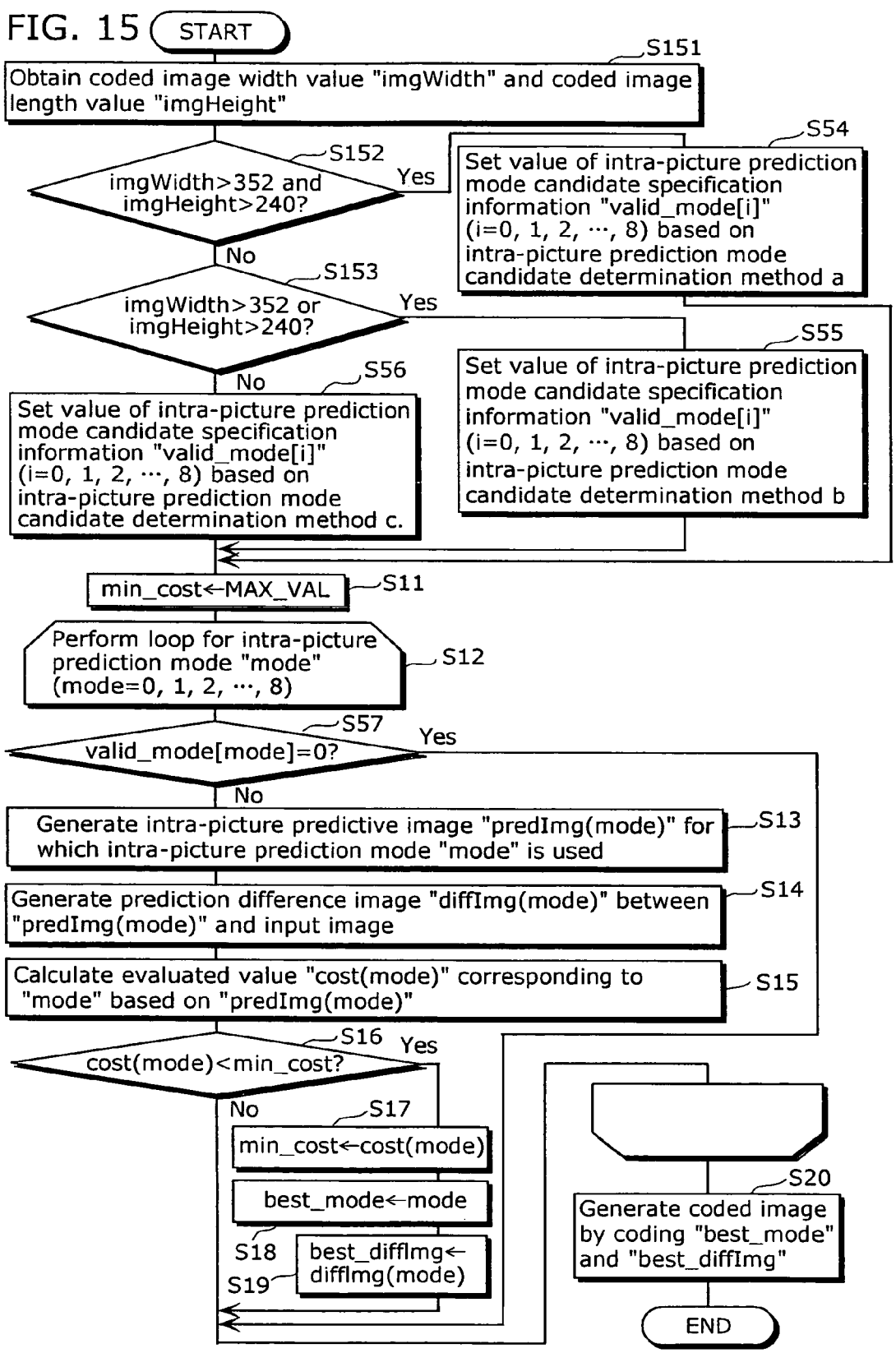
FIG. 15 is a flowchart for explaining the intra-picture prediction coding method employed by the intra-picture prediction coding apparatus according to the second embodiment.

FIG. 15 is a flowchart for explaining the intra-picture prediction coding method employed by the intra-picture prediction coding apparatus 150b. However, the chart shows the processing that is performed per prediction unit block.

Firstly, a coded image width value "ImgWidth" and a coded image length value "ImgHeight" which make up the coded image size information 173 are obtained (Step S151). The coded image width value "ImgWeight" and the value "352", as well as the coded image length "ImgHeight" and the value "240" are respectively compared (Step S152). As a result, in the case where the coded image width value "ImgWidth" is greater than the value "352" and the coded image length value "ImgHeight" is greater than the value "240" (Yes in S152), a value of the "valid_mode[i]" (i=0, 1, . . . , 8) as the intra-picture prediction mode candidate specification information 170 is set based on the intra-picture prediction mode candidate determination method a (Step S54). That is to say, the mode candidate determination unit 182a sets the intra-picture prediction mode candidate specification information "valid_mode[i]". In other cases (No in Step S152), the coded image width value "ImgWidth" and the value "352", the coded image length value "ImgHeight" and the value "240", are further compared (Step S153). In the case where the coded image width value "ImgWidth" is greater than the value "352" or the coded image length value "ImgHeight" is greater than the value "240" (Yes in Step S153), the value of the intra-picture prediction mode candidate specification information "valid_mode[i]" (i=0, 1, . . . , 8) is set based on the intra-picture prediction mode candidate determination method b (Step S55). That is to say, the mode candidate determination unit 182b sets the intra-picture prediction mode candidate specification information "valid_mode[i]". In other cases (No in Step S153), the value of the intra-picture prediction mode candidate specification information "valid_mode[i]" (i=0, 1, . . . , 8) is set based on the intra-picture prediction mode candidate determination method c (Step S56). That is to say, the mode candidate determination unit 182c sets the intra-picture prediction mode candidate specification information "valid_mode[i]".

Thus, a value of the "valid_mode[i]" as the intra-picture prediction mode candidate specification information 170 is set beforehand, and in addition, a value greater than the maximum value that can be obtained as the evaluation value 166 is substituted in advance in a variable "min_cost" (Step S11). Then, a sequence of processing (Steps S13-S19), including a processing of generating an intra-picture predictive image "predImg(mode)" and the processing thereafter, is sequentially executed for the modes 0 to 8, where the intra-picture prediction mode information 163 is regarded as a "mode" (Step S12). In the case where the intra-picture prediction mode candidate specification information "valid_mode[i]" indicates a value "0", the sequence of processing (Steps S13-S19) is skipped over (Step S57).

After performing the sequence of processing for each of the modes 0 to 8, a coded image 169 is generated (Step S20). It should be noted that the sequence of processing for generating the intra-picture prediction image "predImg(mode)" (Step S13-S20) is as described in the Background Art. The coding processing (Step S20) may be executed for one time after obtaining the intra-picture prediction mode information "best_mode" indicating the intra-picture prediction mode whose evaluation value 166 is the smallest and the prediction difference image "best_diffImg" which are obtained on a basis of a group of prediction unit blocks, instead of a prediction unit block, as a unit.

It should be noted that the intra-picture prediction coding method as described above can be realized as a program using a computer.

Thus, in the case where the size of the coded image gets smaller, the amount of resources provided for the intra-picture prediction coding apparatus per prediction unit block increases as a result of a decrease in number of prediction unit blocks on which intra-picture prediction is performed. Therefore, in such case, the intra-picture prediction candidate determination method is switched so that the intra-picture prediction which achieves higher coding efficiency and requires more amount of resources can be performed. In this way, it is possible to improve coding efficiency while maintaining a maximum value indicating a usable amount of resources per unit time so as to reduce the cost of hardware and the amount of processing operated by software.

Third Embodiment

Figure 16:
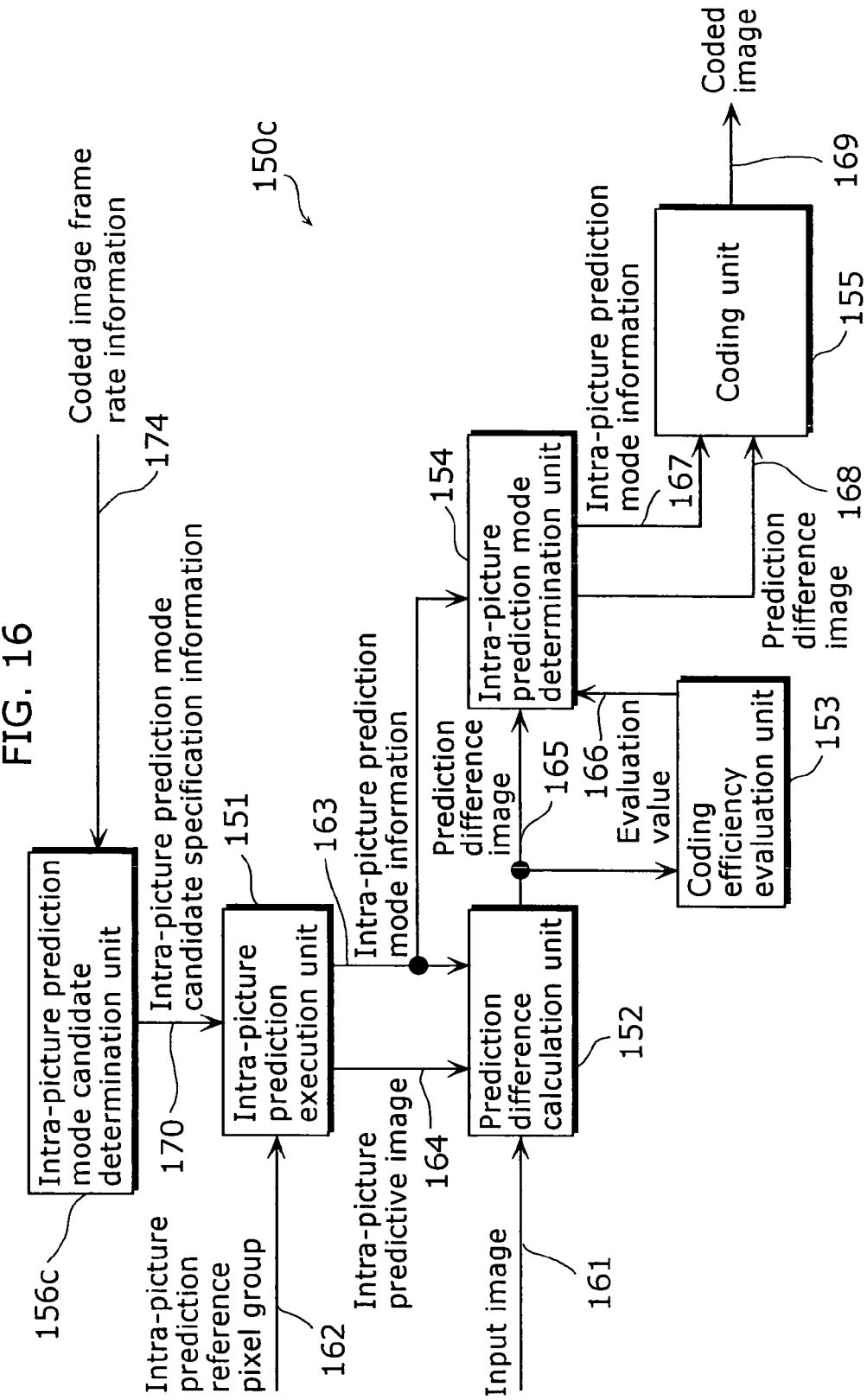
FIG. 16 is a block diagram showing a structure of the intra-picture prediction coding apparatus according to a third embodiment of the present invention.

FIG. 16 is a block diagram showing the structure of the intra-picture prediction coding apparatus according to the third embodiment of the present invention. The intra-picture prediction coding apparatus 150c according to the present embodiment is characteristic in that it switches the method of determining the intra-picture prediction mode candidate, based on a frame rate of a coded image.

As shown in FIG. 16, the intra-picture prediction coding apparatus 150c is comprised of the following: an intra-picture prediction mode candidate determination unit 156c which specifies the intra-picture prediction mode candidates to be attempted as the intra-picture prediction mode candidate specification information 170, based on a coded image frame rate information 174; the intra-picture prediction execution unit 151 which receives, as an input, the intra-picture prediction reference pixel group that is regarded as the coded pixels in one picture, and outputs the intra-picture predictive image 164 and the intra-picture prediction mode information 163; the prediction difference calculation unit 152 which receives, as inputs, the input image 161, the intra-picture prediction image 164, and the intra-picture prediction mode information 163, and outputs the prediction difference image 165; the coding efficiency evaluation unit 153 which receives, as an input, the prediction difference image 165, and outputs the evaluation value 166; and the intra-picture prediction mode determination unit 154 which receives, as inputs, the intra-picture prediction mode information 163, the prediction difference image 165 and the evaluation value 166, and outputs the prediction difference image 168 and the intra-picture prediction mode information 167; and the coding unit 155 which receives, as inputs, the intra-picture prediction mode information 167 and the prediction difference image 168, and outputs the coded image 169.

The intra-picture prediction mode candidate determination unit 156c specifies the intra-picture prediction mode candidate(s) to be attempted as the intra-picture prediction mode candidate specification information 170, so that an intra-picture prediction mode is determined. Here, the intra-picture prediction mode candidate determination unit 156*c* determines the intra-picture prediction mode candidates by switching the methods of determining intra-picture prediction mode candidates, based on the coded image frame rate information 174.

Figure 17:
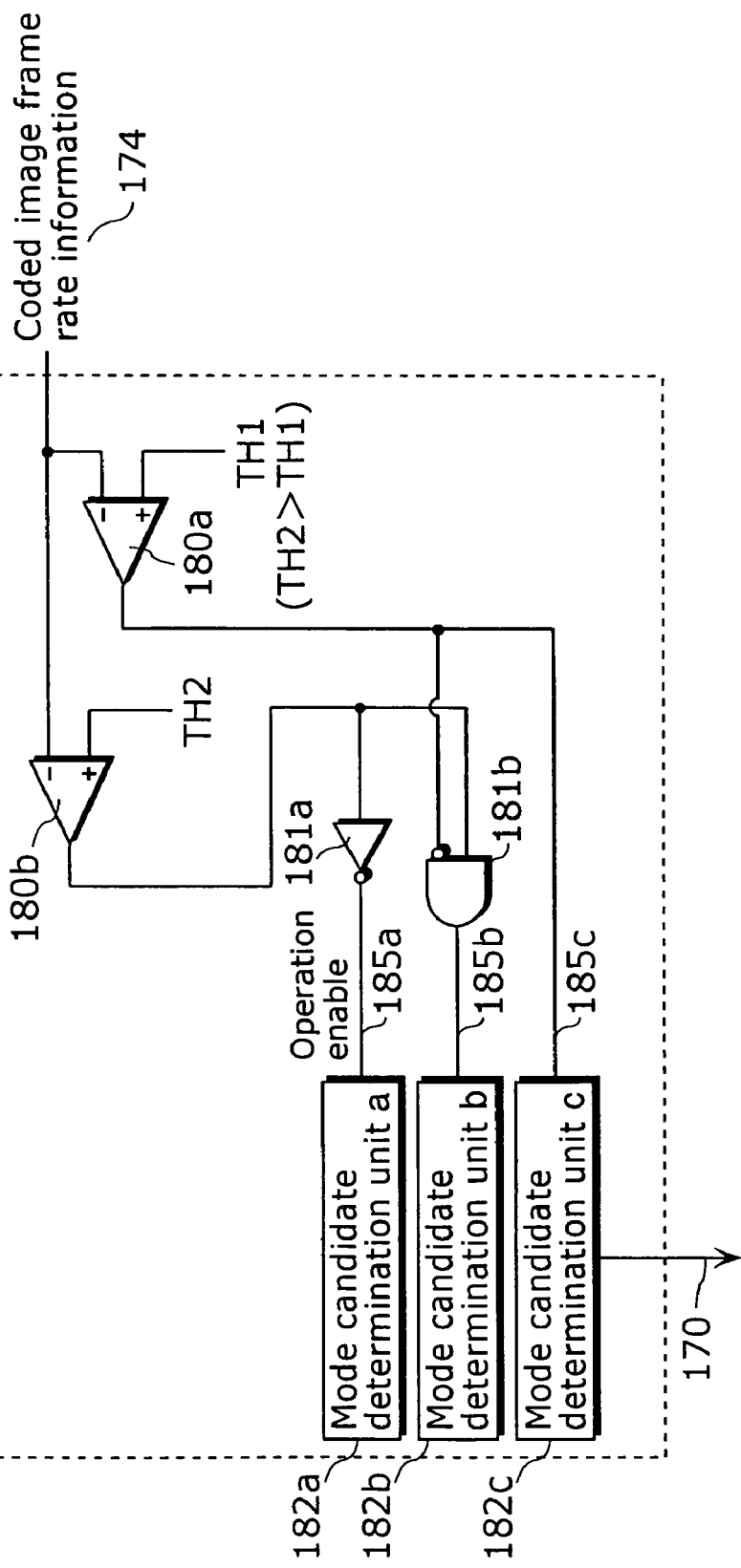
FIG. 17 is a block diagram showing a structure of the intra-picture prediction mode candidate determination unit according to the third embodiment.

FIG. 17 is a block diagram showing the structure of the intra-picture prediction mode candidate determination unit 156*c*. As shown in FIG. 17, the intra-picture prediction mode candidate determination unit 156*c* includes the comparators 180*a*, 180*b*, the logic gates 181*a*, 181*c* to 181*g*, as well as the mode candidate determination units 182*a* to 182*c*, and determines the intra-picture prediction mode candidate(s) to be attempted, according to a frame rate of a coded image. In the case where the inputted coded image frame rate information 174 is equal to or less than the threshold TH1, the comparator 180*a* outputs a value "1", and in the case where it surpasses the threshold TH1, the comparator 180*a* outputs a value "0". Similarly, in the case where the inputted coded image frame rate information 174 is equal to or less than the threshold TH2, the comparator 180*b* outputs the value "1", and in the case where the inputted coded image frame rate information 174 is greater than the threshold TH2, the comparator 180*b* outputs the value "0". Here, the threshold TH1 is assumed to be less than the threshold TH2. The logic gates 181*a*, 181*b* and the comparator 180*a* generate operation enable signals 185*a* to 185*c* for switching among the mode candidate determination units 182*a* to 182*c*.

The operation enable signal 185*a* holds the value "1" in the case where the value indicated in the coded image frame rate information 174 surpasses the threshold TH2, and holds the value "0" in other cases. In the case where the operation enable signal 185*a* indicates the value "1", the mode candidate determination unit 182*a* is enabled. Then, the mode candidate determination unit 182*a* determines an intra-picture prediction mode and outputs it as the intra-picture prediction mode candidate specification information 170.

The-operation enable signal 185*b* holds the value "1" in the case where the coded image frame rate information 174 is greater than the threshold TH1 and is equal to or less than the threshold TH2, but holds the value "0" in other cases. In the case where the operation enable signal 185*b* indicates the value "1", the mode candidate determination unit 182*b* is enabled. Then, the mode candidate determination unit 182*b* determines intra-picture prediction mode candidates and outputs them as the intra-picture prediction mode candidate specification information 170.

The operation enable signal 185*c* holds the value "1" in the case where the coded image frame rate information 174 is equal to or less than the threshold TH1, and holds the value "0" in other cases. In the case where the operation enable signal 185*c* indicates the value "1", the mode candidate determination unit 182*c* is enabled. Then, the mode candidate determination unit 182*c* determines intra-picture prediction mode candidates and outputs them as the intra-picture prediction mode candidate specification information 170.

Thus, in the case where the frame rate of the coded image reduces, it requires more processing cycles since the amount of resources provided for the intra-picture prediction coding apparatus increases as the frame rate gets smaller. It is, however, possible to switch the mode candidate determination unit to the one that can perform intra-picture prediction with higher coding efficiency.

The prediction difference calculation unit 152, the coding efficiency evaluation unit 153, the intra-picture prediction mode determination unit 154, and the coding unit 155 are as described in the Background Art. The intra-picture prediction execution unit 151 is as described in the first embodiment.

Figure 18:
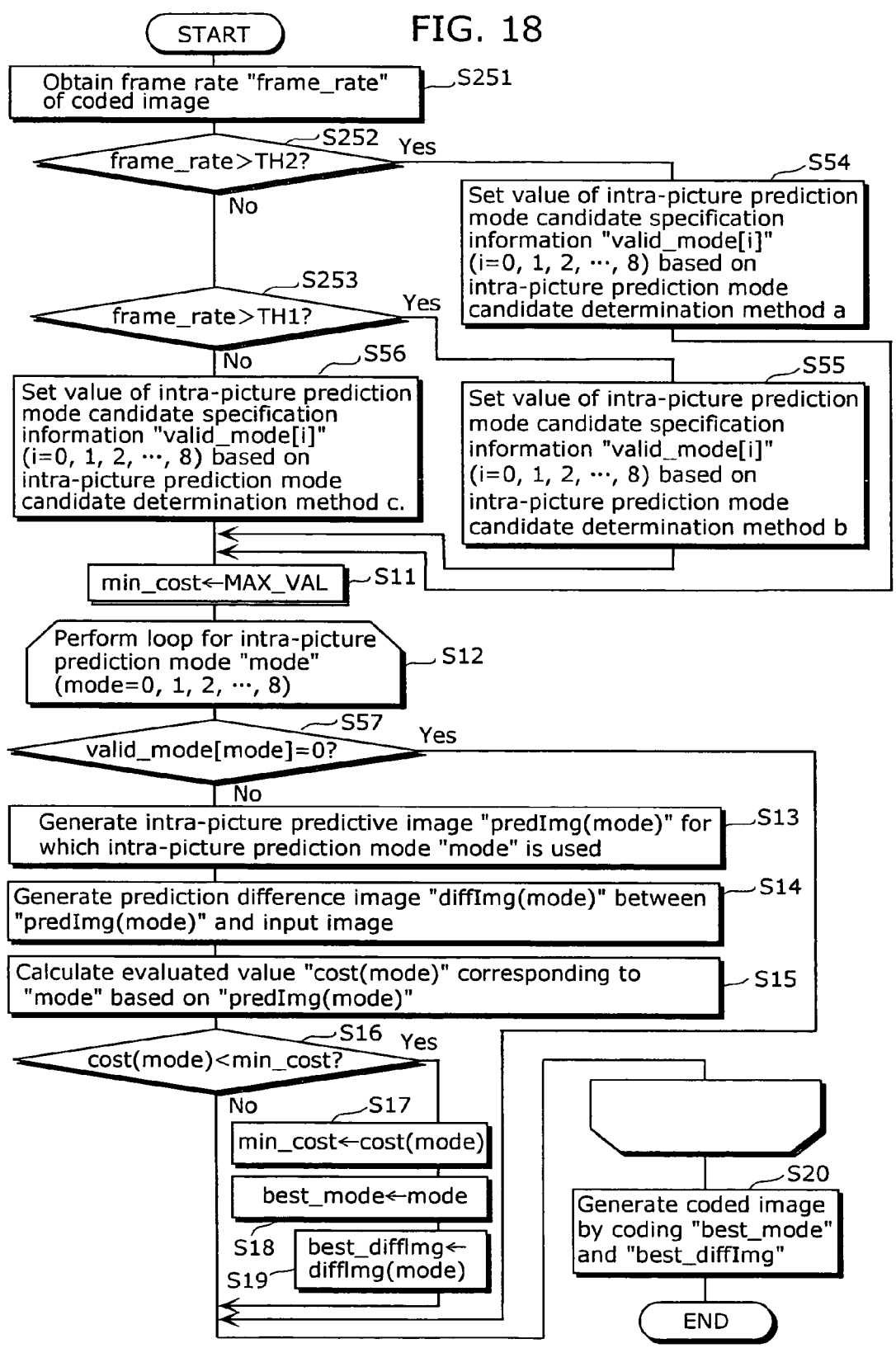
FIG. 18 is a flowchart for explaining the intra-picture prediction coding method employed by the intra-picture prediction coding apparatus according to the third embodiment.

FIG. 18 is a flowchart for explaining the intra-picture prediction coding method employed by the intra-picture prediction coding apparatus 150*c*. However, the chart shows the processing that is performed per prediction unit block.

Firstly, a value "frame_rate" as the frame rate information 174 of a coded image is obtained (Step S251). Then, the frame rate information "frame_rate" and the threshold TH2 are compared (Step S252). In the case where the frame rate information "frame_rate" is greater than the threshold TH2, (Yes in Step S252), a value for the "valid_mode[i]" (i=0, 1, . . . , 8) as the intra-picture prediction mode candidate specification information 170 is set based on the intra-picture prediction mode candidate determination method a (Step S54). Namely, the mode candidate determination unit 182*a* sets the intra-picture prediction mode candidate specification information "valid_mode[i]". In other cases (No in Step S252), the frame rate information "frame_rate" and the threshold TH1 are compared (Step S253). In the case where the frame rate information "frame_rate" is greater than the threshold TH1, (Yes in Step S253), a value of the intra-picture prediction mode candidate specification information "valid_mode[i]" (i=0, 1, . . . , 8) is set based on the intra-picture prediction mode candidate determination method b (Step 55). That is to say that the mode candidate determination unit 182*b* sets the intra-picture prediction mode candidate specification information "valid_mode[i]". In the case where the frame rate information "frame_rate" is equal to or less than the threshold TH1, (No in Step S253), a value of the intra-picture prediction mode candidate specification information "valid_mode[i]" (i=0, 1, . . . , 8) is set based on the intra-picture prediction mode candidate determination method c (Step S56). That is to say, the mode candidate determination unit 182*c* sets the intra-picture prediction mode candidate specification information "valid_mode[i]".

Thus, a value of the "valid_mode[i]" is set beforehand as the intra-picture prediction mode candidate specification information 170, and in addition, a value greater than the maximum value that can be obtained as the evaluation value 166 is substituted in advance in a variable "min_cost" (Step S11). Then, a sequence of processing (Steps S13-S19), including a processing of generating an intra-picture predictive image "predImg(mode)" and the processing thereafter, is sequentially executed for the modes 0 to 8, where the intra-picture prediction mode information 163 is regarded as a "mode" (Step S12). In the case where the intra-picture prediction mode candidate specification information "valid_mode[i]" indicates the value "0", the sequence of processing (Steps S13-S19) is skipped over (Step S57). After performing the sequence of processing for each of the modes 0 to 8, a coded image 169 is generated (Step S20). It should be noted that the sequence of processing for generating the intra-picture prediction image "predImg(mode)" (Steps S13-S20) is as described in the Background Art. The coding processing (Step S20) may be executed for one time after obtaining the intra-picture prediction mode information "best_mode" indicating the intra-picture prediction mode whose evaluation value 166 is the smallest and the prediction difference image "best_diffImg" which are obtained on a basis of a group of prediction unit blocks, instead of a prediction unit block, as a unit.

It should be noted that the intra-picture prediction coding method as described above can be realized as a program using a computer.

Thus, in the case where the frame rate of a coded image decreases, the amount of resources provided for the intra-picture prediction coding apparatus per prediction unit block increase as a result of a decrease in the number of prediction unit blocks to which the intra-picture prediction coding is performed. Therefore, in the case where the frame rate of a coded image decreases, the method of determining the intra-picture prediction candidate is switched so that the intra-picture prediction which achieves higher coding efficiency and requires more amount of resources may be performed. In this way, it is possible to improve coding efficiency while maintaining a maximum value indicating a usable amount of resources per unit time so as to reduce the cost of hardware and the amount of processing operated by software.

Fourth Embodiment

Figure 19:
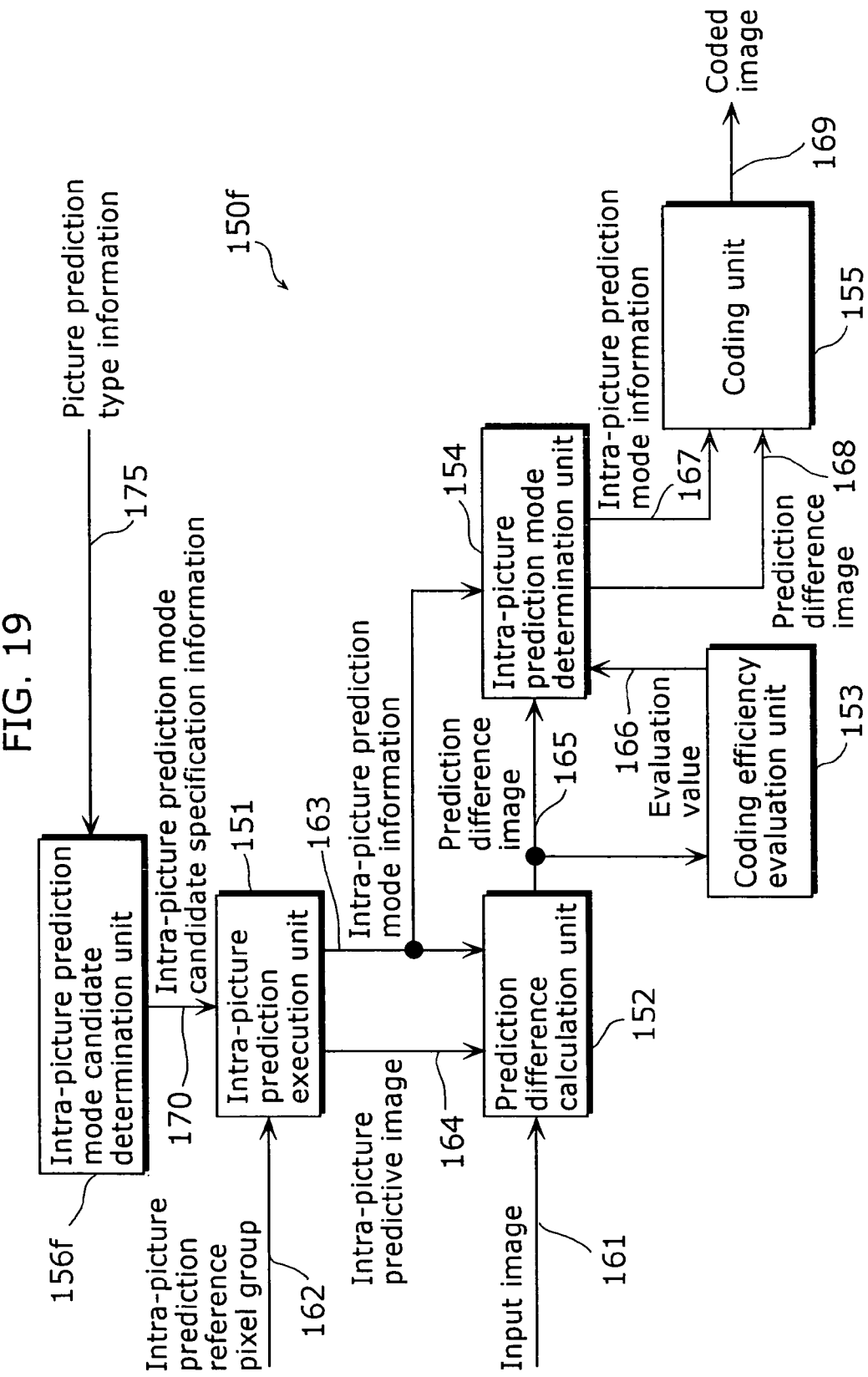
FIG. 19 is a block diagram showing the structure of the intra-picture prediction coding apparatus according to a fourth embodiment of the present invention.

FIG. 19 is a block diagram showing the structure of the intra-picture prediction coding apparatus according to the fourth embodiment of the present invention. The intra-picture prediction coding apparatus 150f of the present embodiment is characteristic in that it switches the methods of determining intra-picture prediction mode candidates based on a picture prediction type of a coded image.

The intra-picture prediction coding apparatus 150f is comprised of the following: an intra-picture prediction mode candidate determination unit 156f which specifies the intra-picture prediction mode candidate(s) to be attempted as the intra-picture prediction mode candidate specification information 170, based on picture prediction type information 175; the intra-picture prediction execution unit 151 which receives, as an input, the intra-picture prediction reference pixel group that is regarded as the coded pixels in one picture, and outputs the intra-picture predictive image 164 and the intra-picture prediction mode information 163; the prediction difference calculation unit 152 which receives, as inputs, the input image 161, the intra-picture prediction image 164, and the intra-picture prediction mode information 163, and outputs the prediction difference image 165; the coding efficiency evaluation unit 153 which receives, as an input, the prediction difference image 165, and outputs the evaluation value 166; and the intra-picture prediction mode determination unit 154 which receives, as inputs, the intra-picture prediction mode information 163, the prediction difference image 165 and the evaluation value 166, and outputs the prediction difference image 168 and the intra-picture prediction mode information 167; and the coding unit 155 which receives, as inputs, the intra-picture prediction mode information 167 and the prediction difference image 168, and outputs the coded image 169.

The intra-picture prediction mode candidate determination unit 156f specifies the intra-picture prediction mode candidate(s) to be attempted as the intra-picture prediction mode candidate specification information 170, so that an intra-picture prediction mode is determined. Here, the intra-picture prediction mode candidate determination unit 156f determines the intra-picture prediction mode candidates by switching the methods of determining intra-picture prediction mode candidates, based on the picture prediction type information 175.

Here, three picture prediction types are used: "I" for a type with which inter-picture prediction is not performed on a current picture to be coded that includes a current block; "P" for a type with which inter-picture prediction is performed on the current picture for generating a predictive image with reference to a single picture; and "B" for a type with which inter-picture prediction is performed on the current picture for generating a predictive image with reference to plural pictures. The prediction type I holds a value "2", the prediction type P holds a value "1" and the prediction type B holds a value "0", as the picture prediction type 175. It should be noted that in the case of switching between the prediction types per predetermined area that is obtained by dividing a picture (to be referred to as "slice" hereinafter), the picture type of slices may be used as reference, instead of the prediction type of pictures.

Figure 20:
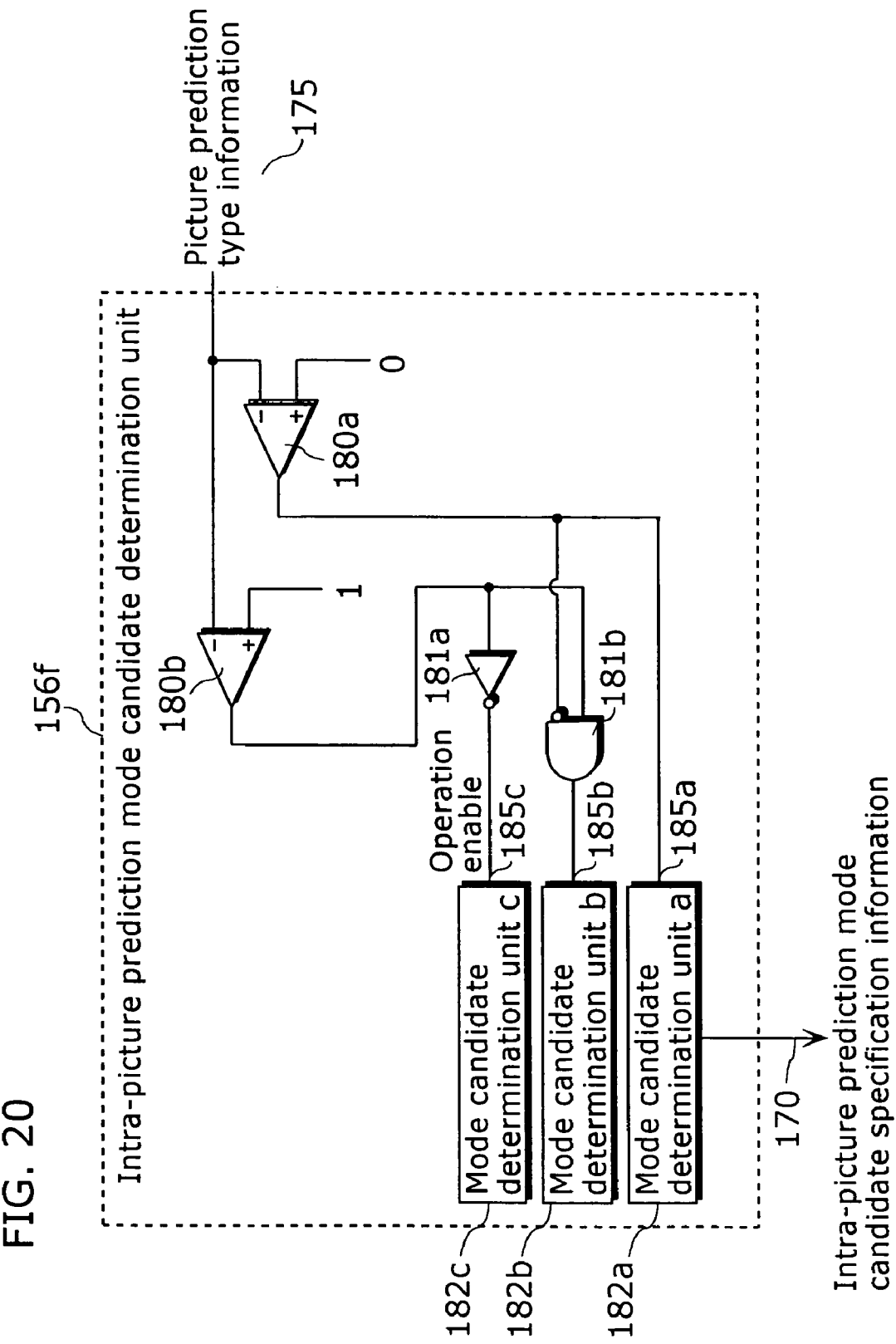
FIG. 20 is a block diagram showing the structure of the intra-picture prediction mode candidate determination unit according to the fourth embodiment.

FIG. 20 is a block diagram showing the structure of the intra-picture prediction mode candidate determination unit 156f. As shown in FIG. 20, the intra-picture prediction mode candidate determination unit 156f includes the comparators 180a, 180b, the logic gates 181a, 181b, as well as the mode candidate determination units 182a to 182c, and determines the intra-picture prediction mode candidate(s) to be attempted, according to a prediction type of pictures. In the case where the inputted picture prediction type information 175 is equal to or less than a value "0", the comparator 180a outputs a value "1", and in the case where it surpasses the value "0", the comparator 180a outputs a value "0". Similarly, in the case where the inputted picture prediction type information 175 is equal to or less than a value "1", the comparator 180b outputs a value "1", and in the case where the inputted picture prediction type information 175 is greater than the value "1", the comparator 180b outputs a value "0". The logic gates 181a, 181b and the comparator 180a generate operation enable signals 185a to 185c for switching among the mode candidate determination units 182a to 182c.

The operation enable signal 185a holds the value "1" in the case where the value indicated in the picture prediction type information 175 is equal to or less than the value "0", namely, in the case where the prediction type is "B", and holds the value "0" in other cases. In the case where the operation enable signal 185a indicates the value "1", the mode candidate determination unit 182a is enabled. Then, the mode candidate determination unit 182a determines an intra-picture prediction mode and outputs it as the intra-picture prediction mode candidate specification information 170.

The operation enable signal 185b holds the value "1" in the case where the picture prediction type information 175 is greater than the value "0" and is equal to or less than the value "1", namely, in the case where the prediction type is "P", but holds the value "0" in other cases. In the case where the operation enable signal 185b indicates the value "1", the mode candidate determination unit 182b is enabled. Then, the mode candidate determination unit 182b determines intra-picture prediction mode candidates and outputs them as the intra-picture prediction mode candidate specification information 170.

The operation enable signal 185c holds the value "1" in the case where the picture prediction type information 175 is greater than the value "1", namely, in the case where the picture type is "I", and holds the value "0" in other cases. In the case where the operation enable signal 185c indicates the value "1", the mode candidate determination unit 182c is enabled. Then, the mode candidate determination unit 182c determines intra-picture prediction mode candidates and outputs them as the intra-picture prediction mode candidate specification information 170.

The prediction difference calculation unit 152, the coding efficiency evaluation unit 153, the intra-picture prediction mode determination unit 154, and the coding unit 155 are as described in the Background Art. The intra-picture prediction execution unit 151 is as described in the first embodiment.

Figure 21:
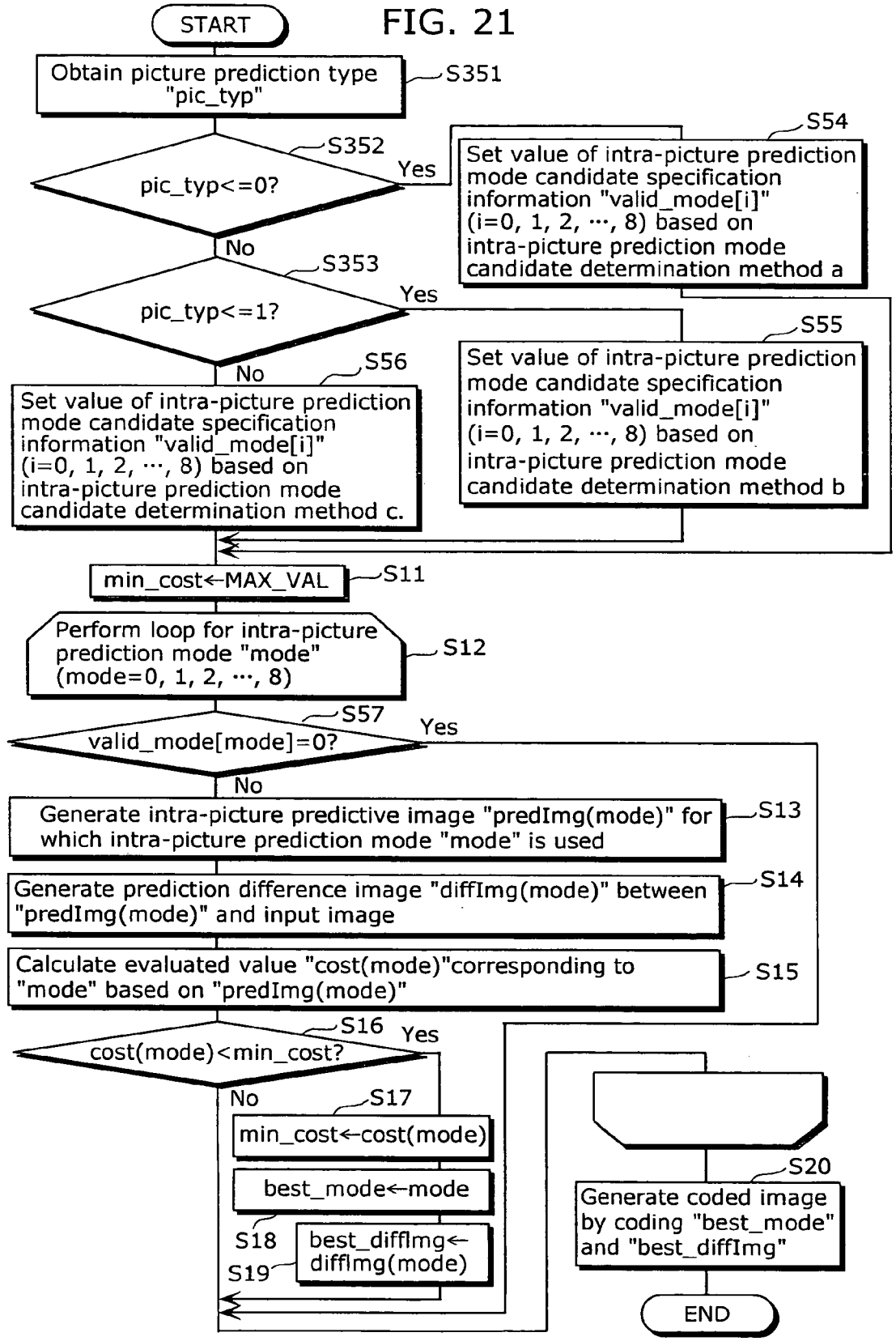
FIG. 21 is a flowchart showing the intra-picture prediction coding method according to the fourth embodiment.

FIG. 21 is a flowchart for explaining the intra-picture prediction coding method employed by the intra-picture prediction coding apparatus 150f. However, the chart shows the processing that is performed per prediction unit block.

Firstly, a value "pic_typ" as the picture prediction type information 175 is obtained (Step S351). Then, the picture prediction type information "pic_typ" and the value "0" are compared (Step S352). In the case where the picture prediction type information "pic_typ" is equal to or less than the value "0", (Yes in Step S352), a value for the "valid_mode [i]" (i=0, 1, . . . , 8) as the intra-picture prediction mode candidate specification information 170 is set based on the intra-picture prediction mode candidate determination method a (Step S54). Namely, the mode candidate determination unit 182a sets the intra-picture prediction mode candidate specification information "valid_mode[i]". In the case where the prediction type information "pic_typ" is greater than the value "0" (No in Step S352), the prediction type information "pic_typ" and the value "1" are compared (Step S353). In the case where the prediction type information "pic_typ" is equal to or less than the value "1", (Yes in Step S353), a value of the intra-picture prediction mode candidate specification information "valid_mode[i]" (i=0, 1, . . . , 8) is set based on the intra-picture prediction mode candidate determination method b (Step 55). That is to say that the mode candidate determination unit 182b sets the intra-picture prediction mode candidate specification information "valid_mode[i]". In the case where the prediction type information "pic_typ" is greater than the value "1", (No in Step S353), a value of the intra-picture prediction mode candidate specification information "valid_mode[i]" (i=0, 1, . . . , 8) is set based on the intra-picture prediction mode candidate determination method c (Step S56). That is to say, the mode candidate determination unit 182c sets the intra-picture prediction mode candidate specification information "valid_mode[i]".

Thus, a value of the "valid_mode[i]" is set beforehand as the intra-picture prediction mode candidate specification information 170, and in addition, a value greater than the maximum value that can be obtained as the evaluation value 166 is substituted in advance in a variable "min_cost" (Step S11). Then, a sequence of processing (Steps S13-S19), including a processing of generating an intra-picture predictive image "predImg(mode)" and the processing thereafter, is sequentially executed for the modes 0 to 8, where the intra-picture prediction mode information 163 is regarded as a "mode" (Step S12). In the case where the intra-picture prediction mode candidate specification information "valid_mode[i]" indicates the value "0", the sequence of processing (Steps S13-S19) is skipped over (Step S57). After performing the sequence of processing for each of the modes 0 to 8, a coded image 169 is generated (Step S20). It should be noted that the sequence of processing for generating the intra-picture prediction image "predImg(mode)" (Steps S13-S20) is as described in the Background Art. The coding processing (Step S20) may be executed for one time after obtaining the intra-picture prediction mode information "best_mode" indicating the intra-picture prediction mode whose evaluation value 166 is the smallest and the prediction difference image "best_diffImg" which are obtained on a basis of a group of prediction unit blocks, instead of a prediction unit block, as a unit.

It should be noted that the intra-picture prediction coding method as described above can be realized as a program using a computer.

Thus, since there is no need to search motions in the prediction type "I", an amount of processing (i.e., an amount of resources) is consumed in quantity for an I picture. In the prediction type "P", a medium amount of processing can be consumed due to a motion search in one direction while in the prediction type "B", only a little amount of processing can be consumed due to a motion search in bi-direction. Therefore, the method of determining intra-picture prediction candidates is switched so that intra-picture prediction coding is performed with higher coding efficiency and more amount of resources in the prediction type P compared to the prediction type B and intra-picture prediction coding is performed with much higher coding efficiency and further more amount of resources in the prediction type I compared to the prediction type P. In this way, it is possible to improve coding efficiency while maintaining a maximum value indicating a usable amount of resources per unit time so as to reduce the cost of hardware and the amount of processing operated by software.

Fifth Embodiment

Figure 22:
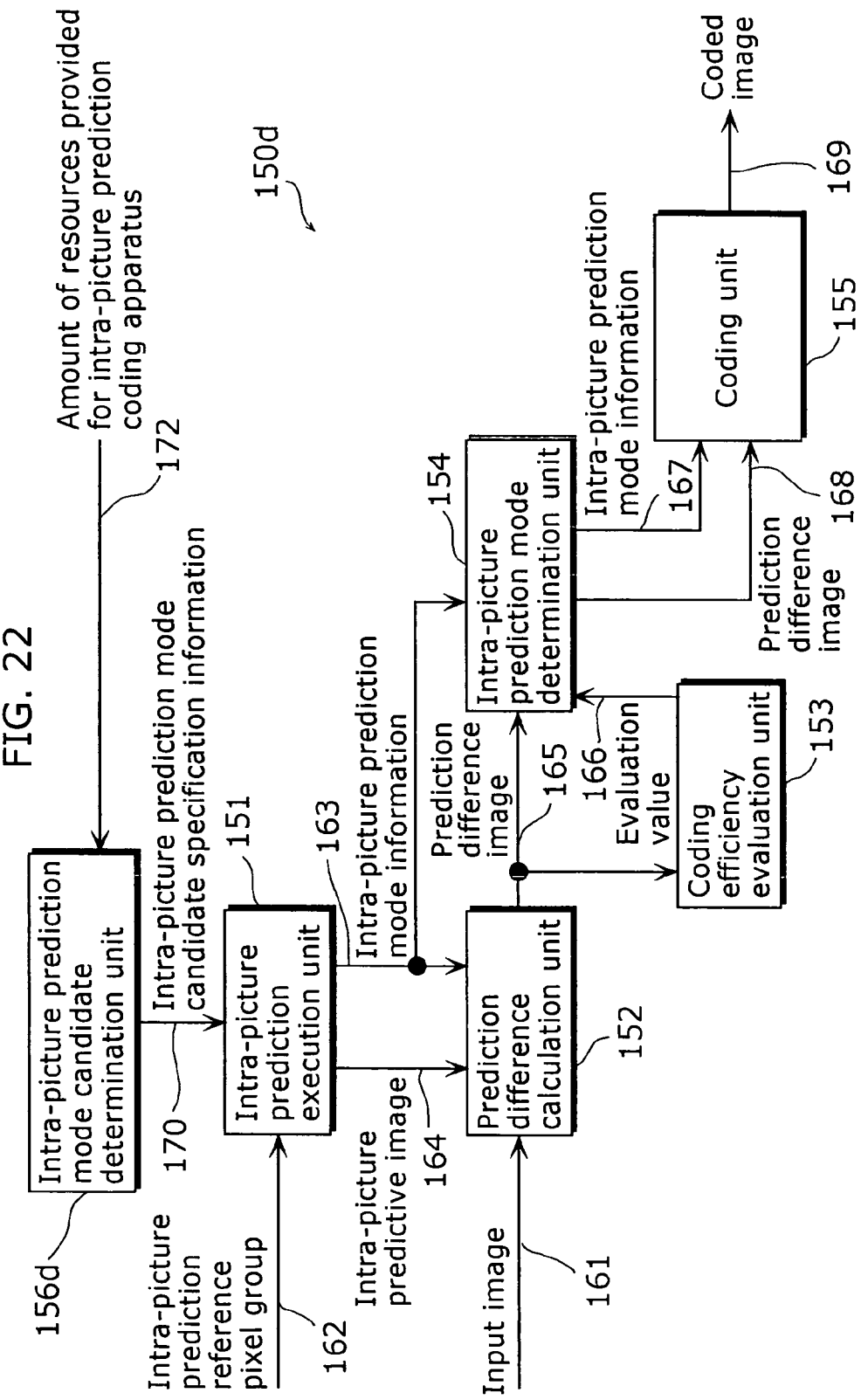
FIG. 22 is a block diagram showing a structure of the intra-picture prediction coding apparatus according to a fifth embodiment of the present invention.

FIG. 22 is a block diagram showing the structure of the intra-picture prediction coding apparatus according to the fifth embodiment of the present invention. The intra-picture prediction coding apparatus 150d according to the present embodiment is characteristic in that it switches the number of intra-picture prediction mode candidates, based on the amount of resources provided for the intra-picture prediction coding apparatus.

As shown in FIG. 22, the intra-picture prediction coding apparatus 150d is comprised of the following: an intra-picture prediction mode candidate determination unit 156d which specifies the intra-picture prediction mode candidates to be attempted as the intra-picture prediction mode candidate specification information 170, based on the amount of resources provided for the intra-picture prediction coding apparatus; the intra-picture prediction execution unit 151 which receives, as an input, the intra-picture prediction reference pixel group that is regarded as the coded pixels in one picture, and outputs the intra-picture predictive image 164 and the intra-picture prediction mode information 163; the prediction difference calculation unit 152 which receives, as inputs, the input image 161, the intra-picture prediction image 164, and the intra-picture prediction mode information 163, and outputs the prediction difference image 165; the coding efficiency evaluation unit 153 which receives, as an input, the prediction difference image 165, and outputs the evaluation value 166; and the intra-picture prediction mode determination unit 154 which receives, as inputs, the intra-picture prediction mode information 163, the prediction difference image 165 and the evaluation value 166, and outputs the prediction difference image 168 and the intra-picture prediction mode information 167; and the coding unit 155 which receives, as inputs, the intra-picture prediction mode information 167 and the prediction difference image 168, and outputs the coded image 169.

The intra-picture prediction mode candidate determination unit 156d specifies the intra-picture prediction mode candidates to be attempted as the intra-picture prediction mode candidate specification information 170, so that an intra-picture prediction mode is determined. Here, the intra-picture prediction mode candidate determination unit 156*d* switches the number of intra-picture prediction mode candidates based on the amount of resources 172 provided for the intra-picture prediction coding apparatus.

Figure 23:
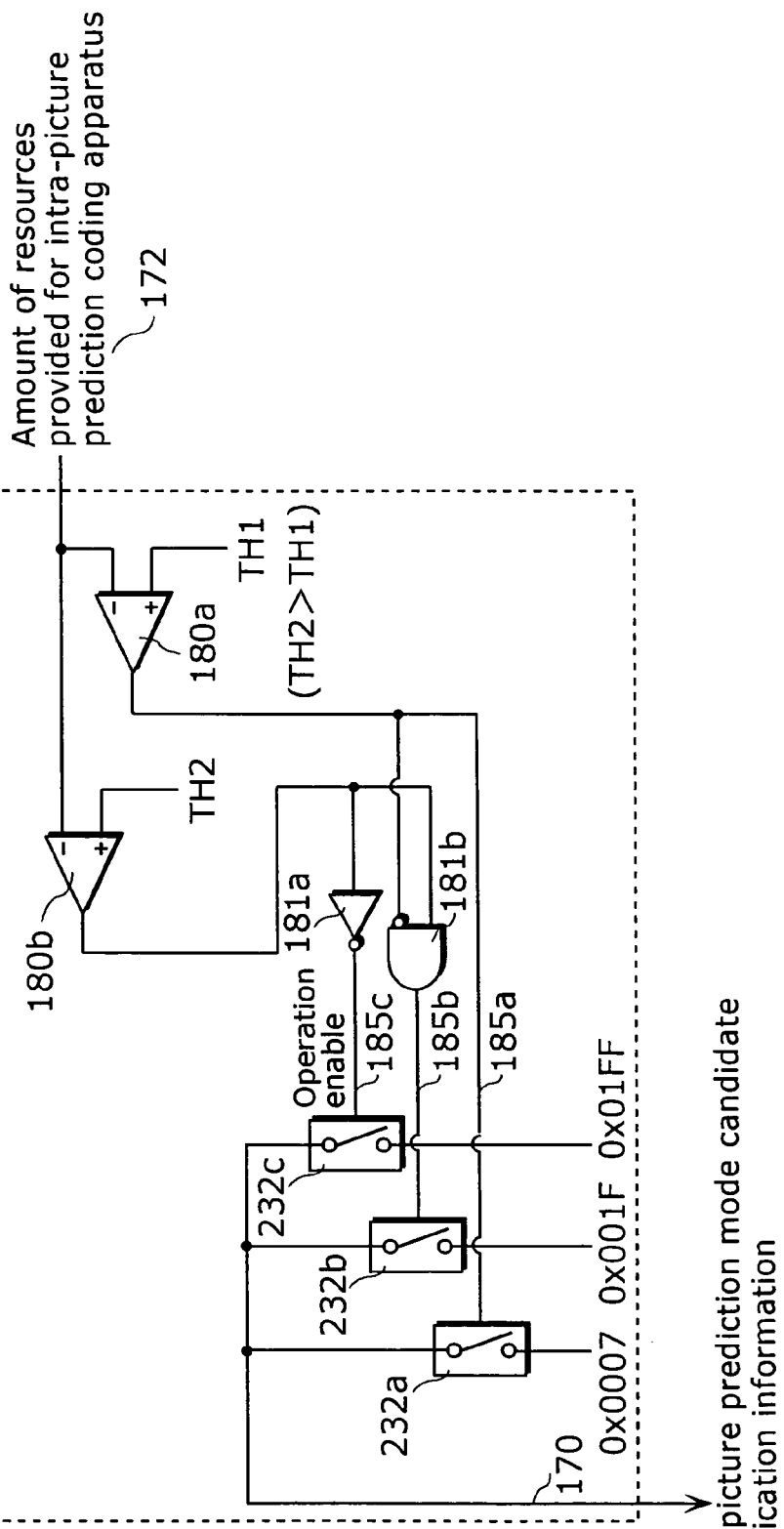
FIG. 23 is a block diagram showing a structure of the intra-picture prediction mode candidate determination unit according to the fifth embodiment.

FIG. 23 is a block diagram showing the structure of the intra-picture prediction mode candidate determination unit 156*d*. As shown in FIG. 23, the intra-picture prediction mode candidate determination unit 156*d* includes the comparators 180*a*, 180*b*, the logic gates 181*a*, 181*b* as well as switches 232*a* to 232*c*, and determines the intra-picture prediction mode candidates to be attempted, according to the amount of resources provided for the intra-picture prediction coding apparatus. In the case where the inputted amount of resources 172 provided for the intra-picture prediction coding apparatus is equal to or less than the threshold TH1, the comparator 180*a* outputs a value "1", and in the case where it surpasses the threshold TH1, the comparator 180*a* outputs a value "0". It is assumed here that the threshold TH1 is less than the threshold TH2. The logic gates 181*a*, 181*b* and the comparator 180*a* generate operation enable signals 185*a* to 185*c* for switching among the switches 232*a* to 232*c*.

The operation enable signal 185*a* holds the value "1" in the case where the amount of resources 172 provided for the intra-picture prediction coding apparatus is equal to or less than the threshold TH1, and holds the value "0" in other cases. When the operation enable signal 185*a* indicates the value "1", the switch 232*a* is turned on, and the value "0x0007" is outputted as the intra-picture prediction mode candidate specification information 170.

The operation enable signal 185*b* holds the value "1" in the case where the amount of resources 172 provided for the intra-picture prediction coding apparatus is greater than the threshold TH1 and is equal to or less than the threshold TH2, and holds the value "0" in other cases. When the operation enable signal 185*b* indicates the value "1", the switch 232*b* is turned on and the value "0x001F" is outputted as the intra-picture prediction mode candidate specification information 170.

The operation enable signal 185*c* holds the value "1" in the case where the amount of resources 172 provided for the intra-picture prediction coding apparatus is greater than the threshold TH2, and holds the value "0" in other cases. When the operation enable signal 185*c* indicates the value "1", the switch 232*c* is turned on and the value "0x01FF" is outputted as the intra-picture prediction mode candidate specification information 170.

Here, in the case where the n th digit in binary number of the value indicated in the intra-picture prediction mode candidate specification information 170 indicates a value "1", it means that the intra-picture prediction mode whose intra-picture prediction mode information is presented as a value "n−1" should be included as the intra-picture prediction mode candidate. In the case where the n th digit in binary number of the value indicated in the intra-picture prediction mode candidate specification information 170 indicates a value "0", it means that the intra-picture prediction mode whose intra-picture prediction mode information is presented as a value "n−1" should not be included as the intra-picture prediction mode candidate. That is to say that in the case where the intra-picture prediction mode candidate specification information 170 indicates the value "0x0007", the intra-picture prediction modes 0 to 2 are included as the intra-picture prediction mode candidates. In the case where the intra-picture prediction mode candidate specification information 170 indicates the value "0x01FF", the intra-picture prediction modes 0 to 4 are included as the intra-picture prediction mode candidates. Furthermore, in the case where the intra-picture prediction mode candidate specification information 170 indicates the value "0x01FF", all the intra-picture prediction modes 0 to 8 are included as the intra-picture prediction mode candidates.

Thus, in the case where the amount of resources provided for the intra-picture prediction coding apparatus increases, it is possible to attempt intra-picture prediction using many intra-picture prediction mode candidates as possible in making use of the increase in the amount of resources. It should be noted that the method of determining the intra-picture prediction mode candidate specification information 170 as described above is merely an example of switching the number of intra-picture prediction mode candidates. It is sufficient as the method only if the method of determining the intra-picture prediction mode candidate specification information 170 allows a monotonous increase in the number of intra-picture prediction mode candidates according to the amount of resources provided for the intra-picture prediction coding apparatus.

The prediction difference calculation unit 152, the coding efficiency evaluation unit 153, the intra-picture prediction mode determination unit 154, and the coding unit 155 are as described in the Background Art. The intra-picture prediction execution unit 151 is as described in the first embodiment.

Figure 24:
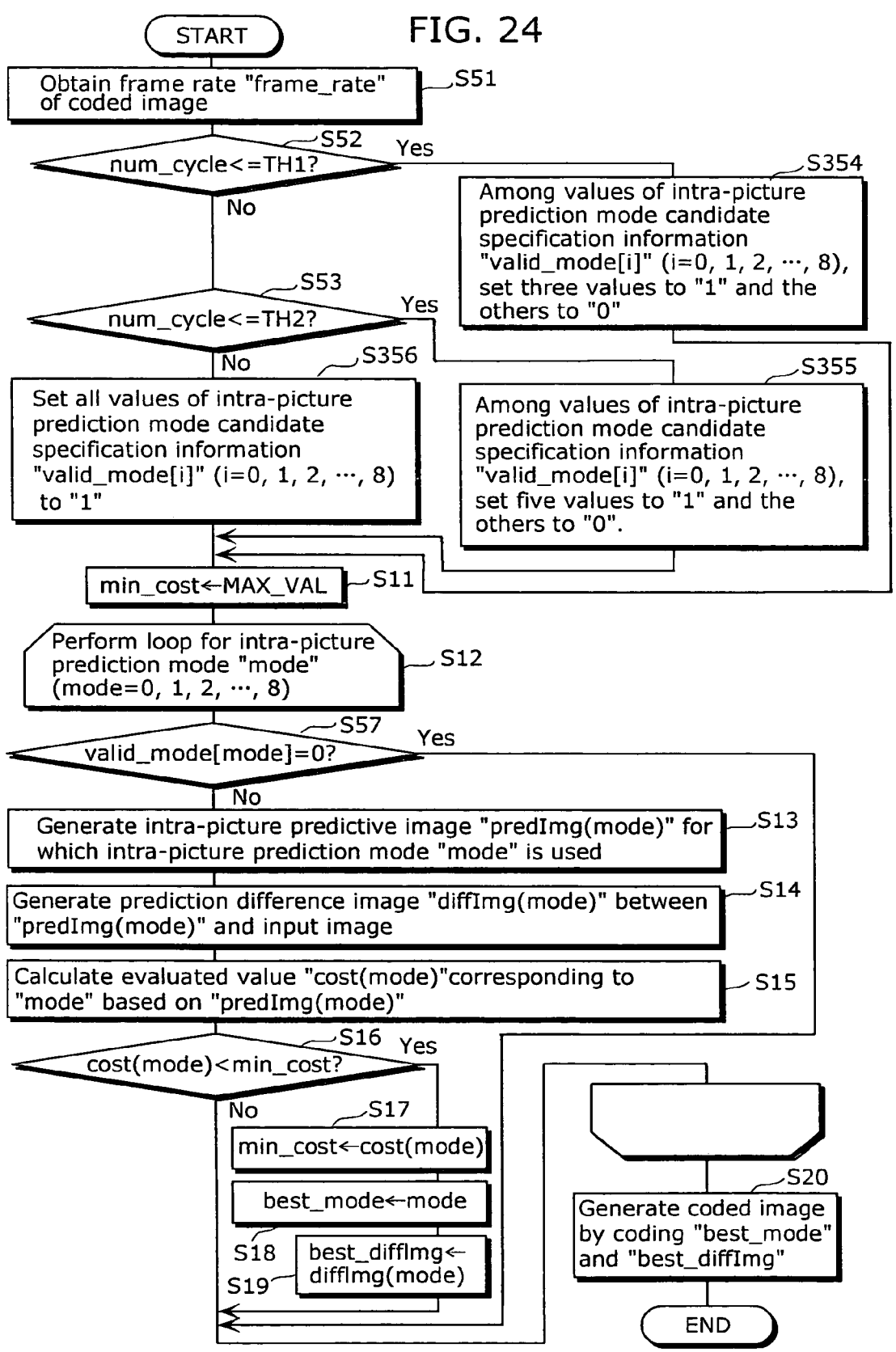
FIG. 24 is a flowchart for explaining the intra-picture prediction method employed by the intra-picture prediction coding apparatus according to the fifth embodiment.

FIG. 24 is a flowchart for explaining the intra-picture prediction coding method employed by the intra-picture prediction coding apparatus 150*d*. However, the chart shows the processing that is performed per prediction unit block.

Firstly "num_cycle" that presents the amount of resources 172 provided for the intra-picture prediction coding apparatus is obtained (Step S51). Then, the amount of resources "num_cycle" and the threshold TH1 are compared (Step S52). In the case where the amount of resources "num_cycle" is equal to or less than the threshold TH1 (Yes in Step S52), among the values indicated in the intra-picture prediction mode candidate specification information "valid_mode[i]" (i=0, 1, . . . , 8), three values are set to "1" while the others are set to "0" (Step S354). In other cases (No in Step S52), the amount of resources "num_cycle" and the threshold TH2 are compared (Step S53). In the case where the amount of resources "num cycle" is equal to or less than the threshold TH2 (Yes in Step S53), among the values indicated in the intra-picture prediction mode candidate specification information "valid_mode[i]" (i=0, 1, . . . , 8), five values are set to "1" while the others are set to "0" (Step S355). In the case where the amount of resources "num_cycle" is greater than the threshold TH2 (No in Step S53), all the values indicated in the intra-picture prediction mode candidate specification information "valid_mode[i]" (i=0, 1, . . . , 8) are set to "1" (Step S356).

Thus, a value of the "valid_mode[i]" is set beforehand as the intra-picture prediction mode candidate specification information 170 and a value greater than the maximum value that can be obtained as the evaluation value 166 is substituted in advance in a variable "min_cost" (Step S11). Then, a sequence of processing (Steps S13-S19), including a processing of generating an intra-picture predictive image "predImg(mode)" and the processing thereafter, is sequentially executed for the modes 0 to 8 (Step S12), where the intra-picture prediction mode information 163 is regarded as a "mode". In the case where the intra-picture prediction mode candidate specification information "valid_mode[i]" indicates the value "0", the sequence of processing (Steps S13-S19) is skipped over (Step S57). After performing the sequence of processing for each of the modes 0 to 8, a coded image 169 is generated (Step S20). It should be noted that the sequence of processing for generating the intra-picture prediction image "predImg(mode)" (Steps S13-S20) is as described in the Background Art. The coding processing (Step S20) may be executed for one time after obtaining the intra-picture prediction mode information "best_mode" indicating the intra-picture prediction mode whose evaluation value 166 is the smallest and the prediction difference image "best_diffImg" which are obtained on a basis of a group of prediction unit blocks, instead of a prediction unit block, as a unit.

It should be noted that the intra-picture prediction coding method as described above can be realized as a program using a computer.

Thus, in the case where the amount of resources provided for the intra-picture prediction coding apparatus increases, it is possible to attempt intra-picture prediction using many intra-picture prediction mode candidates as possible in making use of the increase. In this way, it is possible to improve coding efficiency while maintaining a maximum value indicating a usable amount of resources per unit time so as to reduce the cost of hardware and the amount of processing operated by software.

As shown in the second through fourth embodiments, coded image size information, coded frame rate information or picture prediction type information may be used as reference, instead of the amount of resources provided for the intra-picture prediction coding apparatus. Namely, in the case where a size or a frame rate of a coded image is small, it is possible to improve coding efficiency while maintaining a maximum value indicating a usable amount of resources per unit time so as to reduce the cost of hardware and the amount of processing operated by software, by introducing a mechanism that increases the number of intra-picture prediction candidates.

Sixth Embodiment

Figure 25:
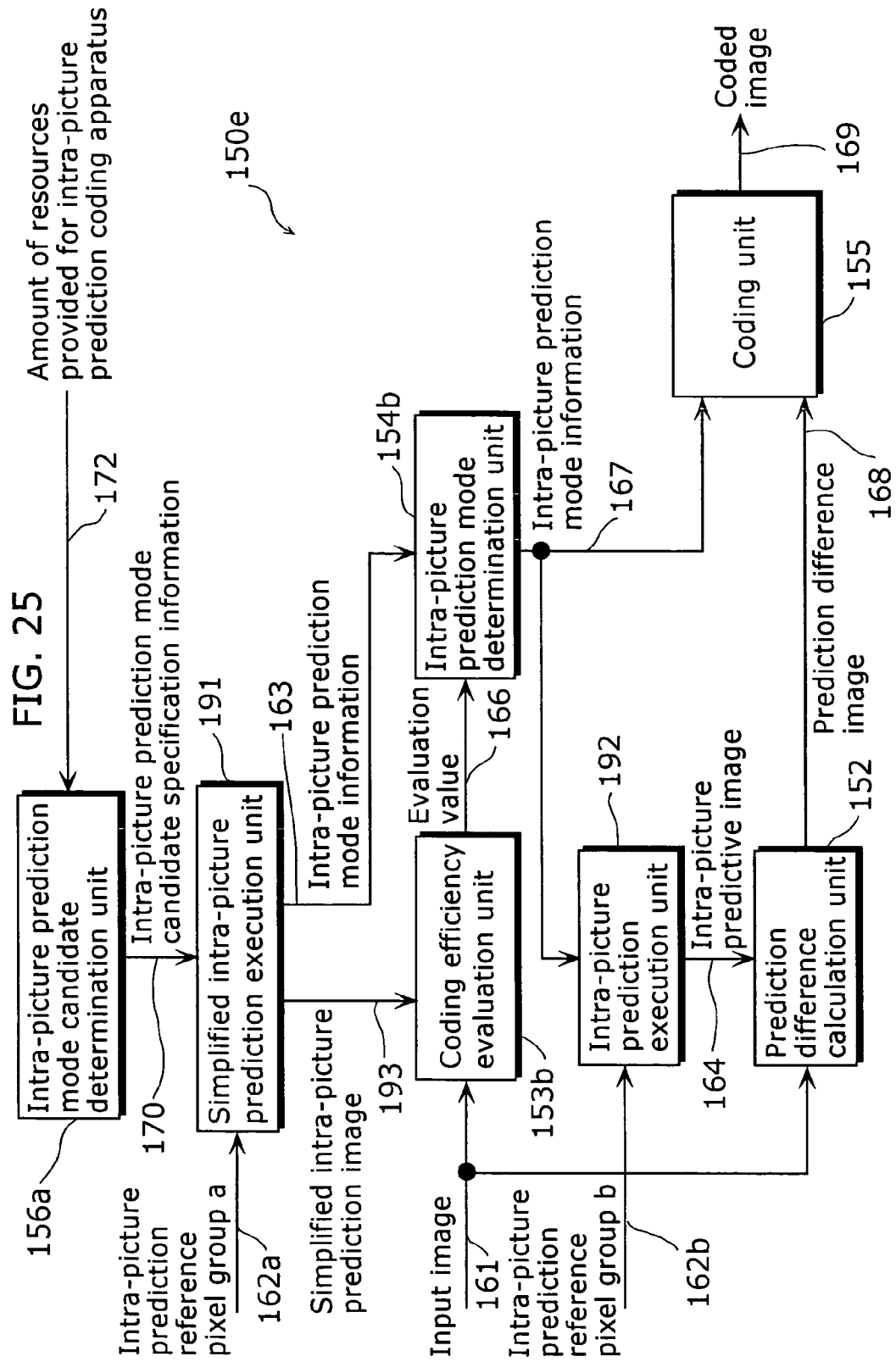
FIG. 25 is a block diagram showing a structure of the intra-picture prediction coding apparatus according to a sixth embodiment of the present invention.

FIG. 25 is a block diagram showing the structure of the intra-picture prediction coding apparatus according to the sixth embodiment of the present invention. The intra-picture prediction coding apparatus 150e according to the present embodiment is characteristic in that it creates an intra-picture predictive coded image in a simplified manner when determining an intra-picture prediction mode.

As shown in FIG. 25, the intra-picture prediction coding apparatus 150e is comprised of an intra-picture prediction mode candidate determination unit 156a, a simplified intra-picture prediction execution unit 191, a coding efficiency evaluation unit 153b, an intra-picture prediction mode determination unit 154b, an intra-picture prediction execution unit 192, the prediction difference calculation unit 152, and the coding unit 155.

Figure 26A:
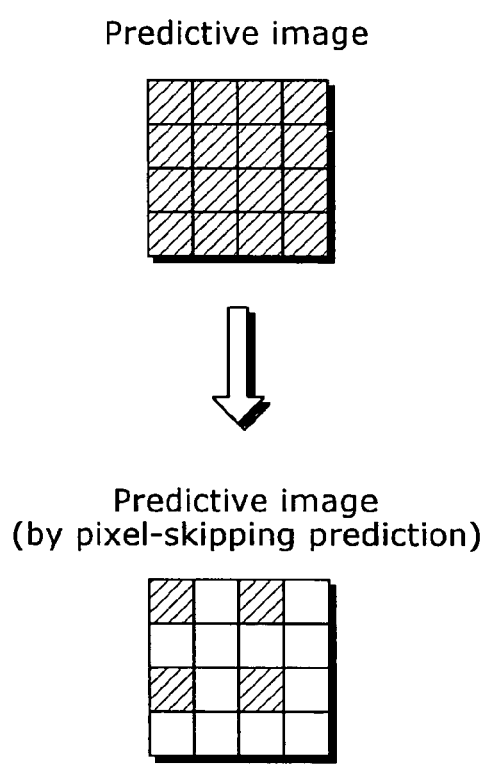

The simplified intra-picture prediction execution unit 191 sequentially executes intra-picture prediction at certain intervals using the respective intra-picture prediction mode candidates specified by the intra-picture prediction mode candidate specification information 170. Here, the simplified intra-picture prediction execution unit 191 performs intra-picture prediction using each of the intra-picture prediction modes based on the intra-picture prediction reference pixel group 162 for the remaining pixels after a part of the pixels are skipped out, but not all the pixels in the current block, as shown in FIG. 26A, and outputs the predictive image as a simplified intra-picture prediction predictive image 193. The simplified intra-picture prediction execution unit 191 further outputs, as the intra-picture prediction mode information 163, the information related to the prediction mode used for generating the simplified intra-picture prediction image 193.

The coding efficiency evaluation unit 153b calculates a value indicating coding efficiency based on the simplified intra-picture predictive image 193. The coding efficiency evaluation unit 153b, for example, calculates a sum of absolute values of each pixel value in the simplified intra-picture predictive image 193, and outputs it as the evaluation value 166. It should be noted that the evaluation value 166 may be calculated by further referring to the information other than the simplified predictive image 193, for instance, the intra-picture prediction mode information based on the coded data of the neighboring coded blocks. In the case where the coding unit 155 adopts the method of coding a difference between the intra-picture prediction mode of the neighboring coded block and that of the current block, it is possible to calculate the evaluation value 166 by further referring to the intra-picture prediction mode of the neighboring coded block.

The intra-picture prediction mode determination unit 154b outputs, as the intra-picture prediction mode information 167, the intra-picture prediction mode whose evaluation value 166 that is outputted by the coding efficiency evaluation unit 153b is the smallest among the intra-picture prediction modes which are sequentially attempted at certain intervals by the simplified intra-picture prediction execution unit 191.

The intra-picture prediction execution unit 192 performs intra-picture prediction for all the pixels in the current block based on the intra-picture prediction reference pixel group 162b using the intra-picture prediction mode specified by the intra-picture prediction mode information 167, and outputs the predictive image as the intra-picture predictive image 164.

It should be noted that the intra-picture prediction mode candidate determination unit 156a is as described in the first embodiment. The prediction difference calculation unit 152 and the coding unit 155 are as described in the Background Art.

Figure 27:
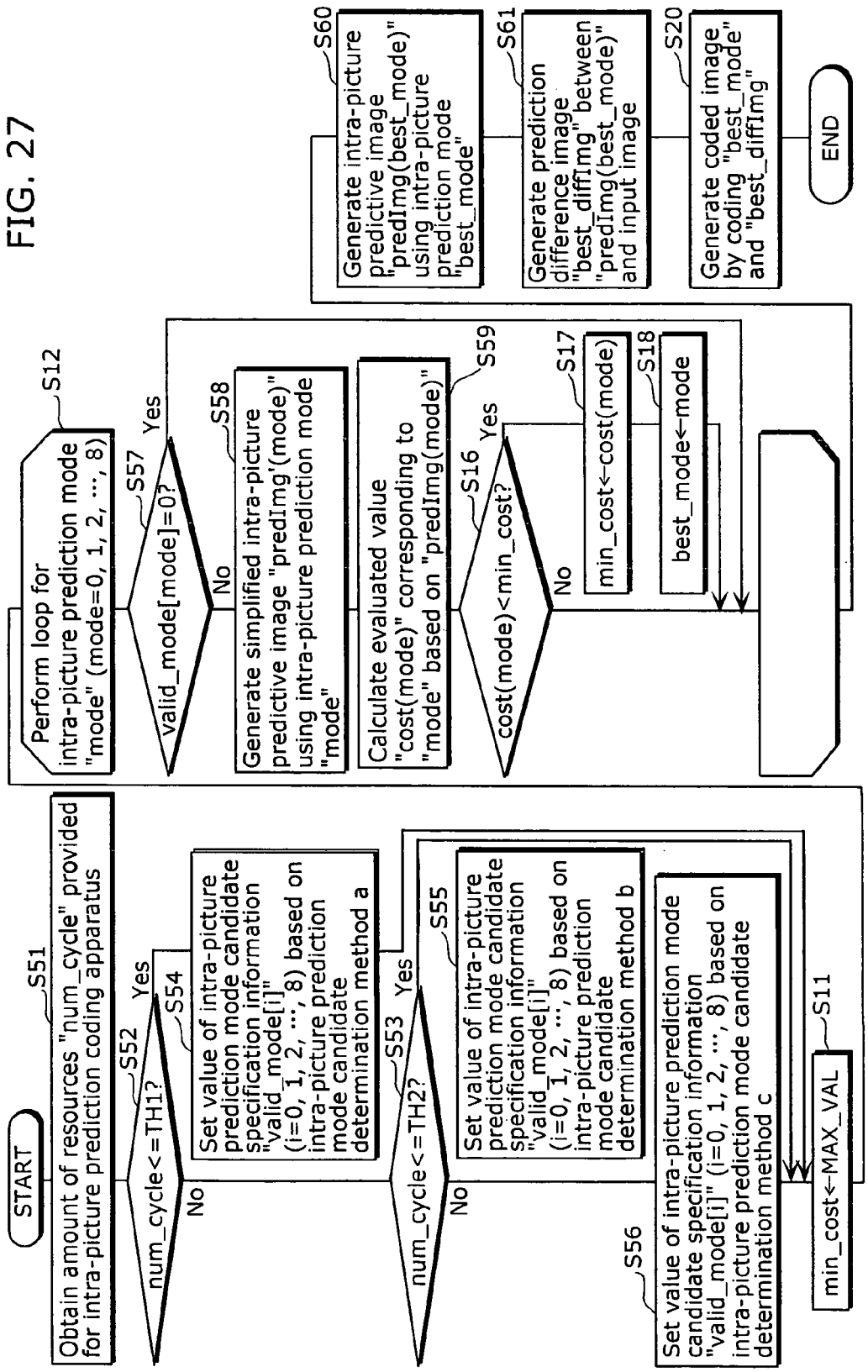
FIG. 27 is a flowchart for explaining the intra-picture prediction coding method employed by the intra-picture prediction coding apparatus according to the sixth embodiment.

FIG. 27 is a flowchart for explaining the intra-picture prediction coding method employed by the intra-picture prediction coding apparatus 150e. However, the chart shows the processing that is performed per prediction unit block.

The processing of setting the value for the intra-picture prediction mode candidate specification information "valid_mode[i]" (i=0, 1, . . . , 8) based on the amount of resources provided for the intra-picture prediction coding apparatus "num_cycle" (Steps S51 to S56), and the processing of substituting a value greater than the maximum value that can be obtained as the evaluation value 166 into a variable "min_cost" (Step S11) are as same as those described in the first embodiment.

Next, whether or not the intra-picture prediction mode candidate specification information "valid_mode[mode]" indicates "0" is sequentially judged for all the modes 0 to 8 (Step S12), regarding the intra-picture prediction mode information 163 as a "mode" (Step S57). In the case where the intra-picture prediction mode candidate specification information "valid_mode[mode]" does not indicate "0" (No in Step S57), intra-picture prediction is performed for a part of the pixels in the current block and generates "predImg' (mode)" that is the simplified intra-picture predictive image 193 (Step S58). Then, "cost(mode)" that represents the evaluation value 166 for the intra-picture prediction mode "mode" is calculated (Step S59). Then, the evaluation value "cost(mode)" and the value "min_cost" are compared (Step S16). In the case where the evaluation value "cost(mode)" is smaller (Yes in Step S16), the evaluation value "cost(mode)" is stored in the variable "min_cost" (Step S17) while the prediction mode information "mode" is stored in a variable "best_mode" (Step S18).

In the case where the intra-picture prediction mode candidate specification information "valid_mode[mode]" indicates "0" (Yes in Step S57), a sequence of processing (Steps S58 to S18), including a processing of generating an intra-picture predictive image "predImg(mode)" and the processing thereafter, is skipped over.

When a sequence of processing (Steps S58 to S18), including a processing of generating a simplified intra-picture predictive image "predImg'(mode) and the processing thereafter, is executed for the modes 0 to 8, intra-picture prediction is performed using the intra-picture prediction mode corresponding to the intra-picture prediction mode information "best_mode" and the "predImg(best mode)" representing the intra-picture predictive image 164 is generated (Step S60). Then, "best_diffImg" representing the difference between the generated intra-picture predictive image "predImg(best_mode) and the input image 161 is generated (Step S61). After that, coding is performed on the predictive image "best_diffImg" and the intra-picture prediction mode information "best_mode", and the coded image 169 is generated (Step S20).

It should be noted that the intra-picture prediction coding method as described above can be achieved as a program using a computer.

Thus, an intra-picture prediction mode is determined among the intra-picture prediction mode candidates using the intra-picture predictive image that is created in a simplified manner. It is therefore possible to perform intra-picture prediction coding with less amount of resources.

Figure 26B:
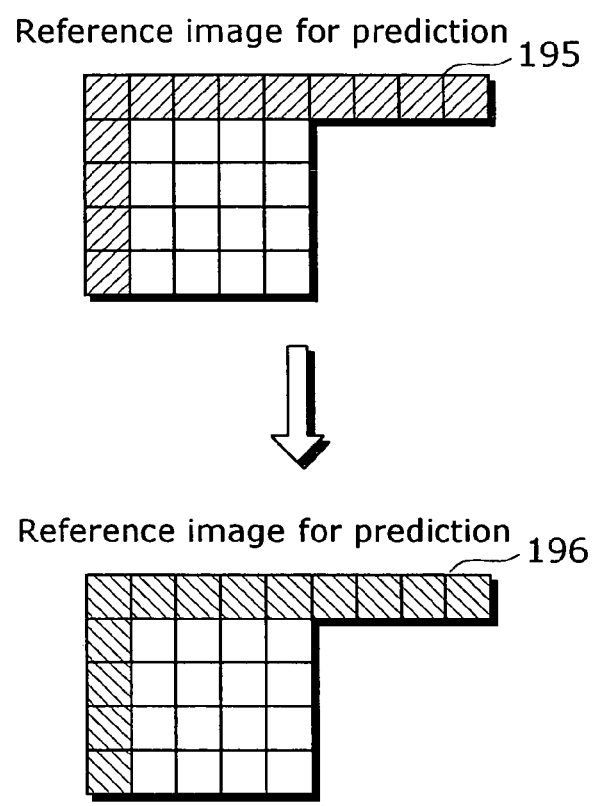
FIG. 26B shows an example of reference pixels, according to the sixth embodiment.

In the present embodiment, the simplified intra-picture prediction execution unit 191 performs intra-picture prediction for the remaining pixels after some of the pixels are skipped out, but not all the pixels in the current block, and outputs the predictive image as the simplified intra-picture predictive image 193. The present invention, however, is not limited to this. For example, in the case where the pixels located on the left and above the current block are not decoded due to the pipeline processing performed to the processing per unit, the simplified intra-picture prediction execution unit 191 may perform intra-picture prediction on the pixels in the current block based on the input pixels 196 instead of the decoded pixels 195 and output the predictive image as the simplified intra-picture predictive image 193, as shown in FIG. 26B. The simplified intra-picture prediction execution unit 191 may also perform intra-picture prediction on the current block based on the mixture of decoded pixels and input pixels e.g., the neighboring pixels on the left of the current block are input pixels and the neighboring pixels above the current block are decoded pixels.

Figure 28A:
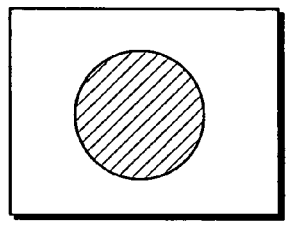
FIG. 28 shows examples of resolutions and the corresponding prediction mode candidates.
Figure 28E:
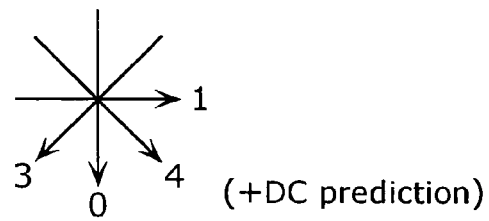
Figure 28B:
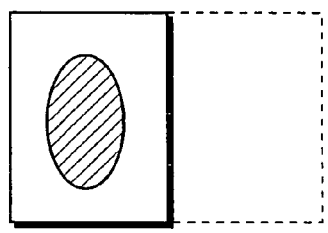
Figure 28F:
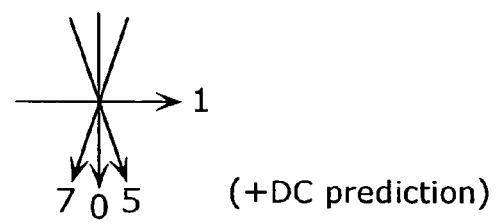

In each of the above embodiments, the intra-picture prediction mode candidate determination unit may determine the intra-picture prediction mode candidates depending on the following cases: when coding is performed at lower horizontal resolution, when coding is performed on a field-by-field basis; and when coding is performed at low horizontal and vertical resolutions. For example, assuming that the intra-picture prediction modes 0 to 4 shown in FIG. 28E are available for the case where coding is performed without lowering resolution as shown in FIG. 28A, it is possible to determine the intra-picture prediction mode candidates as the modes 0 to 2, 5, and 7, as shown in FIG. 28F, which are rather biased in vertical direction, in the case where coding is performed at lower resolution as shown in FIG. 28B.

Figure 28C:
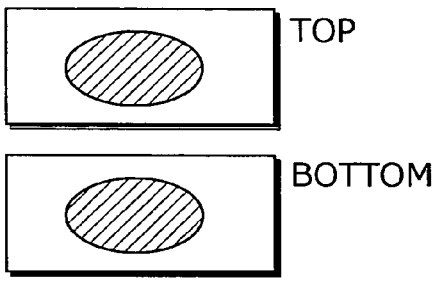
Figure 28G:
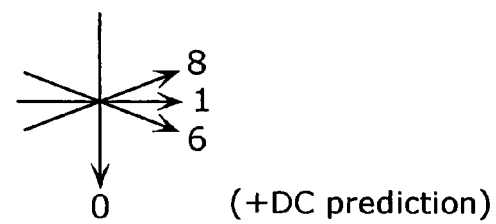
Figure 28D:
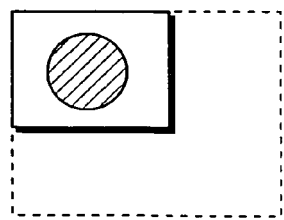
Figure 28H:
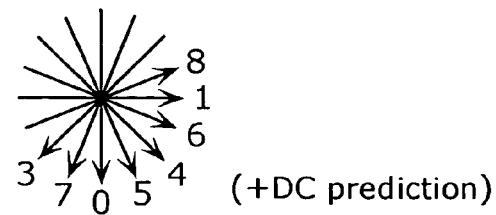

It is possible to determine the intra-picture prediction mode candidates as the intra-picture prediction modes 0 to 2, 6 and 8, as shown in FIG. 28G, which are rather biased in horizontal direction, in the case where coding is performed on a field-by-field basis as shown in FIG. 28C. It is also possible to determine the intra-picture prediction mode candidates as all the intra-picture prediction modes 0 to 8, as shown in FIG. 28H, in the case where coding is performed at lower horizontal and vertical resolutions as shown in FIG. 28D.

Seventh Embodiment

Figure 29:
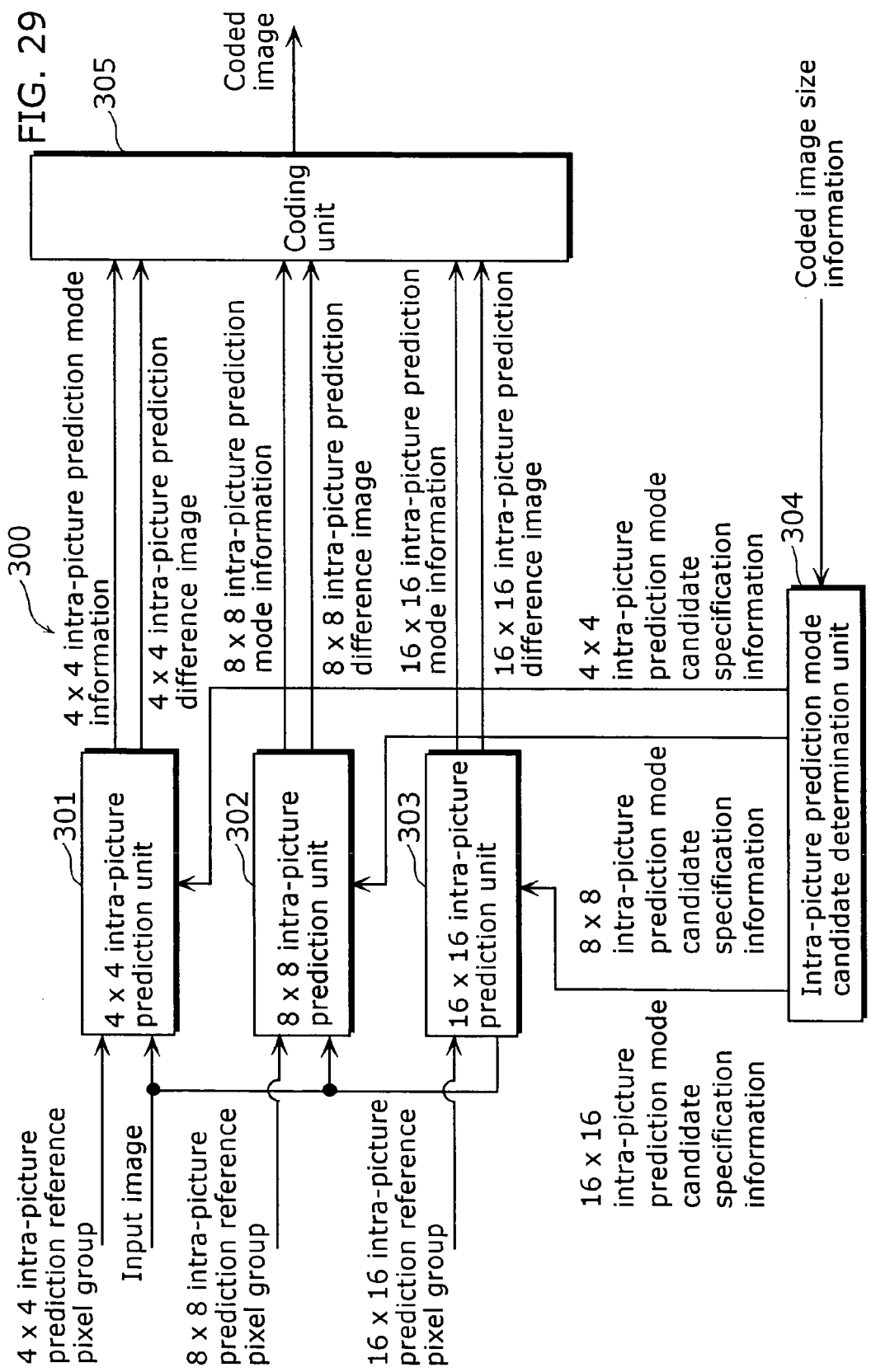
FIG. 29 is a block diagram showing a structure of the intra-picture prediction coding apparatus according to a seventh embodiment of the present invention.

FIG. 29 is a block diagram showing the structure of the intra-picture prediction coding apparatus according to the seventh embodiment of the present invention. The intra-picture prediction coding apparatus 300 according to the present embodiment is characteristic in that it switches between the methods of determining each intra-picture prediction mode candidate for an intra-picture prediction unit (a unit block size) being a unit for performing intra-picture prediction, based on the amount of resources provided for the intra-picture prediction coding apparatus.

As shown in FIG. 29, the intra-picture prediction coding apparatus 300 is comprised of a 4×4 intra-picture prediction unit 301, an 8×8 intra-picture prediction unit 302, a 16×16 intra-picture prediction unit 303, an intra-picture prediction mode candidate determination unit 304 and a coding unit 305.

The 4×4 intra-picture prediction unit 301, the 8×8 intra-picture prediction unit 302, the 16×16 intra-picture prediction unit 303 respectively includes the components in the intra-picture prediction coding apparatus 150a (FIG. 9) described in the first embodiment excluding the coding unit 155 and the intra-picture prediction mode candidate determination unit 156a. The description for these units is therefore abbreviated.

The intra-picture prediction mode candidate determination unit 304 determines the intra-picture prediction mode candidates based on coded image size information, and outputs 4×4 intra-picture prediction mode candidate specification information, 8×8 intra-picture prediction mode candidate specification information, and 16×16 intra-picture prediction mode candidate specification information respectively to the 4×4 intra-picture prediction unit 301, the 8×8 intra-picture prediction unit 302 and the 16×16 intra-picture prediction unit 303. It should be noted that N×N (N is a natural number) intra-picture prediction means the intra-picture prediction performed per prediction unit of N×N pixel block. Here, the intra-picture prediction mode candidate determination unit 304 reduces the number of prediction mode candidates so that a sum of the prediction mode candidates for all the unit block sizes gets smaller in the case where an image size (image width value×image length value) is large. That is to say, a total amount of processing necessary for the 4×4 intra-picture prediction unit 301, the 8×8 intra-picture prediction unit 302 and the 16×16 intra-picture prediction unit 303 is decreased. In the case where an image size is large, the number of prediction mode candidates in the prediction method using a small unit block size is preferentially decreased.

FIG. 30A to 30F respectively is a table showing an example of the number of prediction mode candidates specified by the prediction mode candidate specification information. In the table for the prediction method performed per unit block size, "○" indicates that all the prediction modes are candidates, "Δ" indicates that a part of the prediction modes are candidates, and "×" indicates that prediction is not performed. For the classification of an image size, "large", "middle" and "small", two predetermined thresholds can be used.

For example, in the example shown in FIG. 30A, in the case where an image size is "large", 4×4 intra-picture prediction is not performed. In the example shown in FIG. 30B, in the case where an image size is "large", 4×4 intra-picture prediction is not performed and the number of candidates for 8×8 intra-picture prediction is reduced. In the case where an image size is "middle", the number of candidates for 4×4 intra-picture prediction is reduced. The examples shown in FIG. 30A to 30F show that a sum of the number of prediction mode candidates for all the unit block sizes gradually becomes smaller from FIG. 30A towards FIG. 30F. In the example shown in FIG. 30D, the number of prediction mode candidates is reduced both for 8×8 intra-picture prediction and 16×16 intra-picture prediction when an image size changes from "middle" to "large", however, the number can be reduced effectively by decreasing further the number of candidates for 8×8 intra-picture prediction.

A sum of the number of prediction mode candidates for all the unit block sizes is set so that it decreases monotonously according to the size of an image, that is, the sum gets smaller when the image size is "large" while it gets larger when the image size is "small".

The coding unit 305 codes the 4×4 intra-picture prediction mode information and the 4×4 prediction difference image which are inputted, the 8×8 intra-picture prediction mode information and the 8×8 prediction difference image, or the 16×16 intra-picture prediction information and the 16×16 prediction difference image, and outputs a coded image. In the coding of the prediction difference image, quantization is performed after frequency transformation such as a DCT is performed, and the quantized values are coded using variable length coding or arithmetic coding. For coding the intra-picture prediction mode information, variable length coding or arithmetic coding is used.

Thus, in the case where an image size is large, the number of prediction mode candidates is reduced so that a sum of the prediction mode candidates for all the unit block sizes gets smaller. It is therefore possible to improve coding efficiency while maintaining a maximum value indicating a usable amount of resources per unit time so as to reduce the cost of hardware and the amount of processing operated by software, by introducing a mechanism that increases the number of intra-picture prediction candidates.

It should be noted that, in the above description, the intra-picture prediction mode candidate determination unit 304 decreases the number of prediction mode candidates so that the sum of the prediction mode candidates for all the unit block sizes gets smaller in the case where the image size is large. The present invention, however, is not limited to this. For example, the intra-picture prediction mode candidate determination unit 304 may not only decrease the number of prediction mode candidates so that the sum of the prediction mode candidates for al the unit block sizes gets smaller, in the case where the image size is large, but may also decrease the number of prediction mode candidates in the prediction method using a large unit block size in the case where the image size is small.

FIG. 31A to 31D respectively is a table showing an example of the number of the prediction mode candidates specified by the prediction mode candidate specification information in this case. Here, as in FIG. 30, "○" indicates that all the prediction modes are candidates, "Δ" indicates that a part of the prediction modes are candidates, and "×" indicates that prediction is not performed. For the classification of an image size, "large", "middle" and "small", two predetermined thresholds can be used.

For example, in the example shown in FIG. 31A that is based on the example shown in FIG. 30E, in the case where an image size is "middle", the number of candidates for 8×8 intra-picture prediction is increased while the number of candidates for 16×16 intra-picture prediction is reduced. In the case where an image size is "small", the number of candidates for 4×4 intra-picture prediction is increased while the number of candidates for 16×16 intra-picture prediction is reduced. Similarly, the example shown in FIG. 31B is based on the example shown in FIG. 30E, and the examples shown in FIGS. 31C and 31D are based on the example shown in FIG. 30F.

Here, the sum of the number of prediction mode candidates for all the unit block sizes is set so that the sum decreases monotonously according to the image size. It is therefore possible to further increase the number of the prediction mode candidates for a small unit block size instead of decreasing the number of the prediction mode candidates for a large unit block size. In the case where the image size is small, prediction efficiency tends to be higher in the prediction using a small unit block size. It is therefore possible to perform intra-picture prediction with a limited amount of processing and a high image quality.

It should be noted that in each of the above embodiments, a long hour drive can be realized by reducing the amount of electricity consumed by the apparatus, for example, at the time of driving the apparatus using batteries. As a method of reducing power consumption, an amount of operations can be reduced in the apparatus. This is equivalent of reducing "given amount of resources". In other words, "given amount of resources" may be reduced with the view to reduce power consumption.

In each of the above embodiments, the intra-picture prediction mode candidate determination unit may perform coding using a different intra-picture prediction or inter-picture prediction without performing the prediction method specified by the intra-picture prediction mode candidate, regarding the number of intra-picture prediction mode candidates as "0" according to the amount of resources provided for the intra-picture prediction coding apparatus.

The coding unit may further evaluate coding efficiency and perform coding using a different intra-picture prediction method or inter-picture prediction method.

Eighth Embodiment

Furthermore, the processing illustrated in each of the above embodiments can be carried out easily in an independent computer system by recording a program for realizing the structure of the intra-picture prediction coding method described in each of the above embodiments onto a recording medium such as a flexible disk or the like.

Figure 32A:
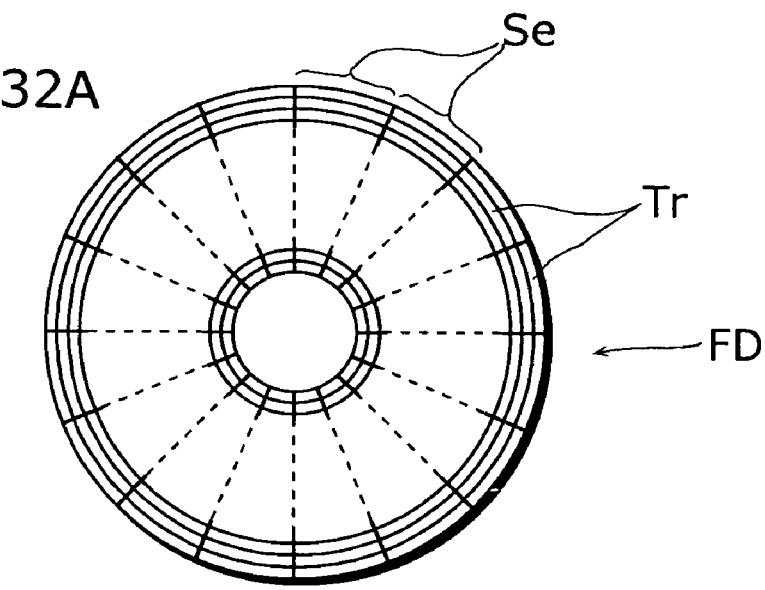
FIG. 32A, 32B and 32C are illustrations of a recording medium for recording a program for realizing, in a computer system, the intra-picture prediction coding method according to each of the above embodiments.
Figure 32B:
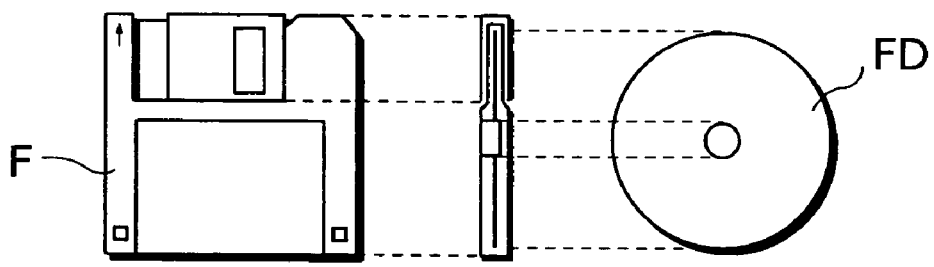
Figure 32C:
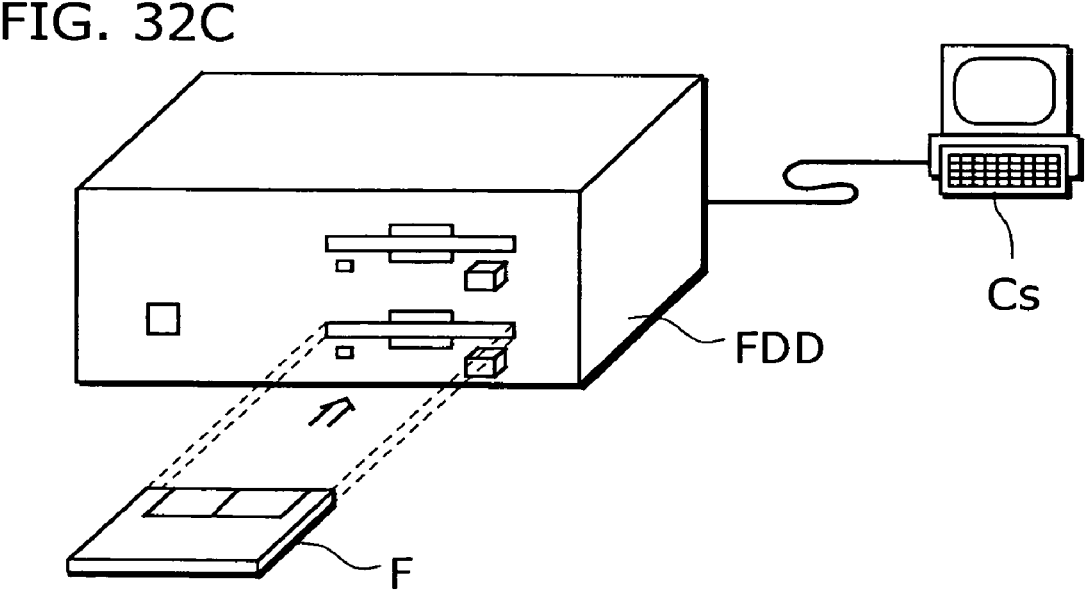

FIGS. 32A, 32B and 32C are illustrations of a recording medium, on which a program in which each intra-picture prediction coding method described in each of the first through sixth embodiments is stored in the computer system is recorded.

FIG. 32B shows a full appearance of a flexible disk FD, its structure at cross section and a full appearance of the disk FD as a main body of a recording medium, whereas FIG. 32A shows an example of a physical format of the flexible disk FD. The disk FD is contained in a case F with a plurality of tracks Tr formed concentrically from the periphery to the inside on the surface of the disk FD, and each track is divided into 16 sectors Se in the angular direction. Thus, the picture coding method as the program mentioned above is recorded in an area assigned for it on the disk FD.

FIG. 32C shows a structure for recording and reading out the program on the flexible disk FD. When the program is recorded on the flexible disk FD, the computer system Cs writes in the picture coding method as the program mentioned above via a flexible disk drive FDD. When the intra-picture prediction coding method is constructed in the computer system Cs using the program on the flexible disk FD, the program is read out from the flexible disk FD and then transferred to the computer system Cs by the flexible disk drive FDD.

In the above explanation, the flexible disk FD is used as an example of a recording medium, but the same processing can also be performed using an optical disk. In addition, the recording medium is not limited to these mentioned above, but any other medium capable of recording a program such as an IC card and a ROM cassette can be employed.

Ninth Embodiment

The following describes, as the ninth embodiment of the present invention, the applications of the intra-picture prediction coding apparatus, the intra-picture prediction coding method and the intra-picture prediction coding program and a system using them, with reference to FIGS. 33 to 36.

Figure 33:
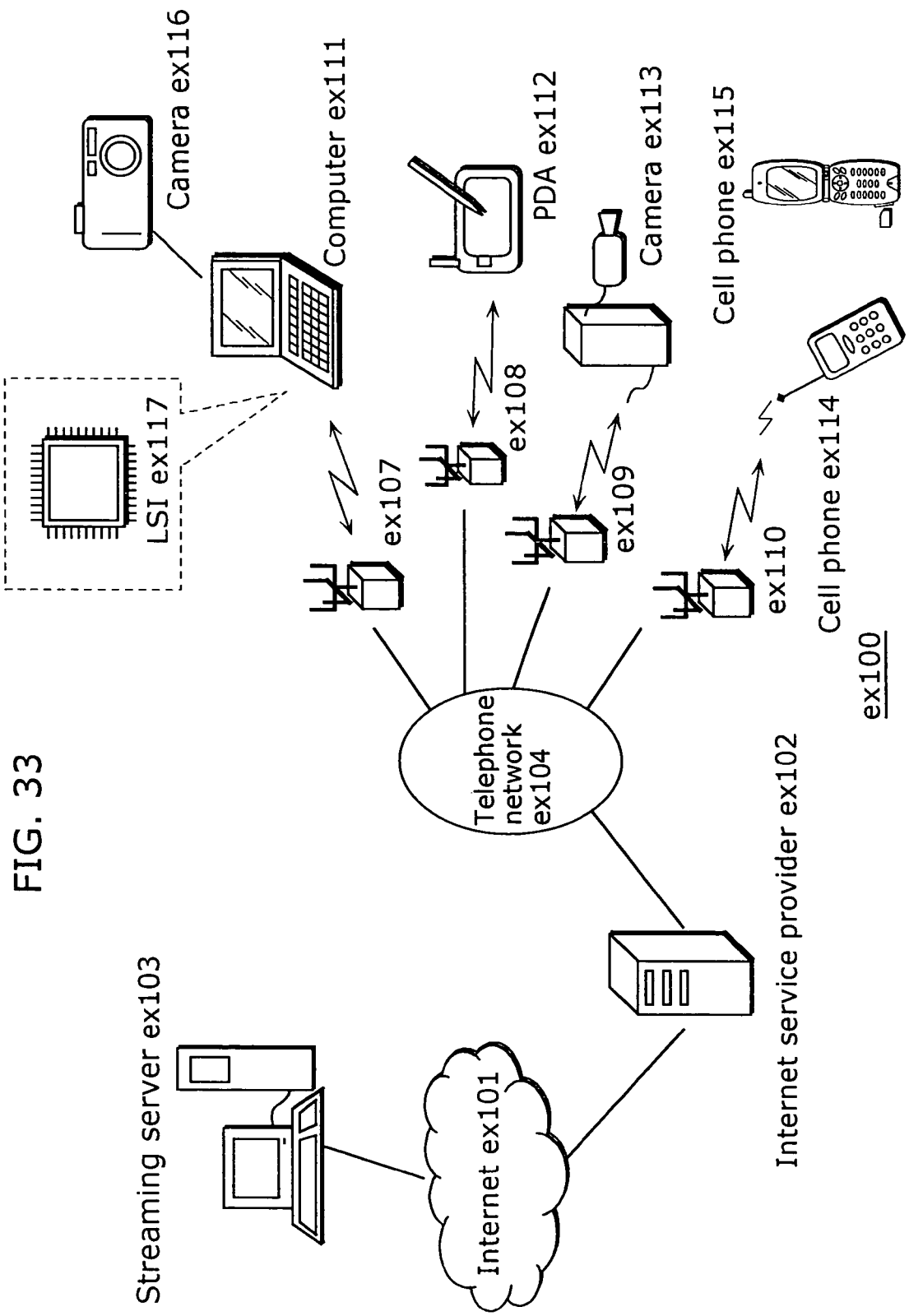
FIG. 33 is a block diagram showing a whole configuration of the content supply system for providing content delivery services.

FIG. 33 is a block diagram showing an overall configuration of a content supply system ex100 for providing content delivery services. The area for providing communication service is divided into cells of desired size, and cell sites ex107~ex110, which are fixed wireless stations, are placed in respective cells.

This content supply system ex100 is connected to apparatuses such as a computer ex111, a Personal Digital Assistant (PDA) ex112, a camera ex113, a cell phone ex114 and a cell phone with a camera ex115 via, for example, Internet ex101, an Internet service provider ex102, a telephone network ex104, as well as the cell sites ex107~ex110.

However, the content supply system ex100 is not limited to the configuration shown in FIG. 33 and may be connected to a combination of any of them. Also, each apparatus may be connected directly to the telephone network ex104, not through the cell sites ex107~ex110.

The camera ex113 is an apparatus capable of shooting video such as a digital video camera. The cell phone ex114 may be a cell phone of any of the following system: a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS) or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer exill. In this case, either the camera ex116 or the computer exill may code the moving picture data. An LSI ex117 included in the computer ex111 and the camera ex116 performs the coding processing. Software for coding and decoding pictures may be integrated into any type of recording medium (such as a CD-ROM, a flexible disk and a hard disk) that is a recording medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream delivery of the content data to the clients at their requests. The clients include the computer exill, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting. It should be noted that the intra-picture prediction coding apparatus, the intra-picture prediction coding method and the intra-picture prediction coding program shown in the above-mentioned embodiments may be used for coding a content. For example, the computer exill, the PDA ex112, the camera ex113 may have the intra-picture prediction coding apparatus and the intra-picture prediction coding program described in the above embodiments.

The following describes the case of using a cell phone is taken as an example.

Figure 34:
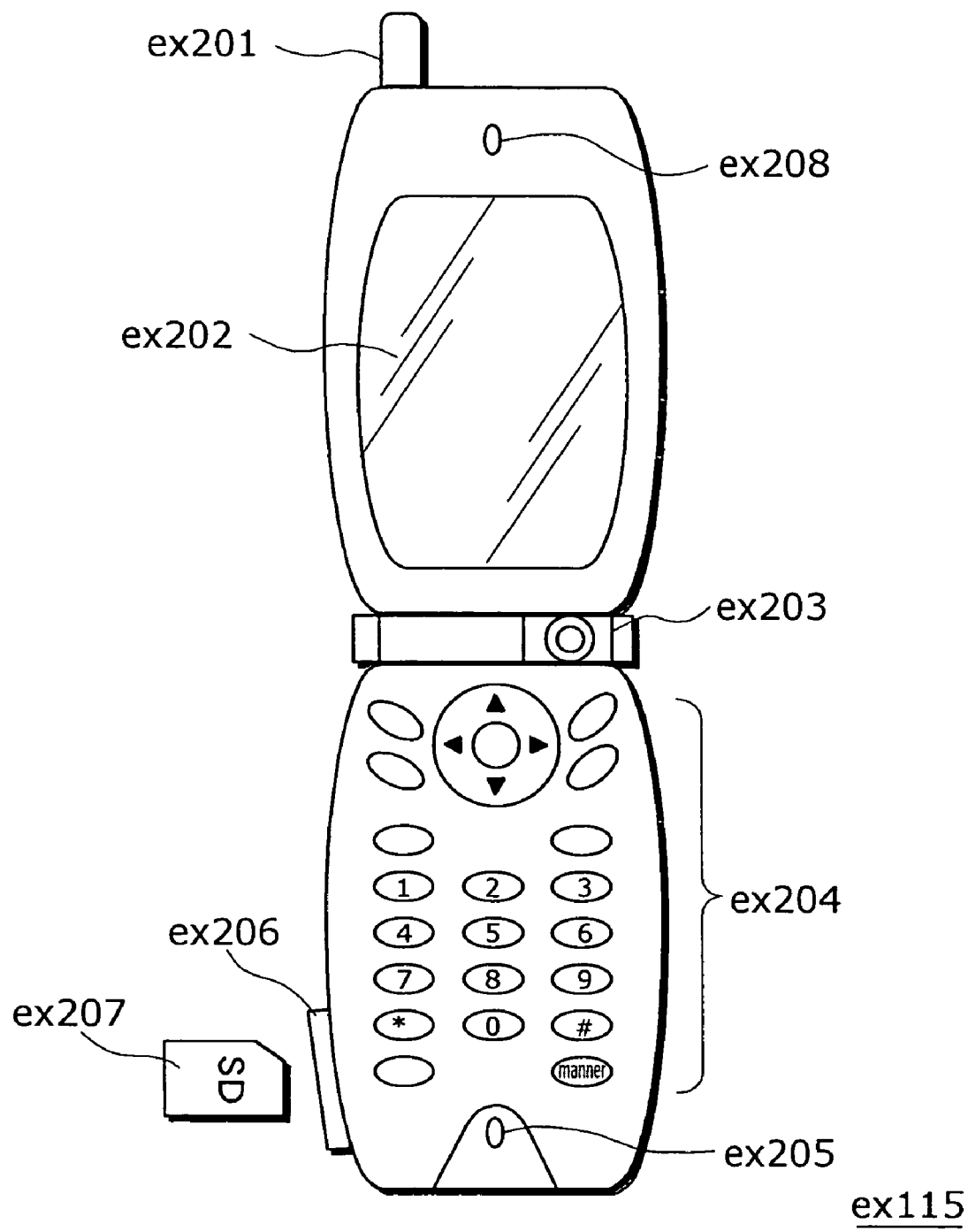
FIG. 34 shows an example of a cell phone.

FIG. 34 is a diagram showing the cell phone ex115 using the picture coding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, an audio output unit ex208 such as a speaker for outputting audio, an audio input unit ex205 such as a microphone for inputting audio, a recording medium ex207 for recording coded or decoded data such as data of moving or still pictures shot by the camera, data of received e-mails and that of moving or still pictures, and a slot unit ex206 for attaching the recording medium ex207 to the cell phone ex115. The recording medium ex207 stores in itself a flash memory element, a kind of Electrically Erasable and Programmable Read Only Memory (EEPROM) that is a nonvolatile memory electrically erasable from and rewritable to a plastic case such as an SD card.

Next, the cell phone ex115 will be explained with reference to FIG. 35. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, a Liquid Crystal Display (LCD) control unit ex302, a picture decoding unit ex309, a multiplexing/demultiplexing unit ex308, a read/write unit ex307, a modem circuit unit ex306 and an audio processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the audio processing unit ex305 converts the audio signals received by the audio input unit ex205 in conversation mode into digital audio data under the control of the main control unit ex311 including a CPU, ROM and RAM, the modem circuit unit ex306 performs spread spectrum processing for the digital audio data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the audio processing unit ex305 converts it into analog audio data so as to output it via the audio output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

In the case where picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as described for the present invention, compresses and codes the picture data supplied from the camera unit ex203 using the coding method employed by the picture coding apparatus as shown in the embodiments mentioned above so as to transform it into coded image data, and sends it out to the multiplexing/demultiplexing unit ex308. At this time, the cell phone ex115 sends out the audio received by the audio input unit ex205 during the shooting with the camera unit ex203 to the multiplexing/demultiplexing unit ex308 as digital audio data via the audio processing unit ex305.

It should be noted that the picture coding unit ex312 may function as the intra-picture prediction coding apparatus as described in the above embodiments.

The multiplexing/demultiplexing unit ex308 multiplexes the coded image data supplied from the picture coding unit ex312 and the audio data supplied from the audio processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site exa10 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a bit stream of image data and that of audio data, and supplies the coded image data to the picture decoding unit ex309 and the audio data to the audio processing unit ex305, respectively via the synchronous bus ex313.

Next, the picture decoding unit ex309 generates reproduced moving picture data by decoding the bit stream of the image data, and supplies the generated data to the display unit ex202 via the LCD control unit ex302, and thus the image data included in the moving picture file linked to a Web page, for instance, is displayed.

At the same time, the audio processing unit ex305 converts the audio data into analog audio data, and supplies this data to the audio output unit ex208, and thus the audio data included in the moving picture file linked to a Web page, for instance, is reproduced.

Figure 36:
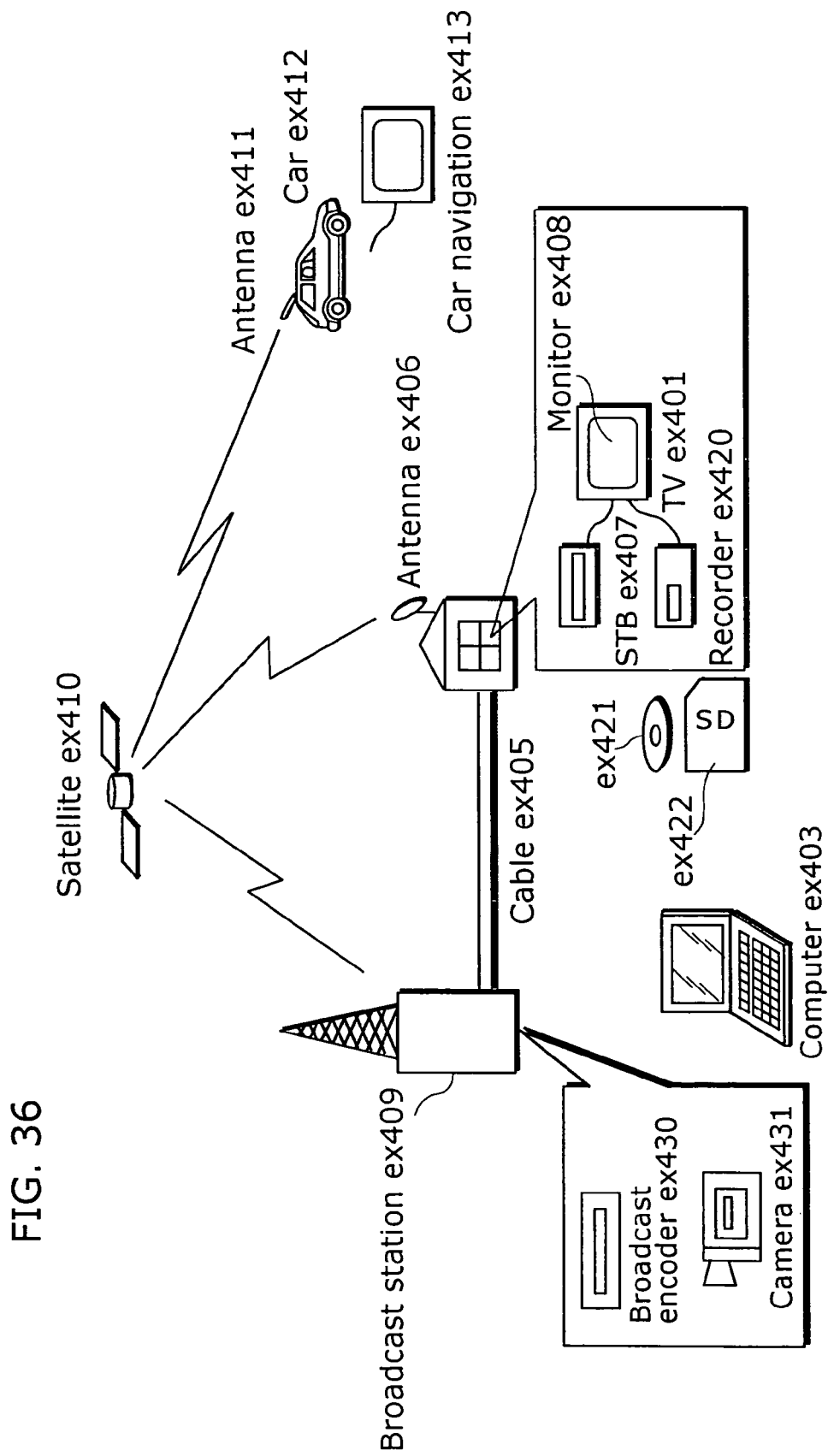
FIG. 36 is a block diagram showing a whole configuration of a digital broadcasting system.

The present invention is not limited to the above-mentioned system since ground-based or satellite digital broadcasting has been in the news lately, and the intra-picture prediction coding apparatus, the intra-picture prediction coding method and the intra-picture prediction coding program described in the above-mentioned embodiments can be incorporated into a digital broadcasting system as shown in FIG. 36. More specifically, in a broadcast station ex409, a broadcast encoder ex430 and a camera ex431 codes video information, and the generated coded bit stream is transmitted from a broadcast station ex409 to or communicated with a broadcast satellite ex410 via radio waves. Upon the receipt of it, the broadcast satellite ex410 emits radio waves for broadcasting, a home-use antenna ex406 with a satellite broadcast reception function receives the radio waves, and a television (receiver) ex401 or a set top box (STB) ex407 decodes the coded bit stream so as to reproduce it. Also, a car ex412 having an antenna ex411 can receive signals from the satellite ex410 or the cell site ex107 and reproduces a moving picture on a display device such as a car navigation system ex413 set in the car ex412. Here, the apparatuses such as the broadcast encoder 430 and the camera ex431 may be equipped with the intra-picture prediction coding apparatus described in the above embodiments or may use the intra-picture prediction coding method described in the above embodiments or may include the intra-picture prediction coding program as described in the above embodiments.

Furthermore, picture signals can be coded and recorded on the recording medium. As a concrete example, a recorder ex420 such as a DVD recorder for recording picture signals on a DVD disk ex421, a disk recorder for recording them on a hard disk can be cited. The coded picture signals can be recorded on an SD card ex422. The computer ex403 the car navigation ex413, besides the recorder ex420, may have a function to code picture signals and record them in the recording medium. It should be noted that in the case of recording the coded picture signals in the SD card ex422, it is also possible to record them via the intra-picture prediction coding apparatus described in the above embodiments.

Figure 35:
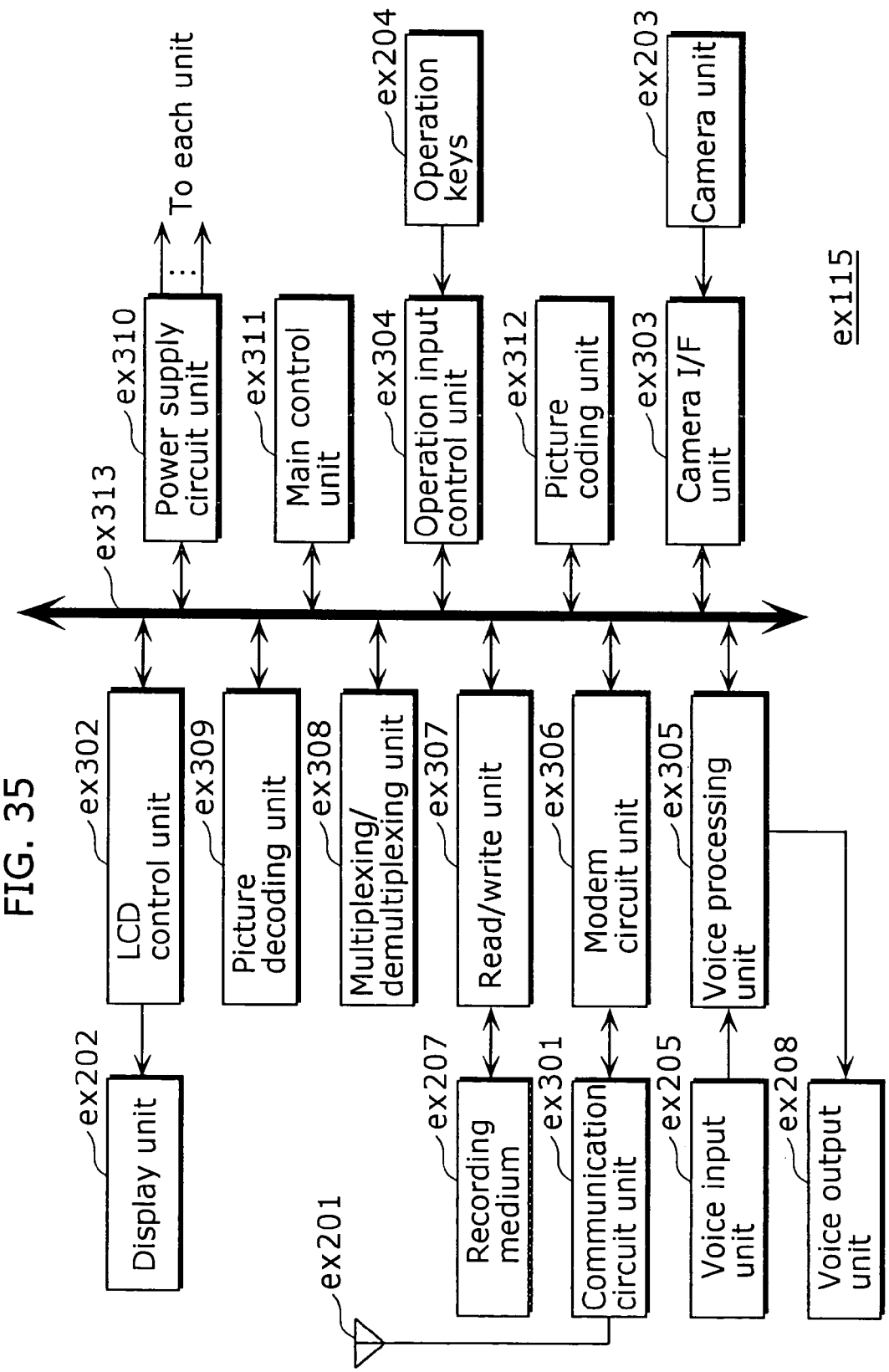
FIG. 35 is a block diagram showing an internal structure of the cell phone.

As for the configuration of the car navigation system ex413, the structure without the camera unit ex203, the camera interface unit ex303 and the picture coding unit ex312, out of the components shown in FIG. 35, is conceivable. The same applies for the recorder ex420, the computer ex111 and others.

Three types of implementations can be conceived for a terminal such as the cell phone ex114: a sending/receiving terminal implemented with both an encoder and a decoder, a sending terminal implemented with an encoder only, and a receiving terminal implemented with a decoder only.

As described above, it is possible to use the intra-picture prediction coding apparatus, the intra-picture prediction coding method and the intra-picture prediction coding program as described in the above-mentioned embodiments for any of the above-mentioned apparatuses and systems, and by thus doing, the effects described in the above-mentioned embodiments can be obtained.

The present invention is not limited to the above embodiments, and many kinds of variations and modifications are possible within the scope of this invention.

Each of the functional blocks described in each of the embodiments can be realized typically as an LSI that is integrated circuit. The LSI may be available in one or plural chips form (e.g. function blocks other than a memory may be put into a chip form). Here, an LSI is mentioned, but it may be named an IC, a system LSI, a super LSI, and an ultra LSI depending on the degree of integration.

The method of circuit integration is not limited to such LSI and can be realized with a personal circuit or a general processor. After the manufacturing of the LSI, a Field Programmable Gate Array (FPGA) that is programmable or a reconfigurable processor that can reconfigure a connection or a setting of the circuit cell within the LSI may be used.

Furthermore, with the arrival of the integrated circuit technology in place of the LSI due to a progress in semiconductor technology or another technology derived from the progress, the function blocks may be integrated using the technology. The adaptation of bio technology is yet another possibility.

INDUSTRIAL APPLICABILITY

With the use of the intra-picture prediction coding method and the intra-picture coding apparatus according to the present invention, coding efficiency can be enhanced without increasing processing tasks operated by software or the maximum value indicating the number of hardware processing cycles. Such intra-picture prediction coding method and the intra-picture coding apparatus are useful for coding each picture that composes a moving picture with the use of, for example, a cell phone, a DVD apparatus and a personal computer.

What is claimed is:

1. An intra-picture prediction coding method comprising:
determining, according to an amount of resources provided for intra-picture prediction coding, one or more intra-picture prediction method candidates that are candidates for an intra-picture prediction method for performing intra-picture prediction on a current block;
executing intra-picture prediction on the current block using intra-picture prediction methods specified by the determined intra-picture prediction method candidates, and generating an intra-picture predictive image;
generating a difference image between an input image that includes the current block, and the generated intra-picture predictive image, the difference image having difference values, each indicating a difference between each pixel in the input image and each pixel in the intra-picture predictive image, as each pixel value;
calculating an evaluation value indicating coding efficiency, in the case where coding is performed based on the generated difference image using each intra-picture prediction method candidate based on which the difference image is generated;
determining an intra-picture prediction method for coding the current block from among the intra-picture prediction method candidates, based on the evaluation values calculated for each of the intra-picture prediction method candidates; and
coding intra-picture prediction method information indicating the determined intra-picture prediction method, and the difference image generated based on the intra-picture predictive image on which intra-picture prediction is performed using the determined intra-picture prediction method.

2. The intra-picture prediction coding method according to claim 1,
wherein the intra-picture prediction method is an intra-picture prediction mode indicating how to use decoded pixels in order to generate the intra-picture predictive image, the decoded pixels being adjacent to the current block and already coded,
in the determination of said one or more intra-picture prediction method candidates, intra-picture prediction mode candidates are determined according to the amount of resources, and
in the determination of the intra-picture prediction method, an intra-picture prediction mode for coding the current block is determined from among the intra-picture prediction mode candidates based on the evaluation value.

3. The intra-picture prediction coding method according to claim 2,
wherein in the determination of the intra-picture prediction method candidates, an edge direction of an image within the current block is extracted, and the intra-picture prediction mode candidates are determined based on the edge direction.

4. The intra-picture prediction coding method according to claim 3,
wherein in the determination of said one or more intra-picture prediction method candidates, an intra-picture prediction mode that performs prediction in a direction similar to the edge direction is preferentially determined as the intra-picture prediction mode candidate.

5. The intra-picture prediction coding method according to claim 2,
wherein in the determination of said one or more intra-picture prediction method candidates, an intra-picture prediction mode that does not have a direction of prediction is preferentially determined as the intra-picture prediction mode candidate.

6. The intra-picture prediction coding method according to claim 2,
wherein in the determination of said one or more intra-picture prediction method candidates, a predetermined intra-picture prediction mode is preferentially determined as the intra-picture prediction mode candidate depending on whether coding is performed on a frame basis or on a field basis.

7. The intra-picture prediction coding method according to claim 2,
wherein in the determination of said one or more intra-picture prediction method candidates, a predetermined intra-picture prediction mode is preferentially determined as the intra-picture prediction mode candidate based on a length-to-width ratio of a picture on which coding is performed at lower resolution.

8. The intra-picture prediction coding method according to claim 1,
wherein the intra-picture prediction method is an intra-picture prediction unit that is a block size of the current block, and in the determination of said one or more intra-picture prediction method candidates, intra-picture prediction unit candidates are determined according to the amount of resources, and in the determination of the intra-picture prediction method, an intra-picture prediction unit is determined from among the intra-picture prediction unit candidates based on the evaluation value.

9. The intra-picture prediction coding method according to claim 8, wherein in the determination of said one or more intra-picture prediction method candidates, one or more intra-picture prediction mode candidates that are candidates for an intra-picture prediction mode, the intra-picture prediction mode indicating how to use decoded pixels in order to generate the intra-picture predictive image is determined for each intra-picture prediction unit based on the amount of resources, and the decoded pixels being adjacent to the current block and already coded, and in the determination of the intra-picture prediction method, an intra-picture prediction mode is determined from among the intra-picture prediction mode candidates based on the evaluation value.

10. The intra-picture prediction method according to claim 1, wherein in the determination of said one or more intra-picture prediction method candidates, a method of determining the intra-picture prediction method candidates is selected from among a plurality of determination methods based on the amount of resources.

11. The intra-picture prediction coding method according to claim 1, wherein in the determination of said one or more intra-picture prediction method candidates, a number of the intra-picture prediction method candidates is changed according to the amount of resources.

12. The intra-picture prediction coding method according to claim 1, wherein in the determination of said one or more intra-picture prediction method candidates, it is judged that the amount of resources increases as a product of a number of pixels in horizontal direction and a number of pixels in vertical direction of an input picture to be coded gets smaller, and the intra-picture prediction method candidates are determined according to the product.

13. The intra-picture prediction coding method according to claim 12, wherein in the determination of said one or more intra-picture prediction method candidates, the number of intra-picture prediction method candidates increases as the product of the number of pixels in horizontal direction and the number of pixels in vertical direction gets smaller.

14. The intra-picture prediction coding method according to claim 1, wherein in the determination of said one or more intra-picture prediction method candidates, it is judged that the amount of resources increases as a number of frames or fields to be coded per unit time for an input picture to be coded gets smaller, and the intra-picture prediction method candidates are determined according to the number of frames or fields.

15. The intra-picture prediction coding method according to claim 14, wherein in the determination of said one or more intra-picture prediction method candidates, the number of intra-picture prediction method candidates increases as the number of frames or fields gets smaller.

16. The intra-picture prediction coding method according to claim 1, wherein in the determination of said one or more intra-picture prediction method candidates, it is judged that the amount of resources for picture prediction types provided for the input picture to be coded increases in the following order: a prediction type B of performing inter-picture prediction for generating a predictive image with reference to one or more pictures; a prediction type P of performing inter-picture prediction for generating a predictive image with reference to one picture; and a prediction type I of not performing inter-picture prediction, and the intra-picture prediction method candidates are determined based on the picture prediction type.

17. The intra-picture prediction method according to claim 16, wherein in the determination of said one or more intra-picture prediction method candidates, the number of intra-picture prediction method candidates gradually increases in the order of the prediction types of B, P, and I.

18. An intra-picture prediction coding apparatus comprising:

an intra-picture prediction method candidate determination unit operable to determine, according to an amount of resources provided for intra-picture prediction coding, one or more intra-picture prediction method candidates that are candidates for an intra-picture prediction method for performing intra-picture prediction on a current block;

an intra-picture prediction execution unit operable to execute intra-picture prediction on the current block using intra-picture prediction methods specified by the intra-picture prediction method candidates determined by the intra-picture prediction method candidate determination unit, and generate an intra-picture predictive image;

a prediction difference calculation unit operable to generate a difference image between an input image that includes the current block, and the intra-picture predictive image generated by the intra-picture prediction execution unit, the difference image having difference values, each indicating a difference between each pixel in the input image and each pixel in the intra-picture predictive image, as each pixel value;

a coding efficiency evaluation unit operable to calculate an evaluation value indicating coding efficiency, in the case where coding is performed based on the evaluation value calculated by the coding efficiency calculation unit using each intra-picture prediction method candidate based on which the difference image is generated;

an intra-picture prediction method determination unit operable to determine an intra-picture prediction method for coding the current block from among the intra-picture prediction method candidates, based on the evaluation values calculated for each of the intra-picture prediction method candidates by the coding efficiency evaluation unit;

a coding unit operable to code intra-picture prediction method information indicating the intra-picture prediction method determined by the intra-picture prediction method determination unit, and the difference image generated based on the intra-picture predictive image on which intra-picture prediction is performed using the intra-picture prediction method determined by the intra-picture prediction method determination unit.

19. A computer readable storage medium for storing a computer program for intra-picture prediction coding an input image to be coded, the computer program causing a computer to execute:

determining, according to an amount of resources provided for the intra-picture prediction coding, one or more intra-picture prediction method candidates that are candidates for an intra-picture prediction method for performing intra-picture prediction on a current block;

executing intra-picture prediction on the current block using intra-picture prediction methods specified by the determined intra-picture prediction method candidates, and generating an intra-picture predictive image;

generating a difference image between an input image that includes the current block, and the generated intra-picture predictive image, the difference image having difference values, each indicating a difference between each pixel in the input image and each pixel in the intra-picture predictive image, as each pixel value;

calculating an evaluation value indicating coding efficiency, in the case where coding is performed based on the generated difference image using each intra-picture prediction method candidate based on which the difference image is generated;

determining an intra-picture prediction method for coding the current block from among the intra-picture prediction method candidates, based on the evaluation values calculated for each of the intra-picture prediction method candidates; and coding intra-picture prediction method information indicating the determined intra-picture prediction method, and the difference image generated based on the intra-picture predictive image on which intra-picture prediction is performed using the determined intra-picture prediction method.

20. An integrated circuit comprising:

an intra-picture prediction method candidate determination unit operable to determine, according to an amount of resources provided for intra-picture prediction coding, one or more intra-picture prediction method candidates that are candidates for an intra-picture prediction method for performing intra-picture prediction on a current block;

an intra-picture prediction execution unit operable to execute intra-picture prediction on the current block using intra-picture prediction methods specified by the intra-picture prediction method candidates determined by the intra-picture prediction method candidate determination unit, and generate an intra-picture predictive image;

a prediction difference calculation unit operable to generate a difference image between an input image that includes the current block, and the intra-picture predictive image generated by the intra-picture prediction execution unit, the difference image having difference values, each indicating a difference between each pixel in the input image and each pixel in the intra-picture predictive image, as each pixel value;

a coding efficiency evaluation unit operable to calculate an evaluation value indicating coding efficiency, in the case where coding is performed based on the difference image generated by the prediction calculation unit using each intra-picture prediction method candidate based on which the difference image is generated;

an intra-picture prediction method determination unit operable to determine an intra-picture prediction method for coding the current block from among the intra-picture prediction method candidates, based on the evaluation values calculated for each of the intra-picture prediction method candidates by the coding efficiency evaluation unit;

a coding unit operable to code intra-picture prediction method information indicating the intra-picture prediction method determined by the intra-picture prediction method determination unit, and the difference image generated based on the intra-picture predictive image on which intra-picture prediction is performed using the intra-picture prediction method determined by the intra-picture prediction method determination unit.

* * * * *